(12) United States Patent
Sakata

(10) Patent No.: US 6,715,707 B2
(45) Date of Patent: Apr. 6, 2004

(54) CABLE REEL

(75) Inventor: Tomoyuki Sakata, Nagoya (JP)

(73) Assignees: Autonetworks Technologies, Ltd., Nagoya (JP); Sumitomo Wiring Systems, Ltd., Mie (JP); Sumitomo Electric Industries, Ltd., Osaka (JP)

(*) Notice: Subject to any disclaimer, the term of this patent is extended or adjusted under 35 U.S.C. 154(b) by 54 days.

(21) Appl. No.: 10/141,847

(22) Filed: May 10, 2002

(65) Prior Publication Data

US 2002/0168886 A1 Nov. 14, 2002

(30) Foreign Application Priority Data

| May 14, 2001 | (JP) | 2001-143724 |
| May 25, 2001 | (JP) | 2001-157803 |
| May 28, 2001 | (JP) | 2001-159518 |
| Jun. 29, 2001 | (JP) | 2001-199079 |

(51) Int. Cl.[7] .............. B65H 75/34; H01R 3/00
(52) U.S. Cl. .............. 242/388; 439/15; 439/164
(58) Field of Search ............. 242/388, 388.1, 242/388.6; 439/13, 15, 164

(56) References Cited

U.S. PATENT DOCUMENTS 5,637,005 A    6/1997   Bannai et al.
6,261,112 B1 * 7/2001   Mitsui ............. 439/164
6,264,487 B1   7/2001   Taniuchi et al.

FOREIGN PATENT DOCUMENTS

JP    4-327470     * 11/1992  ............ 242/388.1
JP    A 10-154565    6/1998

* cited by examiner

Primary Examiner—John M. Jillions
(74) Attorney, Agent, or Firm—Oliff & Berridge, PLC

(57) ABSTRACT

In a cable reel, a stationary body and a movable body are combined together to define an annular hollow section. A guide member is disposed in the annular hollow section, the guide member including a C-shaped ring and a plural rollers. A flat cable is wound round an inner circumferential passage and wound round an outer circumferential passage, a winding direction of the flat cable in the inner circumferential passage and that of the flat cable in the outer circumferential passage are inverted to each other. The intermediate portion of each roller is rotatably held by the ring, a lower end portion of the roller on the outer cylindrical section side contacts with the bottom plate section under the condition that the inner cylindrical section side of the roller is raised from the bottom plate section, and the inner cylindrical section side of the roller contacts with the flat cable.

25 Claims, 32 Drawing Sheets

⇩

CABLE REEL

BACKGROUND OF THE INVENTION

1. Field of the Invention

The present invention relates to a cable reel incorporated into a steering device of an automobile. More particularly, the present invention relates to a cable reel, the thickness of which is small, capable of rotating smoothly.

2. Description of the Related Art

Recently, there has been provided a cable reel in which a flat cable accommodating chamber formed as an annular hollow section is disposed. The annular hollow section is formed between a stationary body fixed onto a steering column side and a movable body fixed onto a steering shaft side. A flat cable is movably accommodated and inverted in the flat cable accommodating chamber, and a plurality of rollers are arranged in the annular hollow section as rotary guide members to guide the flat cable.

For example, as shown in FIG. 45, a stationary body 1, which serves as an outer cylinder and includes an outer frame 1a and a bottom plate 1b, and a movable body 2, which serves as an inner cylinder, are relatively rotatably connected with each other. A base plate 4 is rotatably set on the bottom plate 1b in the annular hollow portion 8 that is formed between the stationary body 1 and the movable body 2. A group of rollers 5 are supported by pins 4b protruded from the base plate 4. The flat cable 3 is wound around the inner circumferential passage 6 formed between the rollers 5 and the inner cylinder 2a of the movable body 2, and is also wound around the outer circumferential passage 7 formed between the rollers 5 and the outer frame 1a of the stationary body 1, while the flat cable 3 is inverted and formed into a U-shape. One end of the flat cable 3 is fixed at the stationary body 1, and the other end of the flat cable 3 is fixed at the movable body 2.

In the above cable reel, when the movable body 2 is rotated in one direction, the flat cable 3, which is inverted and formed into a U-shape, passes an inversion section formed between the rollers 5, and the flat cable 3 is wound into the inner circumferential passage 6. On the other hand, when the movable body 2 is rotated in the opposite direction, the flat cable 3 is wound back and sent out to the outer circumferential passage 7.

Compared with a cable reel in which a flat cable is spirally wound in an accommodating space, the aforementioned inversion type cable reel is advantageous in that the length of the flat cable can be reduced.

However, the following problems may be encountered in the above cable reel. In order to support the rollers 5 accommodated in the annular hollow portion 8 while leaving a space between the rollers, the base plate 4 is set being engaged with a groove 1c formed on the bottom plate 1b. Therefore, thickness of the bottom plate 1b is increased. Accordingly, the overall height H of the cable reel is increased, which makes the cable reel size large.

Further, since the pins 4b for holding rollers 5 are protruded from the base plate 4 at predetermined positions, the structure becomes complicated and the size of the cable reel is increased, and further the material cost is raised. Furthermore, in the case where a bolt rotatably penetrates the axial center of each roller so as to prevent the roller from coming out, the number of parts and the number of working steps are increased corresponding to the number of rollers.

Also, the following problems may be encountered. Since gap S exists between an upper end of the rollers 5 and a roof face 1a-1 of the outer frame 1a, the roller 5 rattles and vibrates in the vertical direction. At the same time, the roller collides with the roof face 1a-1 and noise is generated.

In order to prevent an increase of the collision sound, it is preferable that gap S is decreased. Therefore, the height of the roller 5 cannot be reduced too low compared with the height of the annular hollow portion 8. Accordingly, it is impossible to reduce the size and weight of the roller.

SUMMARY OF THE INVENTION

The present invention has been accomplished to solve the above problems.

An object of the present invention is to provide a cable reel having an improved roller supporting mechanism so as to reduce the costs of parts and the number of working steps. The cable reel has a small thickness and lower rotating torque.

In order to solve the above problems, the present invention provides a cable reel comprising: a cylindrical stationary body and a movable body combined with each other to define an outer cylindrical section, inner cylindrical section, bottom plate section and roof plate section surrounding an annular hollow section; a guide member disposed in the annular hollow section, the guide member including a C-shaped ring and a plurality of rollers spaced apart from each other and rotatably supported by the ring; a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers, wherein a winding direction of the flat cable in the inner circumferential passage is inverted to that of the flat cable in the outer circumferential passage; an intermediate portion of each roller is rotatably held by the ring under the condition that a roller axis is tilted; and at least one portion of each roller on the inner cylindrical section side comes into contact with the flat cable passing through the inner circumferential passage and at least one portion of each roller on the outer cylindrical section side comes into contact with the bottom plate section of the stationary body.

When the cable reel is composed as described above, the ring for holding the rollers is not arranged in a lower portion of the rollers but arranged in an intermediate portion of the rollers, which is unlike the conventional structure. Therefore, thickness of the guide member for guiding the flat cable becomes the same thickness as the thickness (height) of the rollers. Accordingly, the thickness of a product can be reduced.

When each roller is tilted, the inner cylindrical section side of the roller comes into contact with the flat cable which is a rotating object, and the outer cylindrical section side of the roller comes into contact with the stationary body which is a fixed object. Therefore, the above two contact positions are symmetrical to each other with respect to the rotary axis. Accordingly, the roller can be smoothly, stably rotated, and it becomes possible to reduce frictional resistance caused between the stationary body and the rollers. At the same time, irregular fluctuation of torque can be reduced.

The present invention provides a cable reel in which the ring has bearing holes arranged at predetermined intervals in the circumferential direction, the roller is formed into a bobbin-shape in which an annular recess portion at an intermediate portion in the axial direction of the roller is interposed between an upper and a lower large diameter portion, the annular recess portion of the roller is rotatably engaged in the bearing hole of the ring, a lower end portion of the roller on the outer cylindrical section side comes into contact with the bottom plate section under the condition that the inner cylindrical section side of the roller is raised from the bottom plate section, and the inner cylindrical section side of the roller comes into contact with the flat cable.

When the shape of each roller and the shape of the ring for holding the rollers are formed as described above, the rollers can be attached to the ring only by inserting the annular recess portion of each roller into the bearing hole of the ring. Due to the above structure, it becomes unnecessary to provide pins, which are conventionally used and protruded to hold the rollers. Further, it becomes unnecessary for the rollers to be fastened by bolts. Accordingly, the number of parts and the number of working steps can be reduced.

When the axial line of each roller is tilted, only the outer cylindrical section side of the lower end face of each roller comes into point-contact with the bottom plate section while the inner cylindrical section side of the lower end face of each roller is rising from the bottom plate. Accordingly, it is possible to decrease a contact area of the bottom plate section with the rollers, which enables to greatly reduce contact friction.

The present invention provides a cable reel in which the axis of the roller is tilted to the outer cylindrical section side by the tilting angle of not less than 3° and not more than 20° with respect to the normal line of the bottom plate section.

The tilting angle range is determined as described above for the following reasons. When the tilting angle is too large, height and width of the roller are increased. When the tilting angle is too small, the contact area of the bottom plate section with the roller is increased, which excessively increases a frictional force.

It is preferable that one portion of each roller is made to come into contact with the roof section of the movable body.

When one portion of each roller is made to come into contact with the roof section as described above, each roller is interposed between the top and the bottom. Therefore, no rattle is caused in the vertical direction and the generation of noise can be prevented.

Since each roller is tilted, a contact position of the roof plate with the roller is located at the inner cylindrical section side. Since the inner cylindrical section side of the roller comes into contact with the flat cable which is a rotating object, the roller can be stably rotated if the movable body, which is a rotating body in the same manner, is made to come into contact with the upper portion of the roller.

It is preferable that a groove is formed at least one of the bottom plate section and the roof plate section, and an edge portion of the roller is rotatably inserted into and engaged with the groove. It is preferable that the groove is formed on the bottom plate so that the roller can be surely contacted with the bottom plate. In the case where the roller is also contacted with the roof plate, the groove may be also formed on the roof plate. In this connection, of course, the grooves may be formed on both the bottom plate and the roof plate.

When the groove is formed on the bottom plate or roof plate as described above and a lower end edge of the roller on the outer cylindrical section side or an upper end edge of the roller on the inner cylindrical section side is inserted into the groove, the above roller and ring are not idly moved in the annular hollow section in the radial direction. Therefore, it is possible to prevent the occurrence of rattle and noise, and the roller and the stationary body positively come into contact with each other, and the rollers can be stably rotated.

An upper and a lower large diameter portion interposing the annular recess portion may be formed into a cone-shape, the diameter of which is reduced downward, and the inner cylindrical section side of the upper and the lower large diameter portion of the roller may come into line-contact with the flat cable passing through the inner circumferential passage while the inner cylindrical section side of the upper and the lower large diameter portion is kept parallel with the inner cylindrical section.

The flat cable accommodated in the annular hollow section being wound in an inversion state can be easily extended in the outer circumferential direction (diameter expanding direction) by its rigidity.

Therefore, as described above, when outer faces of the upper and the lower large diameter portion of the roller, the axis of which is tilted, are inclined being formed into a conical shape, while the circumferential faces on the inner cylindrical section side of the upper and the lower large diameter portion are kept parallel with the axis of the inner cylindrical section (that is, the circumferential faces on the inner cylindrical section side of the upper and the lower large diameter portion are kept in the normal line direction of the bottom plate), the roller is made to come into not point-contact but line-contact with the upper and the lower side portion in the width direction (height direction) of the flat cable in the inner circumferential passage. Due to the foregoing, it is possible to prevent the flat cable from expanding in the outer circumferential direction.

A spring may be protruded from an outside circumferential edge of the bearing hole provided in the ring, and the outer cylindrical section side of the lower large diameter portion of the roller may be pushed downward by the spring.

When the spring is provided as described above, it becomes possible to reduce the occurrence of rattle between the rollers and the ring, and further it is possible to suppress the occurrence of rattle between the bottom plate and the sliding section. Accordingly, the roller can be smoothly rotated, and the occurrence of noise can be prevented.

A slit may be formed in an outer circumferential edge of the bearing hole provided in the ring.

When the above slit is provided, the periphery of the bearing hole can be easily bent. Therefore, even when the roller is pinched by the movable body and stationary body in the vertical direction, the bearing hole is bent, so that the tilting angle can be changed. As a result, the roller height is flexibly changed. Therefore, the roller and ring can be accommodated in the annular hollow section without being damaged.

The bearing hole of the roller formed in the above ring is formed being communicated with a cut-out groove which is formed being cut out at the inner circumferential edge or outer circumferential edge of the ring, and the annular recess portion of the roller is attached from the side portion while it is made to pass through the cut-out groove. When the above structure is adopted, the roller can be attached into the bearing hole of the ring by one-touch motion.

In this connection, the roller may be split into two, and the thus split pieces of the roller may be incorporated into the bearing hole, which is formed penetrating the ring, from the top and the bottom.

The present invention provides a cable reel comprising: a cylindrical stationary body and a movable body combined with each other to define an outer cylindrical section, inner cylindrical section, bottom plate section and roof plate section surrounding an annular hollow section; a guide member disposed in the annular hollow section, the guide member including a C-shaped ring and a plurality of rollers spaced apart from each other and rotatably supported by the ring; and a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers, wherein a winding direction of the flat cable in the inner circumferential passage is inverted to that of the flat cable in the outer circumferential passage; each roller has a conical shaft portion between an upper and a lower large diameter portions, the outer diameters of which are different from each other; an inner circumferential face of each bearing hole formed in the ring in the circumferential direction at regular intervals is tapered to be engaged with a conical shaft portion of the roller; and an upper and a lower attaching position of the roller are restricted with respect to the bearing hole of the ring.

When the cable reel is composed as described above, the ring for holding the rollers are not arranged in a lower portion of the rollers but arranged in an intermediate portion of the rollers, which is unlike the conventional structure. Therefore, thickness of the guide member for guiding the flat cable becomes the same thickness as the thickness of the rollers. Accordingly, the thickness of a product can be reduced.

Further, the intermediate shaft is provided in the roller and supported in the bearing hole of the ring. Therefore, it is unnecessary to protrude a pin for holding the roller like the conventional structure, and further it is unnecessary to fasten the roller with a bolt. Accordingly, the number of parts can be reduced, and the number of working steps required for attaching work can be reduced.

The above roller has the upper and the lower large diameter portions. Further, the outer diameter of the roller is changed, and a contact position of the roller outer circumferential face with the bottom plate and/or roof plate and a contact position of the roller outer circumferential face with the flat cable are set.

Therefore, when positions of the upper and the lower large diameter portions with respect to the ring are turned upside down, the roller does not come into contact with the flat cable at a predetermined position, which might cause damage on the flat cable.

On the other hand, as described above, when the bearing hole of the ring and the intermediate shaft of the roller are tapered and engaged with each other, the upper and the lower position of the roller can be restricted. If a worker mistakes the assembling direction of the roller, it is impossible to engage the roller with the bearing hole. Accordingly, it is possible to prevent the roller from being attached upside down.

The above roller may be of the one body type. Alternatively, the above roller may be divided into an upper member and a lower member, that is, the above roller may be composed of two members.

In the case where the roller is divided into the upper member and the lower member, a conical shaft section, the diameter of which is reduced toward a forward end portion, is protruded from one end face of one of the rollers, an engaging pawl is protruded from a forward end outer circumferential face of the conical shaft section, and the other roller is formed into a cylindrical shape and an engaging hole is formed at the center of a bottom face.

When the roller is divided into the upper and the lower roller as described above, it becomes possible to assemble the rollers from an upper and a lower position while the bearing hole in the ring is formed into a through-hole.

Instead of the structure in which the conical shaft is provided in the roller and the bearing hole is tapered, a stopper section may be protruded upward or downward from an outer circumferential edge of the ring in the radial direction from the bearing hole, and when a vertical position of the roller is not normal, it becomes impossible to assemble the roller because the roller on the large diameter side interferes with the stopper section, so that the vertical attaching positions of the rollers are restricted with respect to the ring.

In this case, the shaft protruding from one of the rollers may have the same diameter, and it is unnecessary to make the bearing hole to be tapered.

In any case of the one body type roller or the split type roller, a diameter of the upper large diameter portion is larger than that of the lower large diameter portion, outer circumferential faces of the upper and the lower large diameter portion are tapered, when the roller is assembled to the ring, an axis of the roller is tilted so that a lower end edge on the outer cylindrical section side of the lower large diameter portion comes into contact with the bottom plate and the inner cylindrical section side is raised from the bottom plate and further outer circumferential faces on the inner cylindrical section side of the upper and the lower large diameter portion become parallel with the inner cylindrical section and come into line-contact with an upper and a lower side of the flat cable passing through the inner circumferential passage.

When each roller is tilted, the inner cylindrical section side of the roller comes into contact with the flat cable which is a rotating object, and the outer cylindrical section side of the roller comes into contact with the bottom plate of the stationary body. Therefore, the above two contact positions are symmetrical to each other with respect to the rotary axis. Accordingly, the roller can be smoothly, stably rotated, and it becomes possible to reduce frictional resistance caused between the stationary body and the rollers. At the same time, irregular fluctuation of torque can be reduced.

A lower end face of each roller at a lower end edge on the outer cylindrical section side comes into point-contact with the bottom plate section while a lower end face of each roller on the inner cylindrical section side is rising from a bottom plate. Accordingly, it is possible to decrease a contact area of the bottom plate section with the rollers, which enables to greatly reduce contact friction.

It is preferable that lubricant is coated on the bottom plate or a sliding sheet is stuck on the bottom plate so as to reduce sliding friction between the bottom plate and the roller.

A tilting angle of the roller axis is tilted toward the outer cylindrical section side by an angle in the angle range nor less than 3° and not more than 20° with respect to the normal line of the bottom plate.

The reason why the tilting angle of the roller axis is set in the above angle range is described as follows. When the tilting angle is too large, the height and width of the roller are increased. When the tilting angle is too small, a contact area of the roller with the bottom plate is extended, and an intensity of frictional force is increased too high.

It is preferable that an upper end edge on the inner cylindrical section side of the upper large diameter portion of each roller is made to come into contact with the roof section composed of the movable body.

When one portion of each roller is made to come into contact with the roof section as described above, each roller is interposed between the top and the bottom. Therefore, no rattle is caused in the vertical direction and generation of noise can be prevented.

When the axis of each roller is tilted, and the outer circumferential faces of the upper and the lower large diameter portions are tapered, the inner cylindrical section side portions of the upper and the lower large diameter portions can be made to be parallel with the inner cylindrical section and come into line-contact with the flat cable.

The flat cable, which is wound in an inverse state and accommodated in the annular hollow section, is easily extended in the outer circumferential direction (diameter expanding direction) due to the rigidity.

Therefore, when the upper and the lower large diameter portions of the roller are made to come into not point-contact but line-contact with the upper and the lower side portions in the width direction (height direction) of the flat cable, it becomes possible to prevent the flat cable from expanding in the outer circumferential direction.

When a thick section is provided in the periphery of each bearing hole formed in the ring and when an upper and a lower face of the thick section are contacted with opposing faces of the upper and the lower large diameter portions, the occurrence of rattle between the ring and the roller can be prevented.

It is preferable that a groove is formed at at least one of the bottom plate section and the roof plate section, and an edge portion of the roller is rotatably inserted into and engaged with the groove. It is preferable that the groove is formed on the bottom plate so that the roller can be surely contacted with the bottom plate. In the case where the roller is also contacted with the roof plate, the groove may be also formed on the roof plate. In this connection, of course, the grooves may be formed on both the bottom plate and the roof plate.

When the groove is formed on the bottom plate or roof plate as described above and a lower end edge of the roller on the outer cylindrical section side or an upper end edge of the roller on the inner cylinder side is inserted into the groove, the above roller and ring are not idly moved in the annular hollow section in the radial direction. Therefore, it is possible to prevent the occurrence of rattle and noise, and the roller and the stationary body positively come into contact with each other, and the rollers can be stably rotated.

The present invention provides a cable reel comprising: a stationary body and a movable body combined with each other to define an outer cylindrical section, inner cylindrical section, bottom plate section and roof plate section surrounding an annular hollow section; a guide member disposed in the annular hollow section, the guide member including a C-shaped ring and a plurality of rollers spaced apart from each other and rotatably supported by the ring; and a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers, wherein a winding direction of the flat cable in the inner circumferential passage is inverted to that of the flat cable in the outer circumferential passage; the ring rotatably holds an intermediate portion of each roller, height of each roller in the axial direction is changed, some of the rollers are tall rollers, the height in the axial direction of which is large, so that the upper and the lower end portions of the rollers can be contacted with the bottom plate section and the roof plate section, the other rollers are short rollers, the height of which is smaller than that of the tall rollers, so that the upper and the lower end portions of the short rollers can not be contacted with the bottom plate section and the roof plate section, and at least one portion of the short roller on the inner cylindrical section side comes into contact with the flat cable passing through the inner circumferential passage.

The ring holds the tall roller so that the axis of the tall roller on the roof side can be tilted to the outer cylindrical section side with respect to the normal line of the bottom plate and an upper end edge of the tall roller on the inner cylindrical section side can be contacted with the roof plate and further a lower end edge of the tall roller on the outer cylindrical section side can be contacted with the bottom plate.

Alternatively, the tall roller is not tilted, and an upper end of the tall roller is slidably contacted with the roof plate and further a lower end is slidably contacted with the bottom plate via a sliding sheet or sliding material.

When the above structure is adopted, unlike the conventional structure, the ring for holding the roller is not arranged below the roller but arranged in an intermediate portion of the roller. Therefore, the thickness of the guide member for guiding the flat cable is determined only by the thickness of the roller. Therefore, the thickness of a product can be reduced.

Concerning the roller, the high and the short roller are provided. Only the tall roller is contacted with the bottom plate and roof plate, and the guide member is arranged in the annular hollow section. On the other hand, the short roller is not contacted with the bottom plate and roof plate but contacted with only the flat cable. Therefore, the short roller is not given a contact frictional resistance caused by the contact with the bottom plate, which is fixed, that is, the short roller can be smoothly rotated by the contact with the flat cable. Since the short roller is smoothly rotated, the torque required for rotating the flat cable can be reduced.

The short roller may be attached to the ring being tilted, and either the upper edge or the lower edge of the outer circumference of the short roller may be contacted with the flat cable. However, when the short roller is attached to the ring not being tilted but contacted with the flat cable by the entire height of the roller, the short roller can be stably rotated.

Since the short roller is not contacted with the bottom plate and roof plate, sliding noise, which is generated by the contact with the bottom plate and roof plate, is not generated from the short roller while it is rotating. Further, since the upper and lower edges of the tall roller are contacted with the bottom plate and roof plate, rattle of the guide member is not caused in the vertical direction. Further, the occurrence of noise can be prevented.

Two tall rollers are arranged symmetrically to each other with respect to the central axis of the annular hollow section, and the lower rollers are arranged between the tall rollers at regular intervals.

Since the tall roller is provided for stably supporting the guide member in the annular hollow section, at least two tall rollers may be arranged symmetrically to each other. It is preferable that the other groups of rollers are formed into the short rollers, which are contacted with the flat cable so as to guide the rotation of the flat cable.

The tall roller is tilted so that the height of tall roller can be a little larger than the height of the annular hollow section, and when the tall roller is accommodated in the annular hollow section, the ring is twisted due to the contact of the tall roller with the bottom plate and roof plate, so that the tall roller can be tilted by an angle gentler than the tilting angle of the roller before it is accommodated.

When the above structure is adopted, the ring is twisted by an appropriate angle due to the correlation between the height of the tall roller and the height of the annular hollow section, which enhances the application of the ring. Since the tall roller is elastically restricted from the top and the bottom, it can be stably rotated without causing any rattle, and it becomes possible to flexibly accommodate the guide member without being damaged.

A slit may be formed in the outer circumferential edge of the bearing hole used for the tall roller arranged in the ring.

When the above slit is provided, the periphery of the bearing hole can be easily bent. Therefore, the tall roller can be easily twisted so that the tilting angle of the tall roller can be an appropriate value.

The roller is formed into a bobbin-shape in which an annular recess portion of an intermediate portion in the axial direction of the roller is interposed between an upper and a lower large diameter portion, a roller insertion passage communicating with the bearing hole and open to the inner circumferential edge or outer circumferential edge is formed in the ring, and the annular recess portion of the roller is rotatably engaged with the bearing hole through the roller insertion passage.

When the above structure is adopted, the roller can be attached to the ring by one-touch motion. Therefore, the assembling property can be enhanced.

In this connection, the above roller may be divided into an upper and a lower roller at a position of the intermediate annular recess portion, and the bearing hole of the ring is formed into a through-hole. The upper and the lower roller may be incorporated into the bearing hole from both sides of the top and bottom and fixed being locked.

A spring section may be protruded from the circumferential edge of the bearing hole of each roller provided in the ring, and the upper and the lower large diameter portion of the rollers may be pushed to the bottom plate contact side and the roof plate contact side by the spring section.

When the above spring section is provided, it is possible to prevent the occurrence of rattle between the tall roller and the bottom and roof plates. Further, it is possible to prevent the occurrence of rattle between the lower roller and the ring.

The present invention provides a cable reel comprising: a stationary body and a movable body combined with each other to define an outer cylindrical section, inner cylindrical section, bottom plate section and roof plate section surrounding an annular hollow section; a guide member disposed in the annular hollow section, the guide member including a C-shaped ring and a plurality of rollers spaced apart from each other and rotatably supported by the ring; and a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers, wherein a winding direction of the flat cable in the inner circumferential passage is inverted to that of the flat cable in the outer circumferential passage; a roller attaching section is arranged in the ring in the circumferential direction at intervals; an upper roller, which comes into contact with a roof plate section of the annular hollow section and does not come into contact with a bottom plate section, is attached to the roller attaching section; a lower roller, which comes into contact with the bottom plate section of the annular hollow section and does not come into contact with the roof plate section, is attached to the roller attaching section; and at least one portion of the upper and lower rollers is made to come into contact with the flat cable passing through the inner circumferential passage.

When the above structure is adopted, the upper roller of the guide member comes into contact with the roof plate section (roof face) of the annular hollow section, and the lower roller of the guide member comes into contact with the bottom plate section (bottom face) of the annular hollow section. Therefore, the guide member is interposed between the top and the bottom. Accordingly, rattle of the roller is not caused in the vertical direction, and the occurrence of noise can be prevented.

Unlike the conventional structure in which the ring for holding the upper and the lower roller is arranged on the bottom face of the annular hollow section below the rollers, the ring is arranged in a central space of the annular hollow section at the intermediate portion between the upper and the lower roller. Accordingly, the thickness of the bottom plate is not increased, and the thickness of a cable reel product can be reduced.

Further, according to the conventional structure, the roller height is a little smaller than the height of the annular hollow section. On the other hand, according to the present invention, the height of the upper roller and that of the lower roller are reduced and the size of the cable reel is reduced in such a manner that a big space is formed between the upper roller and the bottom face and further a big space is formed between the lower roller and the roof face. Accordingly, the weight of the cable reel can be reduced.

When the guide member does not rattle, it becomes possible to form a big space in the lower portion of the upper roller and also it becomes possible to form a big space in the upper portion of the lower roller. Therefore, the height of the upper roller and that of the lower roller are substantially reduced to $2/3$ of the height of the annular hollow section. Due to the foregoing, the roller can be downsized, and the weight of a cable reel product can be reduced.

The shape of the upper roller and that of the lower roller are identical with each other, and the height of the roller is substantially not more than $2/3$ of the height of the annular hollow section.

It is preferable that the upper and the lower roller are alternately arranged upside down. When the upper and the lower roller are alternately arranged, the guide member can be stably positioned in the vertical direction.

Step portions are provided on the ring in the circumferential direction, the upper roller is attached to the roller attaching section provided in the upper step portion, and the lower roller is attached to the roller attaching section provided in the lower step portion.

Since a required height of the upper roller is the distance from the roof face to the ring (roller attaching direction) and a required height of the lower roller is the distance from the bottom face to the ring (roller attaching direction), when a step portion is provided in the ring, the above distances can be decreased irrespective of the height of the annular hollow section. Further, the roller can be downsized.

The upper and lower rollers are formed into a shape in which an annular recess portion is provided between the upper and the lower large diameter portion, the height on one side of the upper and lower large diameter portions is large so that the roller can come into contact with the roof face or bottom face, the height of the other side is small so that a space can be formed between the roller and the roof face or bottom face, a bearing hole is formed as a roller attaching section of the ring, and the annular recess portion is rotatably inserted and attached into the bearing hole.

When the above structure is adopted, the roller attaching section is simply composed in such a manner that holes are formed in the ring, and the annular recess portion of each roller is engaged in the bearing hole and prevented from coming out the bearing hole. Therefore, the guide member can be easily handled and more positively incorporated into the annular hollow section.

In this connection, concerning the method of preventing the roller from coming out, it is a conventional method that the roller is fastened by a bolt. However, when the above structure is adopted, it is unnecessary to use the above specific parts. Therefore, the number of parts can be reduced, and further the number of mandays for attaching can be also reduced.

The bearing hole formed in the ring is formed being communicated with the cutout groove which is cut out from the inner circumferential end or outer circumferential end of the ring, and the annular recess portion of the roller is attached into the bearing hole from the side through the cutout groove. In this way, the roller can be attached to the bearing hole by one-touch motion.

On the other hand, when the roller is divided into two rollers, the thus divided two rollers are respectively incorporated into the bearing hole formed in the ring from the top and the bottom. In this way, the structure of incorporating the roller into the ring can be simplified, in which only the bearing holes are formed in the ring.

The roller attaching section of the ring is formed into a support shaft protruding from an upper and a lower face of the ring, the upper and the lower roller are formed into a shape in which a bearing hole open to the roller attaching side is provided, and the support shaft of the roller attaching section is rotatably engaged in the bearing hole.

When the above structure is adopted, only when the support shafts of the ring are inserted into the bearing holes of the upper and the lower roller, the rollers can be held. Therefore, it becomes unnecessary that the height of the upper roller is set at the distance from the roof plate to the ring, and also it becomes unnecessary that the height of the lower roller is set at the distance from the bottom plate to the ring. Accordingly, the cable reel can be downsized and further the weigh of the cable reel can be reduced.

The upper and the lower roller are attached to the ring while the axis of the roller is being tilted, and edges of the upper and the lower face of the upper and the lower roller are respectively contacted with the roof face and the bottom face. Then, the contact portion is put into a point contact condition. Therefore, it is possible to reduce a contact area of the roof face with the upper roller, and also it is possible to reduce a contact area of the bottom face with the lower roller. Accordingly, the friction of contact can be greatly reduced. As a result, the flat cable slidably coming into contact with the upper and the lower roller can be smoothly rotated.

The roof face and the bottom face are formed into a portion of the stationary body, the axis of the roller coming into contact with the roof face is tilted from the bottom face in the upper inner direction, and the axis of the roller coming into contact with the bottom face is tilted in the upper outer direction, so that an outer cylinder side edge of the roller comes into contact with the roof face or the bottom face.

When the roller is tilted in the above direction, the inner cylinder side of the roller comes into contact with the flat cable which is a rotary body, and the outer cylinder side of the roller comes into contact with the roof face or bottom face which is a stationary body. That is, the above two contact positions become symmetrical to each other with respect to the axis. Therefore, the roller can be smoothly and stably rotated, and further frictional resistance of the stationary body with the roller can be reduced and furthermore irregular fluctuation of torque can be reduced.

In this connection, in the case where the roller is simultaneously contacted with the bottom and the roof face, the lower outer edge of the roller comes into contact with the bottom face, and the lower inner edge of the roller comes into contact with the flat cable. Therefore, the upper end inner edge of the roller comes into contact with the roof face. In this case, the upper end inner edge and the lower end inner edge are located on the same side with respect to the roller axis. Therefore, the roof face must be a movable body which is the same rotary body as the flat cable. However, according to the present invention, the upper roller does not come into contact with the bottom face. Therefore, the present invention can be preferably applied to a case in which the roof face is a stationary body.

In this connection, the axes of the upper and the lower roller may not be tilted but the axes may be made perpendicular to the roof and the bottom face, and one end face of the upper roller and that of the lower roller may be respectively made to come into surface-contact with the roof face or the bottom face. In this case, it is preferable that the roof and the bottom face are coated with lubricant or covered with a sliding sheet so that the sliding friction with the upper and the lower roller can be reduced.

DETAILED DESCRIPTION OF THE PRESENT INVENTION

Figure 1:
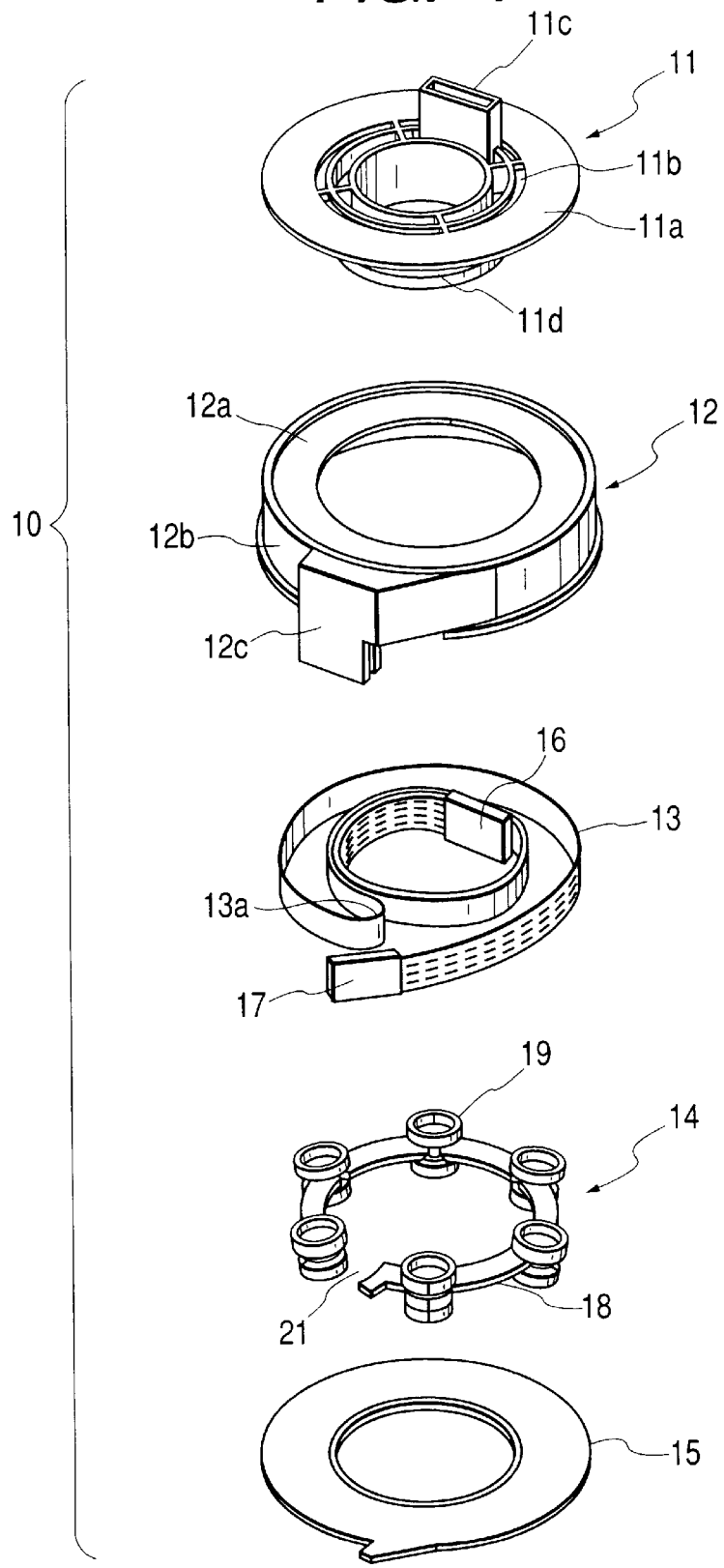
FIG. 1 is an exploded perspective view of a cable reel of a first embodiment of the present invention.

Referring to the drawings, embodiments of the present invention will be explained below.

FIGS. 1 to 4C are views showing a first embodiment.

In the cable reel 10 of the first embodiment, the stationary body 20, which constitutes an outer cylinder, having an outer frame 12 and bottom plate 15, and the movable body 11, which becomes an inner cylinder, are connected with each other being capable of relatively rotating.

The movable body 11 includes: an inner cylindrical section 11d which becomes an inner cylinder; a first roof plate section 11a, the shape of which is annular, protruding from an upper end of the inner cylindrical section lid being formed into a flange-shape; an annular recess section 11b provided in the first roof plate section 11a on the inner cylindrical section 11d side; and a connector accommodating section 11c protruding upward from an upper end of the inner cylindrical section 11d.

The outer frame 12 of the stationary body 20 includes: an outer cylindrical section 12b which becomes an outer cylinder; a second roof plate section 12a, which is formed annular, protruding inward from an upper end of the outer cylindrical section 12b; and a connector accommodating section 12c protruding downward from an outer face of the outer cylindrical section 12b. The bottom plate 15 is an annular plate which becomes a bottom plate section of the cable reel 10. This bottom plate section 15 is locked and fixed at the outer frame 12.

In the annular hollow section 24 formed between the movable body 11 and the stationary body 20, there is rotatably provided a guide member 14 in which six rollers 19 are attached to the C-shaped ring 18 at regular intervals.

Inside the annular hollow section 24, the flat cable 13, one connector 16 of which is engaged with the connector accommodating section 11c of the movable body 11, is wound around the inner circumferential passage I formed between the inner circumferential side of the guide member 14 and the outer circumferential face of the inner circumferential wall 11d of the movable body 11. While an intermediate portion of the flat cable 13 is determined to be an inversion section 13a, the flat cable 13 is threaded into the inversion space 21 formed between the end portions of the ring 18 of the guide member 14. Then, the flat cable 13 is wound back in the outer circumferential passage II formed between the outer circumferential side of the guide member 14 and the inner circumferential face of the outer cylindrical section 12b. The connector 17 of the other end of the flat cable 13 is accommodated in the connector accommodating section 12c of the upper case 12.

Figure 3:
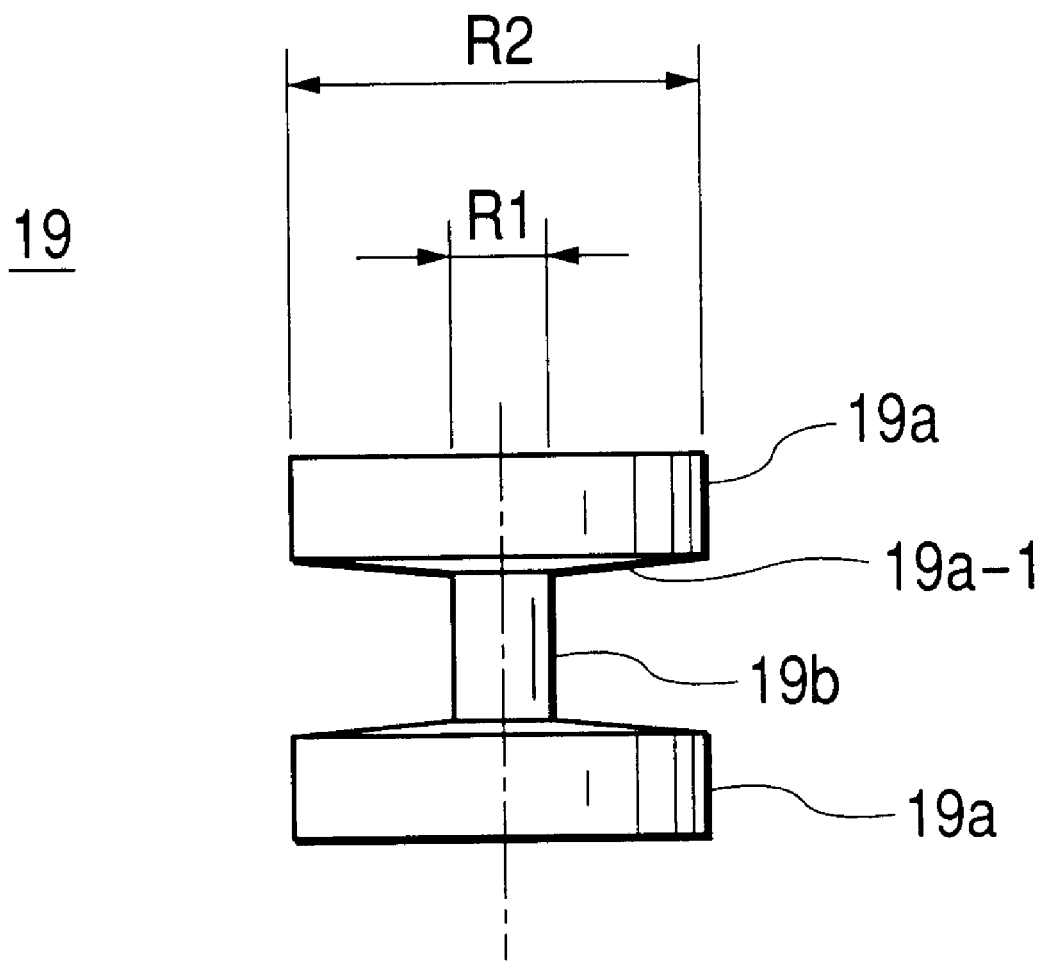
FIG. 3 is a front view of a roller of the first embodiment.

As shown in FIG. 3, the roller 19 is formed into a bobbin-shape in which the annular recess section 19b in the intermediate section in the axial direction is interposed between the upper and the lower large diameter portion 19a. The opposing faces 19a-1 of the upper and the lower large diameter portion 19a are protruded from the outer circumferences being tapered, and the central portions are flat.

Figure 4A:
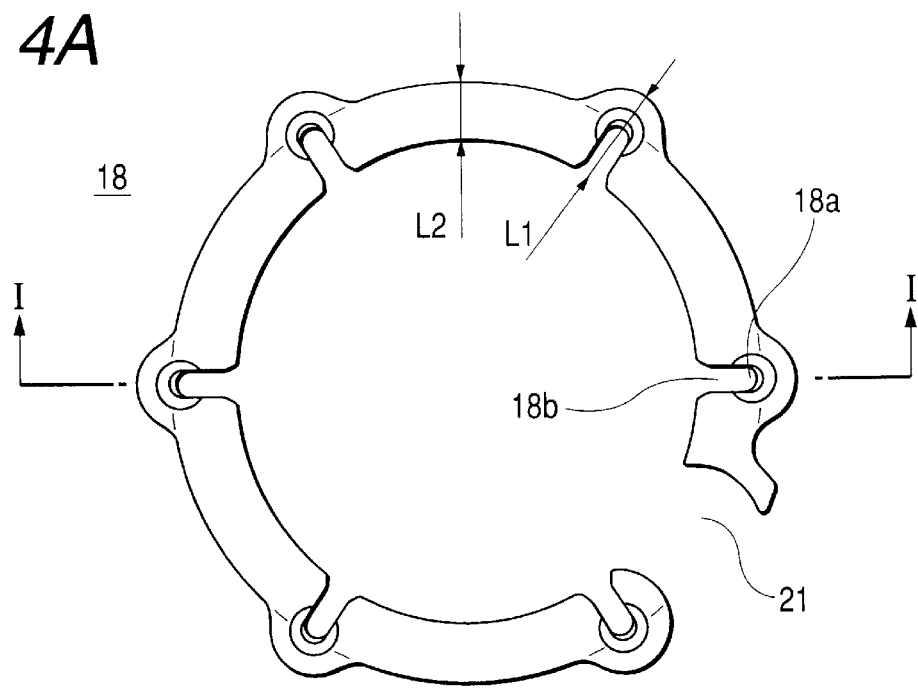
FIG. 4A is a plan view of a ring of the first embodiment.

As shown in FIG. 4A, the ring 18 is formed into a C-shape having the inversion space 21. In the ring 18, there are provided six bearing holes 18a which are located in the circumferential direction at regular intervals. Each bearing hole 18a is cut out and opened at the inner circumferential end of the ring 18 and communicated with the roller insertion section 18b.

Figure 4B:
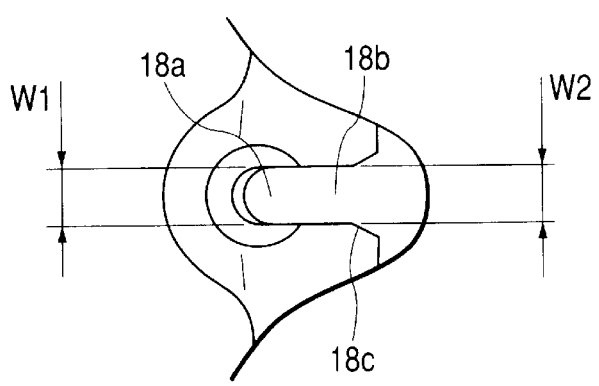
FIG. 4B is an enlarged view showing a primary portion.

Width W1 of the bearing hole 18a shown in FIG. 4B is set to be a little larger than outer diameter R1 of the annular recess section 19b of the roller 19. On the other hand, width W2 of the roller insertion section 18b is set to be a little smaller than outer diameter R1 of the annular recess section 19b of the roller 19, and the entrance section 18c open at the inner circumferential end of the roller insertion section 18b is expanded being tapered.

Figure 4C:
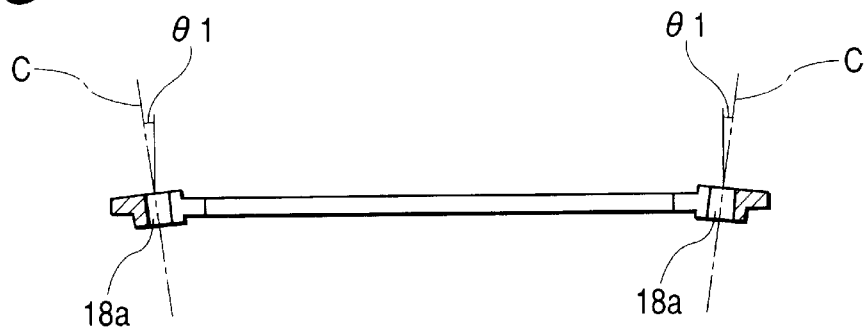
FIG. 4C is a sectional view taken on line I—I in FIG. 4A.

As shown in FIG. 4C, axis C of the bearing hole 18a is tilted by the angle θ1 with respect to the normal line of the ring 18 so that axis C can be tilted outside. The angle θ1 is set in the range of 3°<θ1<20°, and it is preferable that the angle θ1 is set in the range of 5°<θ1<10°.

In this case, the inequality of L2<L1<R2 is established, wherein L1 is the width of a portion of the ring 18 in which the bearing hole 18a is formed, L2 is the width of the other portions of the ring 18 and R2 is the outermost diameter of the roller 19. Therefore, the outer circumferential face of the roller 19 is protruded from the inner and outer circumferential faces of the ring 18.

The guide member 14 composed of the ring 18 and rollers 19. The ring 18 rotatably holds the rollers 19 when the annular recess portion 19b of each roller 19 is slidably inserted into the bearing hole 18a by one-touch motion from the roller insertion section 18b of the ring 18. When width W2 of the roller insertion section 18b is made to be a little smaller than outer diameter R1 of the annular recess section 19b, the roller 19 can be prevented from coming out.

Figure 2A:
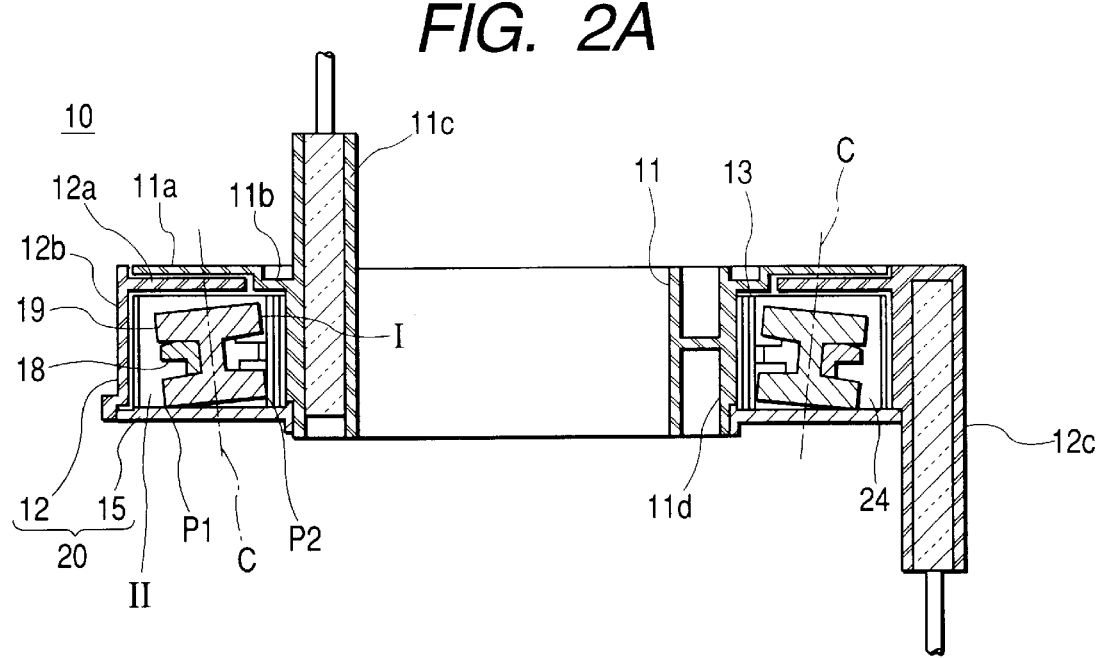
FIG. 2A is a vertical sectional view of a cable reel of the first embodiment.

As shown in FIG. 2A, when the guide member 14 is accommodated in the annular hollow section 24 in the above state, since the bearing hole 18a is tilted, the roller 19 is also tilted. Therefore, an outside lower end edge of the roller 19 comes into point-contact with the bottom plate 15 at point P1, and an inside lower end edge of the roller 19 comes into point-contact with the flat cable 13 passing through the inner circumferential passage I at point P2.

Next, operation of the cable reel 10 will be explained below.

Figure 2B:
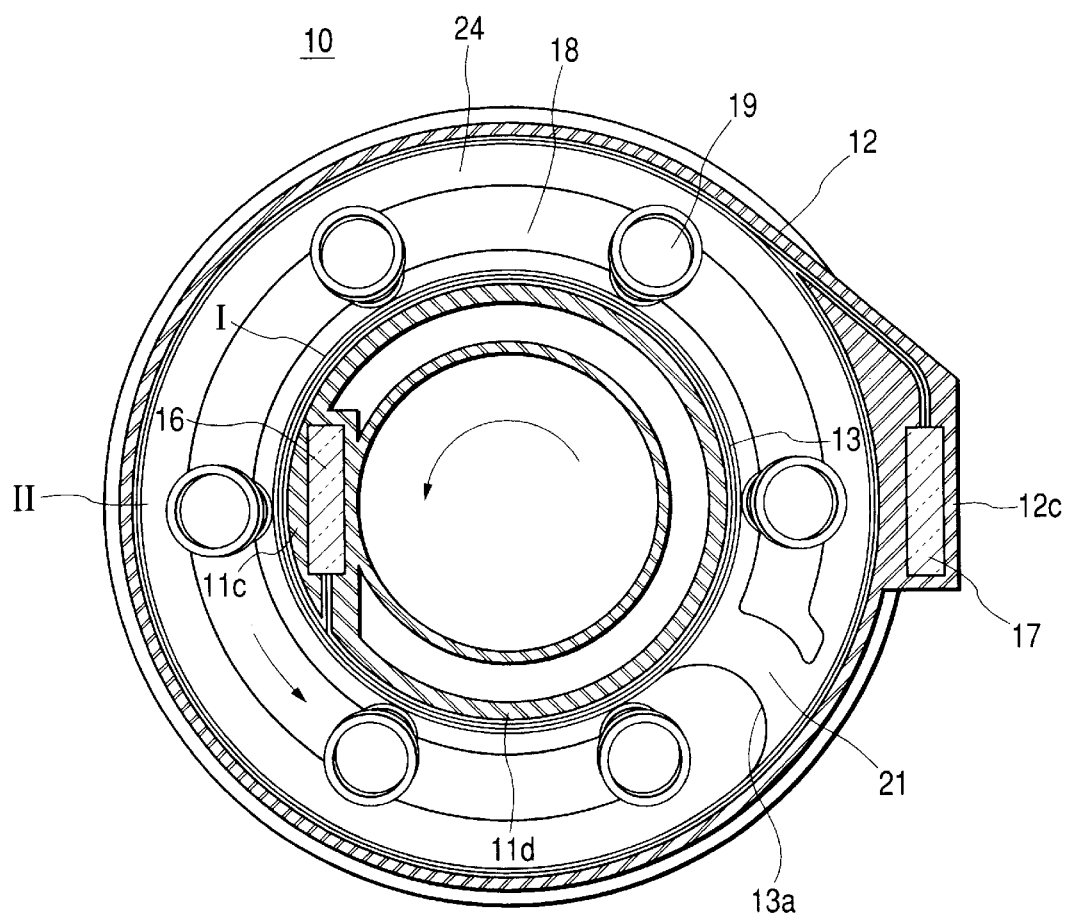
FIG. 2B is a horizontal sectional view.

As shown in FIG. 2B, when a steering shaft (not shown) is rotated, the movable body 11 is rotated in one direction (clockwise). Then the flat cable 13 is wound up. Therefore, the flat cable 13 in the outer circumferential passage II passes through the inversion space 21 being folded back, so that the flat cable 13 is wound up around the inner circumferential passage I. On the other hand, when the movable body 11 is rotated in the reverse direction (counterclockwise), the flat cable 13 is wound back. Then, the flat cable 13 in the inner circumferential passage I passes through the inversion space 21 being folded back, so that the flat cable 12 is sent out to the above outer circumferential passage II. Since the flat cable 13 in the inner circumferential passage I comes into contact with the roller 19 when the flat cable 13 is rotated, the roller 19 is also rotated. Therefore, frictional resistance of the roller 19 with the flat cable 13 is reduced. As a result, the torque can be reduced.

The roller 19 is attached being tilted, and point P1 at which the roller 19 comes into contact with the bottom plate 15, which is a stationary object, and point P2 at which the roller 19 comes into contact with the flat cable 13, which is a rotary object, are located symmetrically to each other with respect to the roller axis, and further these points P1 and P2 come into point-contact with the objects. Therefore, as if a drum can were rolled being tilted, the roller 19 can be stably rolled, and frictional resistance of the bottom plate 15 with the roller 19 can be greatly reduced, and further irregular fluctuation of the torque can be reduced.

When the intermediate portion of each roller 19 is held by the ring 18, it is unnecessary to provide a base plate which is conventionally attached to the bottom plate. Therefore, the thickness of the cable reel can be reduced by the thickness of the base portion of the base plate.

Further, in order to hold the roller 19 by the ring 18, only the bearing hole 18a and roller insertion section 18b are formed in the ring 18. Therefore, it is unnecessary to provide a support pin protruding from the base plate which is needed in the conventional structure. Therefore, the structure can be made simple and thin compared with the conventional base plate. Further, it is unnecessary to provide other parts such as bolts for holding the roller. Accordingly, the number of parts can be reduced, and the number of working steps for attaching the roller can be reduced.

In this connection, the roller insertion section 18b provided in the ring 18 is cut out on the inner circumferential side of the ring 18. Of course, the roller insertion section 18b provided in the ring 18 may be cut out on the outer circumferential side.

Figure 5:
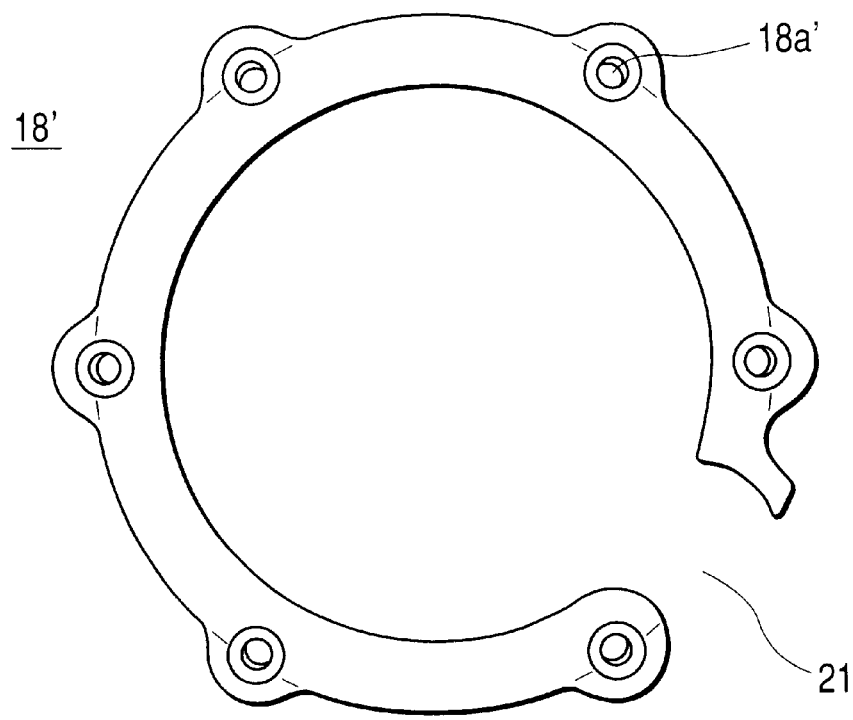
FIG. 5 is a plan view of a ring of a second embodiment.
Figure 6:
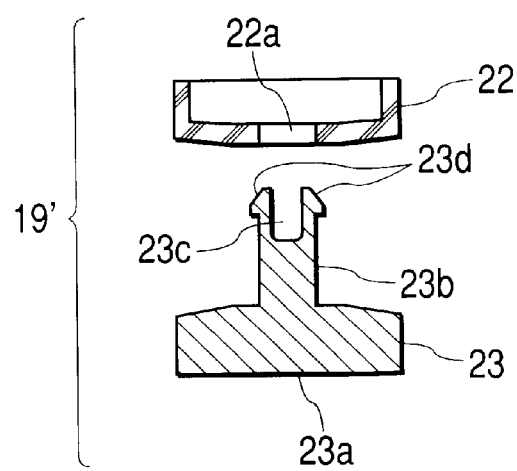
FIG. 6 is an exploded sectional view of a roller of the second embodiment.

FIGS. 5 and 6 are views showing a second embodiment.

Different points of the second embodiment from the first embodiment are described as follows. The bearing holes 18a' formed in the ring 18' are through-holes which penetrate the ring 18'. There are provided no roller insertion sections into which the rollers are inserted from the side. Each roller 19' is composed of two members which are attached into the bearing hole from the top and the bottom.

In the same manner as that of the first embodiment, the ring 18' is formed into a C-shape having the inversion space 21, and six bearing holes 18a' are formed at regular intervals in the circumferential direction. The axis of each bearing hole 18a' is tilted by a predetermined angle in the same manner as that of the first embodiment.

At the intermediate annular recess portion, the roller 19' is divided into the first roller 22 and second roller 23. In the first roller 22, which is arranged in an upper portion, there is provided an engaging hole 22a which is formed at the center of the bottom face of the large diameter cylindrical section. In the second roller 23, which is arranged in a lower portion, there is provided a small diameter shaft section 23b which is protruded from the center of the upper face of the large diameter portion 23a. At an upper end of the shaft section 23b, there is provided a recess section 23c, and further there is provided an engaging pawl 23d which is protruded from the outer circumference of the recess section 23c.

Concerning the above roller 19', the shaft 23a of the second roller 23 is inserted into the bearing hole 18a' from a lower portion while the recess portion 23c of the shaft section 23a of the second roller 23 is being bent by the recess portion 23c. After that, the engaging pawl 23d is engaged with the engaging hole 22a of the first roller 22 so that the first 22 and the second roller 23 can be integrated with each other into one body. Due to the foregoing, the bearing hole 18a' can be rotatably interposed between the first 22 and the second roller 23.

The shape and size of the roller 19', which is composed of the first 22 and the second roller 23, are the same as those of the roller 19 of the first embodiment. Concerning the ring 18', except for a point at which the roller insertion section is not cut out, the shape and size the ring 18' of this embodiment are the same as those of the first embodiment.

When the above structure is adopted, it is unnecessary to provide a roller insertion section communicated with the bearing insertion hole 18a'.

Figure 7:
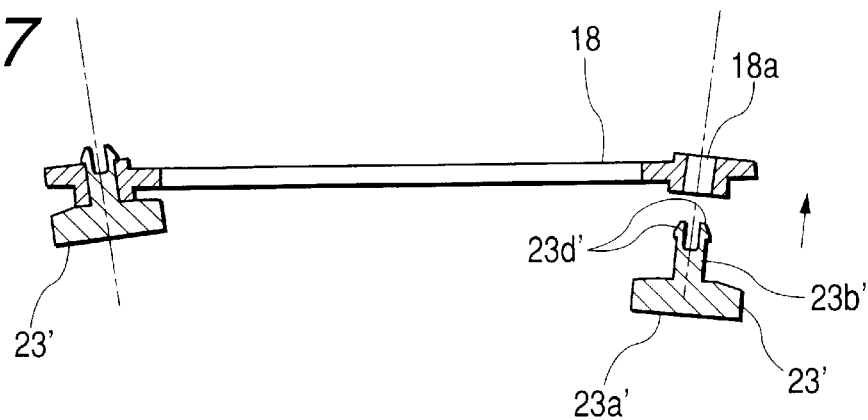
FIG. 7 is a sectional view of a variation of the second embodiment.

FIG. 7 is a view showing a variation of the second embodiment.

In this variation, the first roller, which is a large diameter portion arranged on the upper side, is not provided, but only the second roller 23', which is a large diameter portion arranged on the lower side, is provided.

The shape of the roller 23' is substantially the same as that of the roller 23 of the second embodiment, however, the length of the small diameter shaft 23b' is made to be substantially the same as the height of the bearing hole 18a.

The shaft 23b' of the roller 23' is inserted into the bearing hole 18a from a lower portion, and the engaging pawl 23d' is rotatably engaged with an upper end edge of the bearing hole 18a.

Due to the above structure, the roller can be composed of one member of the roller 23'. Therefore, the number of parts can be reduced. Further, the number of working steps for attaching the roller can be reduced.

FIGS. 8A to 10B are views showing a third embodiment.

Different points of the third embodiment from the first embodiment are described as follows. When each bearing hole 18a of the ring 18" is made to be easily bent, a tilting angle of the bearing hole 18a can be changed, and further an upper inner cylindrical section side edge of the roller 19 is made to come into contact with the roof plate so that the tilted roller 19 can be positioned being regulated in the vertical direction.

Figure 8A:
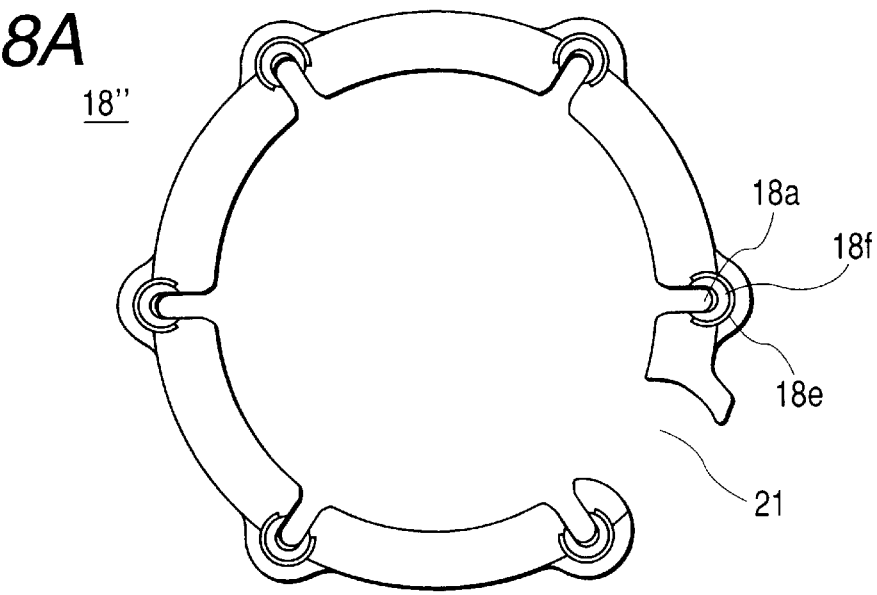
FIG. 8A is a plan view of a ring of a third embodiment.
Figure 8B:
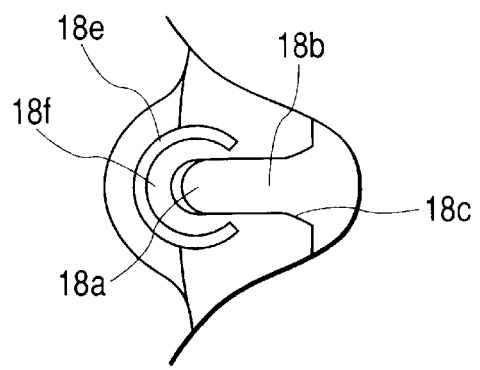
FIG. 8B is an enlarged view of a primary portion.

To be in more detail, as shown in FIGS. 8A and 8B, in the ring 18", a C-shaped slit 18e is cut out around the bearing hole 18a. Due to the foregoing, the C-shaped bend section 18f is formed between this slit 18e and the outer circumference of the bearing hole 18a.

Figure 10A:
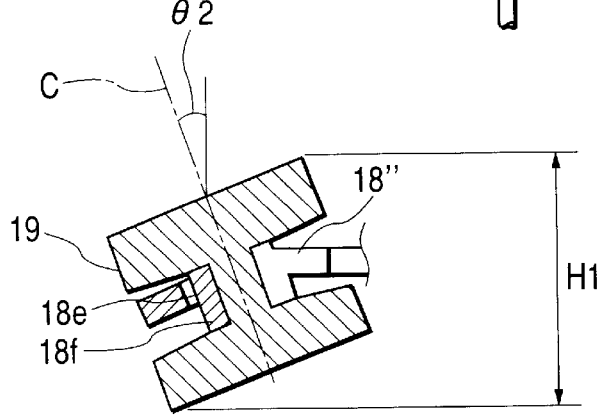
FIG. 10A is an enlarged sectional view of a primary portion of a guide member of the third embodiment before the guide member is accommodated.

As shown in FIG. 10A, before the roller 19 is accommodated in the annular hollow section 24, axis C of the roller 19 is tilted by the tilting angle θ2 with respect to the normal line of the ring 18, and the height from the lower end to the upper end of the roller is H1.

Figure 9:
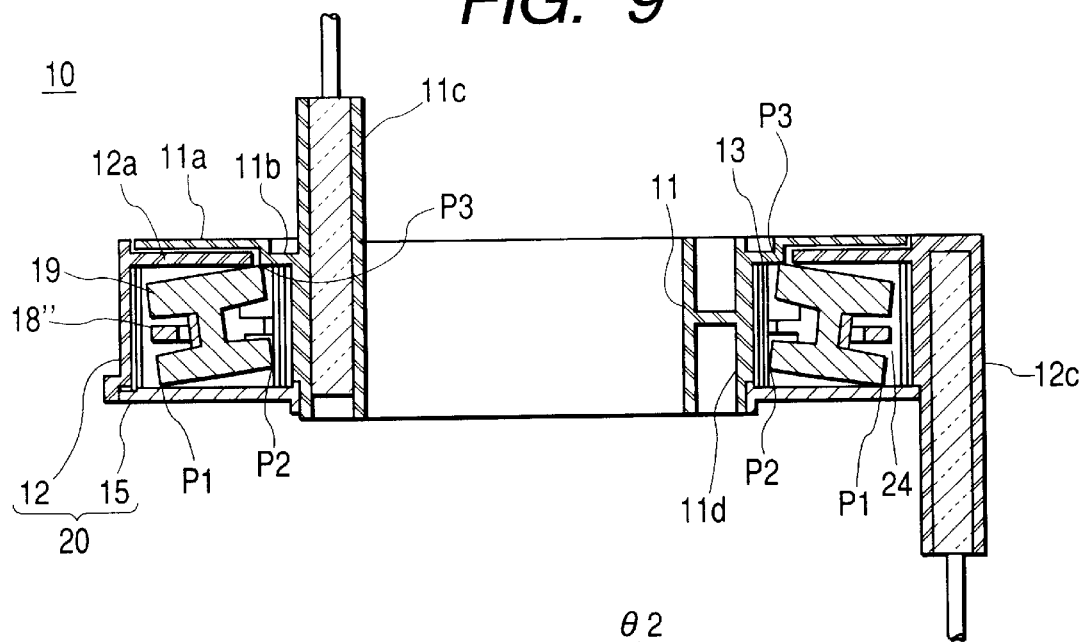
FIG. 9 is a vertical sectional view of a cable reel of the third embodiment.
Figure 10B:
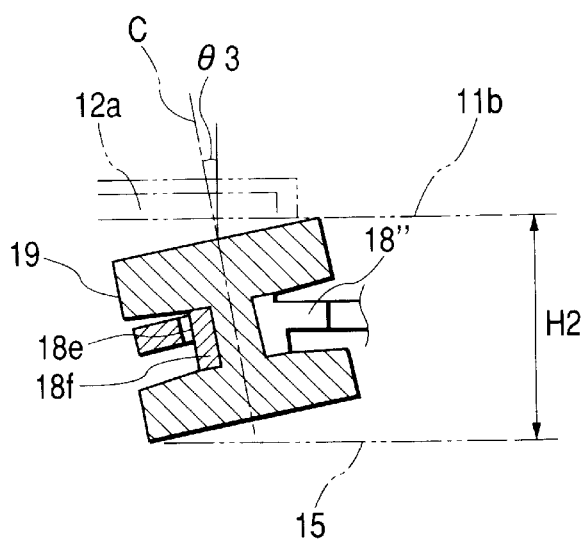
FIG. 10B is an enlarged sectional view of the primary portion after the guide member is accommodated.

On the other hand, as shown in FIG. 9, when the roller 19 is accommodated in the annular hollow section 24, inner cylinder side upper end edge P3 of the roller 19 comes into contact with the annular recess portion 11b of the first roof plate section (annular protruding portion provided on the lower face of the first roof plate section 11a), and outer cylinder side lower end edge P1 of the roller 19 comes into contact with the bottom plate 15, so that the roller 19 can be positioned in the vertical direction. In the above state in which the roller 19 is positioned in the vertical direction, in some cases, axis C of the roller 19 is tilted by the tilting angle θ3 with respect to the normal line of the ring 18 as shown in FIG. 10B, and the height of the roller 19 from the lower end to the upper end becomes H2.

In the above case, it is necessary to adjust so that the tilting angle of the roller can be automatically adjusted to be θ3 and the height of the roller can be automatically adjusted to be H2. In this embodiment, when the bend section 18f is bent, it is possible to automatically adjust so that θ2 can be adjusted to be θ3 and H1 can be adjusted to be H2.

As described above, when the roller 19 comes into elastic contact with the bottom plate and roof plate from the top and bottom, it becomes possible to prevent the occurrence of rattle of the roller 19 and ring 18 in the annular hollow section 24. Therefore, it is possible to prevent the generation of noise.

Since the roller 19 comes into contact with the roof plate 11b of the movable body 11, which is a rotating object, at point P3 above contact point P2 with the flat cable 13 which is a rotating object, the roller 19 can be stably rotated.

Other points of the structure of this embodiment are the same as those of the first embodiment. Therefore, like reference characters are used to indicate like parts, and explanations are omitted here.

Figure 11:
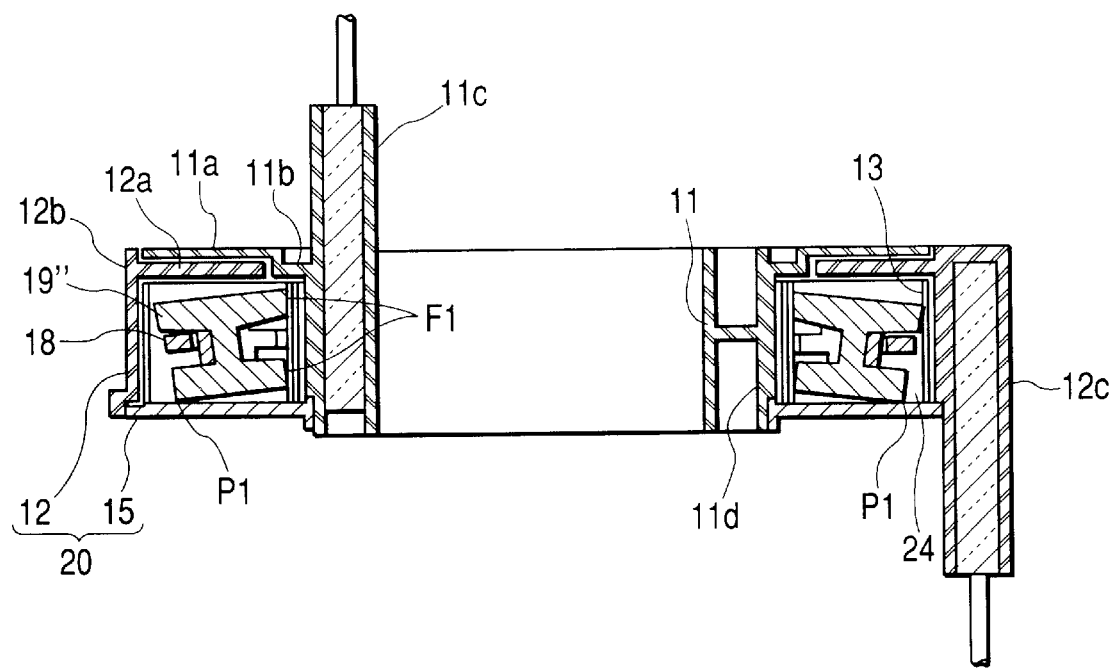
FIG. 11 is a vertical sectional view of a cable reel of a fourth embodiment.
Figure 12:
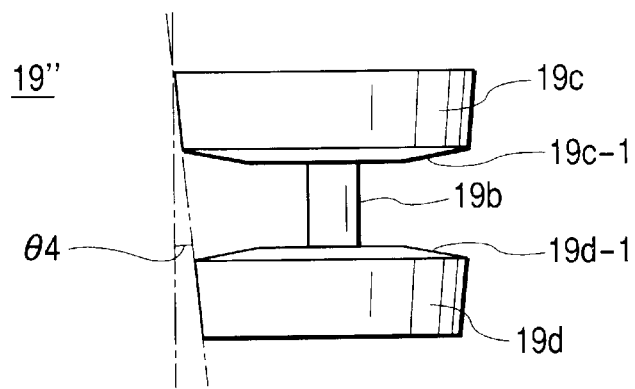
FIG. 12 is a front view of a roller of the fourth embodiment.

FIGS. 11 and 12 are views showing a fourth embodiment.

Different points of this embodiment from the first embodiment are described as follows. Outer side faces of the upper and the lower large diameter portion of the roller 19", the shape of which is a bobbin-shape, are tapered and come into line-contact with the upper and lower side portions in the width direction of the flat cable 13 passing through the inner circumferential passage I.

The shape of the roller 19" is formed into a bobbin-shape in the same manner as that of the first embodiment. However, the upper large diameter portion 19c and the lower diameter portion 19d for interposing the annular recess section 19b, which is arranged in the intermediate portion in the axial direction, are formed into a conical shape, the diameter of which is reduced downward, and the outer circumferential faces of the upper large diameter portion 19c and the lower large diameter portion 19d are tilted by the angle θ4 with respect to the axis of the roller 19".

When the roller 19" is attached to the bearing section 18a of the ring 18a and accommodated in the annular hollow section 24, since the bearing section 18a is tilted by the angle θ4, the outer circumferential faces on the inner cylinder side of the upper large diameter portion 19c and lower large diameter portion 19d of the roller 19" become parallel with the inner cylindrical section 11a of the movable body 11. Therefore, the outer circumferential faces also become parallel with the flat cable 13 passing through the inner circumferential passage I along the inner cylindrical section 11a. Therefore, the outer circumferential faces of the inner cylinder side of the roller 19" come into line-contact with the upper and lower side sections of the flat cable 13 at F1. As a result, the rotary motion of the flat cable 13 can be easily received by the roller 19". Therefore, the roller 19" can be stably rotated. At the same time, it is possible to prevent the flat cable to bend outward.

Other points of the structure of this embodiment are the same as those of the first embodiment. Therefore, like reference characters are used to indicate like parts, and explanations are omitted here.

Figure 13A:
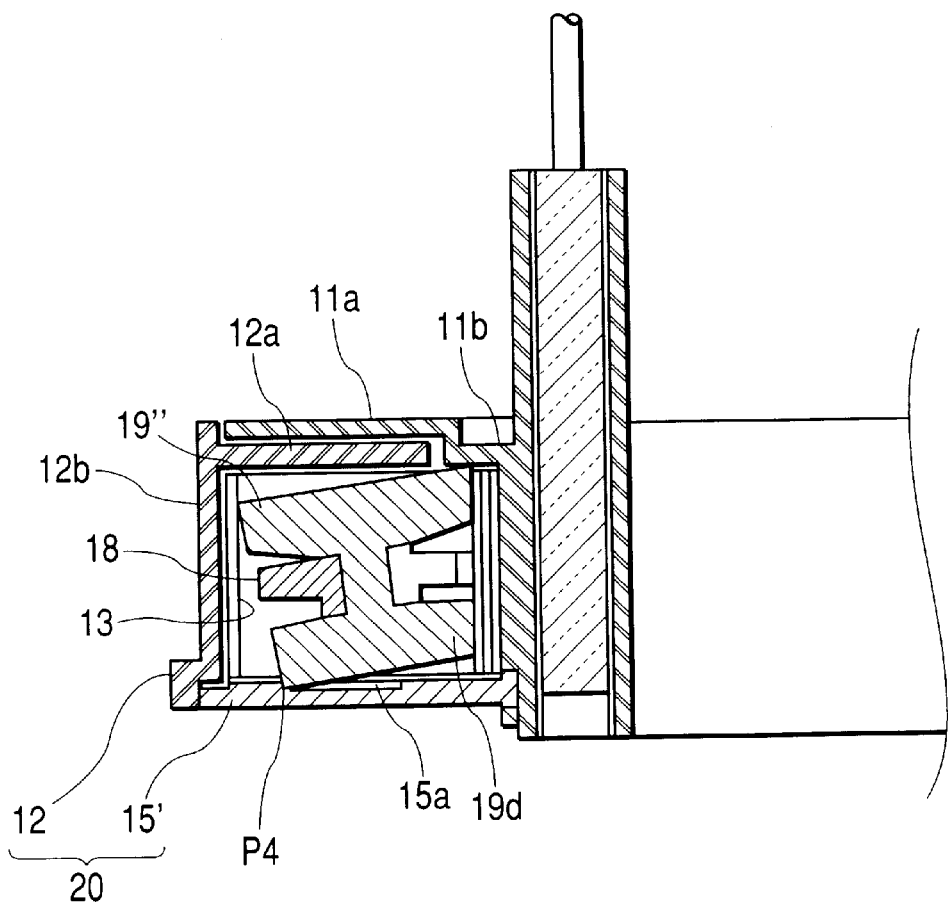
FIGS. 13A and 13B are vertical sectional views of a primary portion of a cable reel of a fifth embodiment.
Figure 13B:
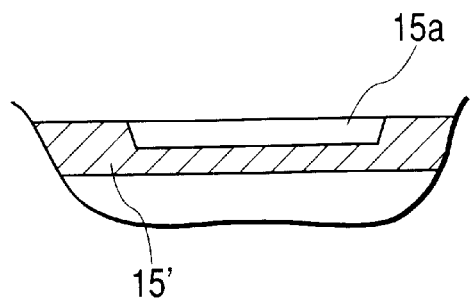

FIGS. 13A and 13B are views showing a fifth embodiment.

Different points of this embodiment from the first embodiment are described as follows. The annular groove 15a for rotatably engaging with a lower end edge of the roller 19 on the outer cylinder side is provided on an upper face of the bottom plate 15' of the stationary body 12.

When the lower end edge on the outer cylinder side of the lower large diameter portion 19d of the roller 19" is caught at the outer circumferential end edge of the groove 15a, the occurrence of rattle of the roller 19" in the radial direction can be restricted. Therefore, the occurrence of rattle and noise can be prevented. At the same time, the roller 19 and the bottom plate 15' can be surely contacted with each other.

Other points of the structure of this embodiment are the same as those of the fourth embodiment. Therefore, like reference characters are used to indicate like parts, and explanations are omitted here.

Figure 14A:
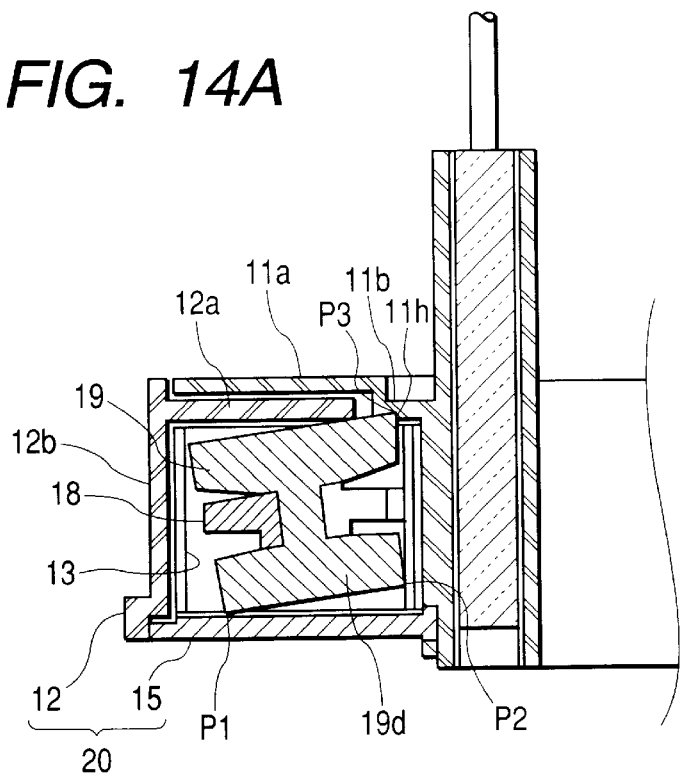
FIGS. 14A and 14B are vertical sectional views of a primary portion of a variation of the cable reel of the fifth embodiment.
Figure 14B:
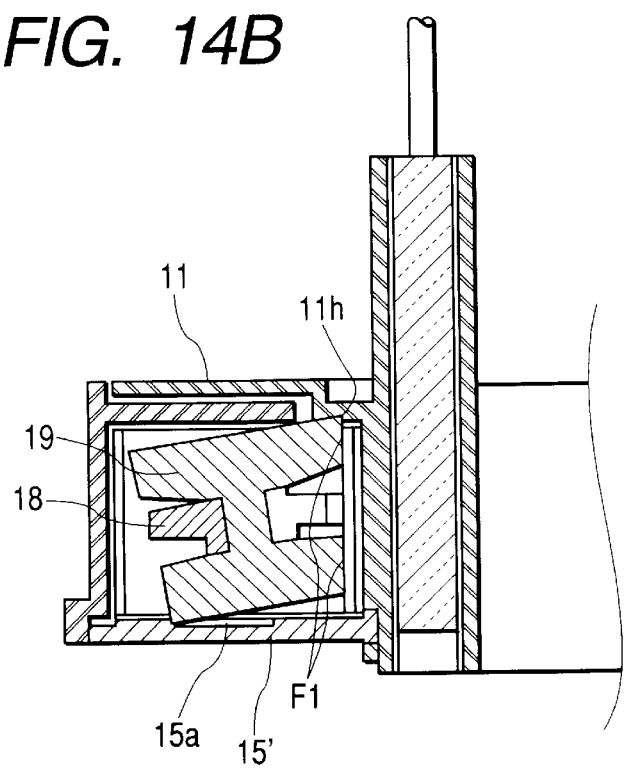

In this connection, as shown in FIG. 14A, the groove 11h may be provided at a position corresponding to contact point P3 of the roof plate 11b with the roller 19". Further, as shown in FIG. 14B, the grooves may be provided on both the bottom plate 15 and the roof plate 11b so as to restrict a movement in the radial direction at the top and the bottom.

Figure 15:
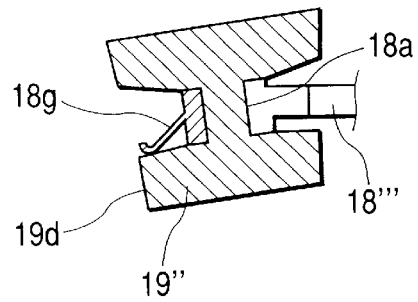
FIG. 15 is a sectional view of a sixth embodiment.

FIG. 15 is a view showing a sixth embodiment.

Different points of this embodiment from the fourth embodiment are described as follows. The spring 18g is protruded obliquely downward from the outer circumferential portion of the bearing hole 18a. Therefore, the occurrence of rattle caused between the roller 19" and the ring 18 can be prevented, and further the lower end edge on the outer cylinder side of the roller 19" can be positively contacted with the bottom plate 15.

The spring 18g penetrates the bearing hole 18a of the roller 19" and comes into contact with an upper face of the lower large diameter portion 19d so that the roller 19" can be pushed in the tilting direction. Accordingly, the occurrence of rattle between the roller 19" and the ring 18 can be suppressed and the roller 19" can be smoothly rotated. Therefore, the roller can be positively contacted with the bottom plate 15, and the occurrence of noise can be prevented.

Other points of the structure of this embodiment are the same as those of the fourth embodiment. Therefore, like reference characters are used to indicate like parts, and explanations are omitted here.

In any embodiments described above, lubricant maybe coated on the bottom plate coming into contact with the roller, the groove formed on the bottom plate and the roof plate of the movable body coming into contact with the roller. Alternatively, a sliding film or sliding sheet may be stuck.

FIGS. 16A to 18c are views showing a seventh embodiment.

Figure 17A:
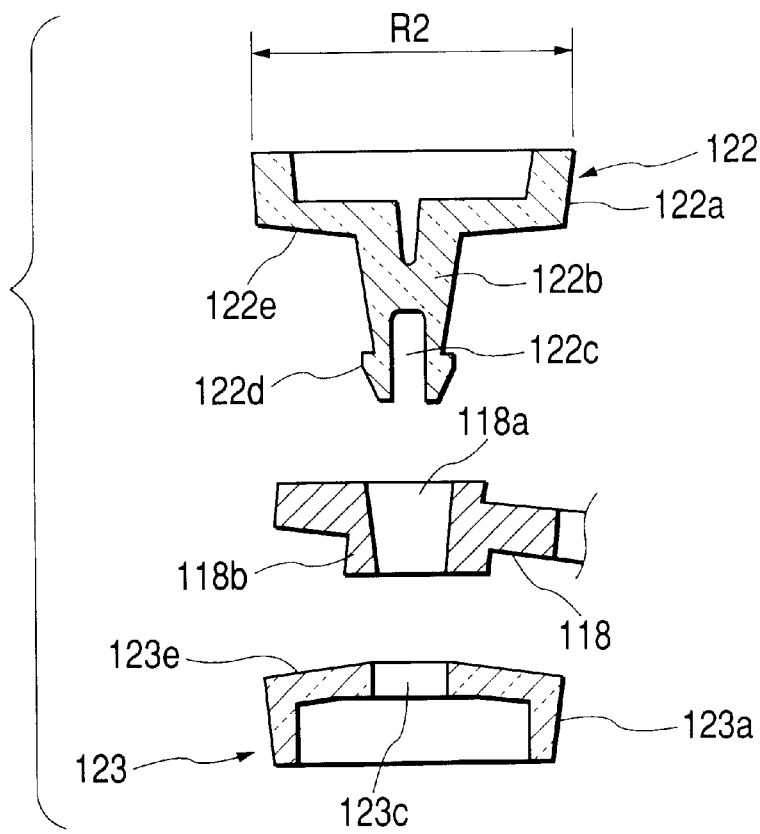
FIGS. 17A and 17B are sectional views of a roller of the seventh embodiment.
Figure 17B:
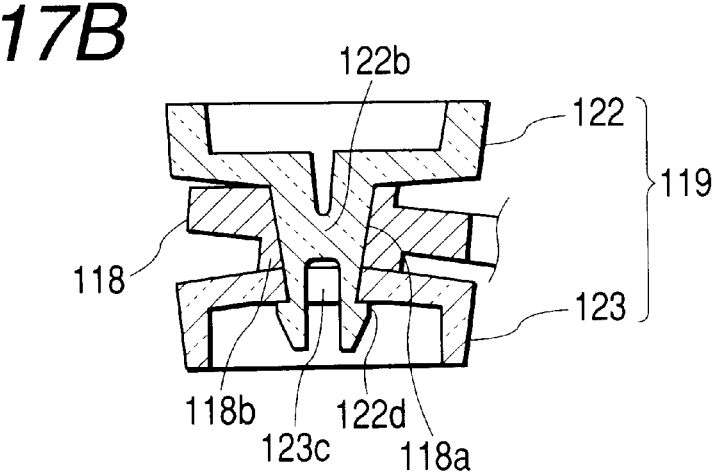

As shown in FIGS. 17A and 17B, the roller 119 is of the split type having an upper and a lower large diameter portion. That is, the roller 119 is composed of a pair of rollers, one is an upper roller 122 and the other is a lower roller 123.

Concerning the upper roller 122 having an upper large diameter portion and the lower roller 123 having a lower large diameter portion, an outer diameter of the large diameter portion of the upper roller 122 is larger than that of the large diameter portion of the lower roller 123. Further, the outer circumferential faces 122a, 123a of the upper 122 and the lower roller 123 are tapered so that a line connecting the outer circumferential faces 122a, 123a in the axial direction can be a straight line.

The upper roller 122, the diameter of which is large, is formed into a cylindrical shape, the upper face of which is open, and the conical shaft section 122b, the diameter of which is gradually reduced toward the end portion, is protruded from the center on the lower end closed face 122e. The recess portion 122c is provided at the end of the conical shaft section 122b, and the engaging pawl 122d is protruded from the forward outer circumferential face of the circumferential wall of the recess portion.

The lower roller 123, the diameter of which is small, is formed into a cylindrical shape, the lower face of which is open, and the engaging hole 123c, into which the forward end of the conical shaft section 122b is inserted, is provided at the center of the upper end closed face 123e.

The lower end closed face 122e of the upper roller 122 and the upper end closed face 123e of the roller 123 are respectively formed into a tapered face protruding to the opposing side, and the central portions of the lower end closed face 122e and the upper end closed face 123e are flat.

Concerning the ring 118, a portion of the ring 118, in which each bearing hole 118a is formed, is defined as the thick portion 118b. At the center of the thick portion 118b, the bearing hole 118a is formed. This bearing hole 118a is a tapered hole, the diameter of which is gradually reduced downward.

The size of the bearing hole 118a is set in such a manner that it is possible to insert the conical shaft section 122b into the bearing hole 118a from the top, however, it is impossible to insert the conical shaft section 122b into the bearing hole 118a from the bottom.

When the upper 122 and the lower roller 123 are attached to the ring 118, the upper roller 122 is arranged in an upper portion of the ring 118, the conical shaft section 122b, which is directed downward, is inserted into the bearing hole 118a, the forward end portion protruding downward from the bearing hole 118a is inserted into the engaging hole 123c of the lower roller 123, and the engaging pawl 122d is engaged with an outer circumferential edge of the engaging hole 123c.

In the above state, the upper and lower faces of the thick portion 118b come into pressure contact with the opposing faces of the upper 122 and the lower roller 123. Therefore, the upper 122 and the lower roller 123 can be attached to the ring 118 without causing any rattle.

When the upper 122 and the lower roller 123 are incorporated into the ring 118, even if the upper roller 122 is mistakenly located at a lower position of the ring 118 and the conical shaft section 122b, which is protruding upward, is tried to be inserted into the bearing hole 118a, it is impossible to insert the conical shaft section 122b into the bearing hole 118a. For the above reasons, there is no possibility that the upper 122 and the lower roller 123 are attached to the ring 118 upside down.

Figure 18A:
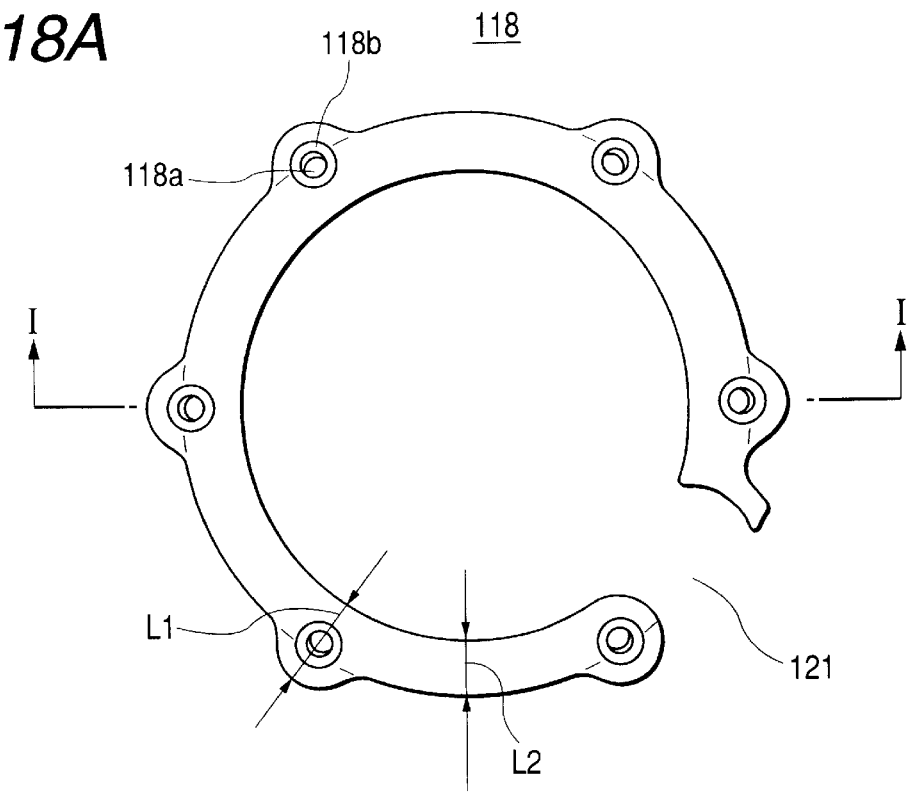
FIG. 18A is a plan view of a ring of the seventh embodiment.
Figure 18B:
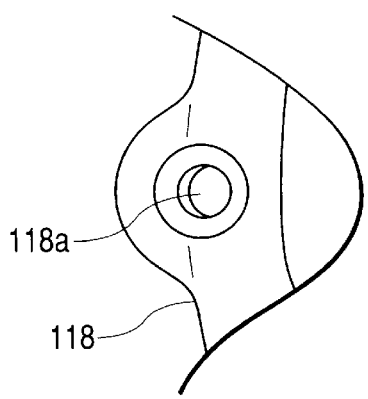
FIG. 18B is an enlarged view of a primary portion.

As shown in FIG. 18A, the ring 118 is formed into a C-shape having the inversion space 121, and six bearing holes 118a are formed in the circumferential direction at regular intervals.

Figure 18C:
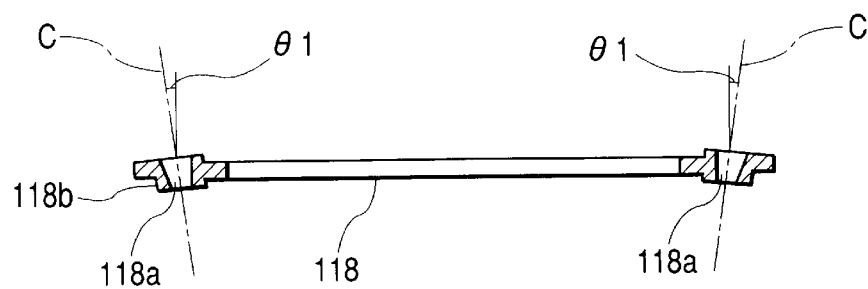
FIG. 18C is a sectional view taken on line I—I in FIG. 18A.

As shown in FIG. 18C, axis C of the bearing hole 118a is tilted by the angle θ1 with respect to the axis of the ring 118.

The angle θ1 is set in the range of 3°<θ1<20°, and it is preferable that the angle θ1 is set in the range of 5°<θ1<10°.

In this case, the inequality of L2<L1<R2 is established, wherein L1 is the width of a portion of the ring 118 in which the bearing hole 118*a* is formed, L2 is the width of other portions of the ring 118 and R2 is the outermost diameter of the roller 119. Therefore, the outer circumferential face of the roller 119 is protruded from the inner and outer circumferential faces of the ring 118.

Figure 16A:
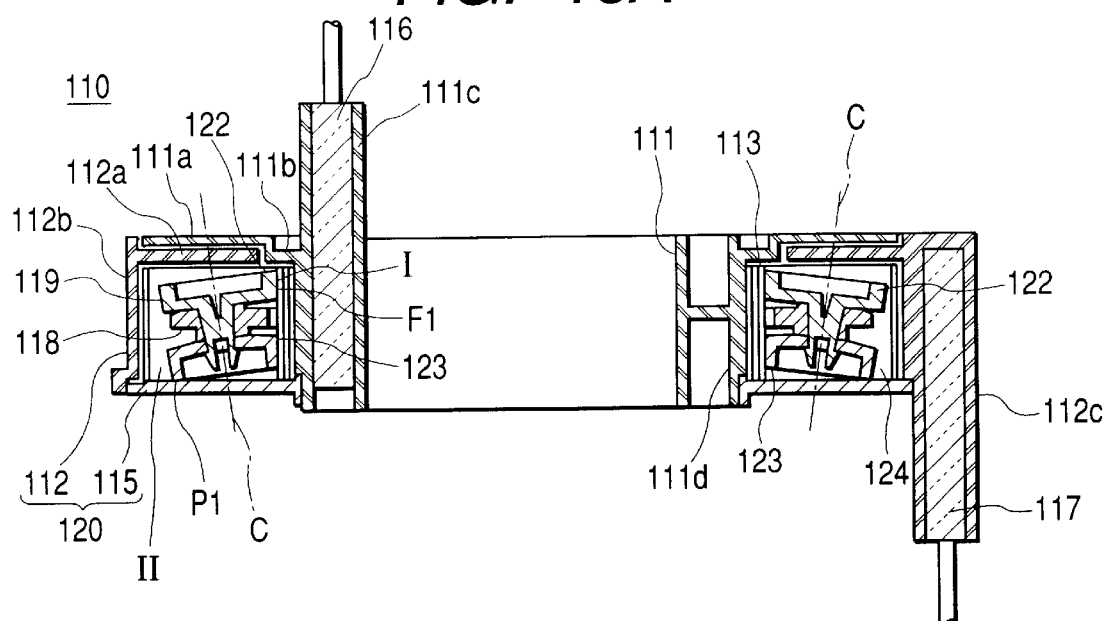
FIG. 16A is a vertical sectional view of the cable reel of a seventh embodiment of the present invention.
Figure 16B:
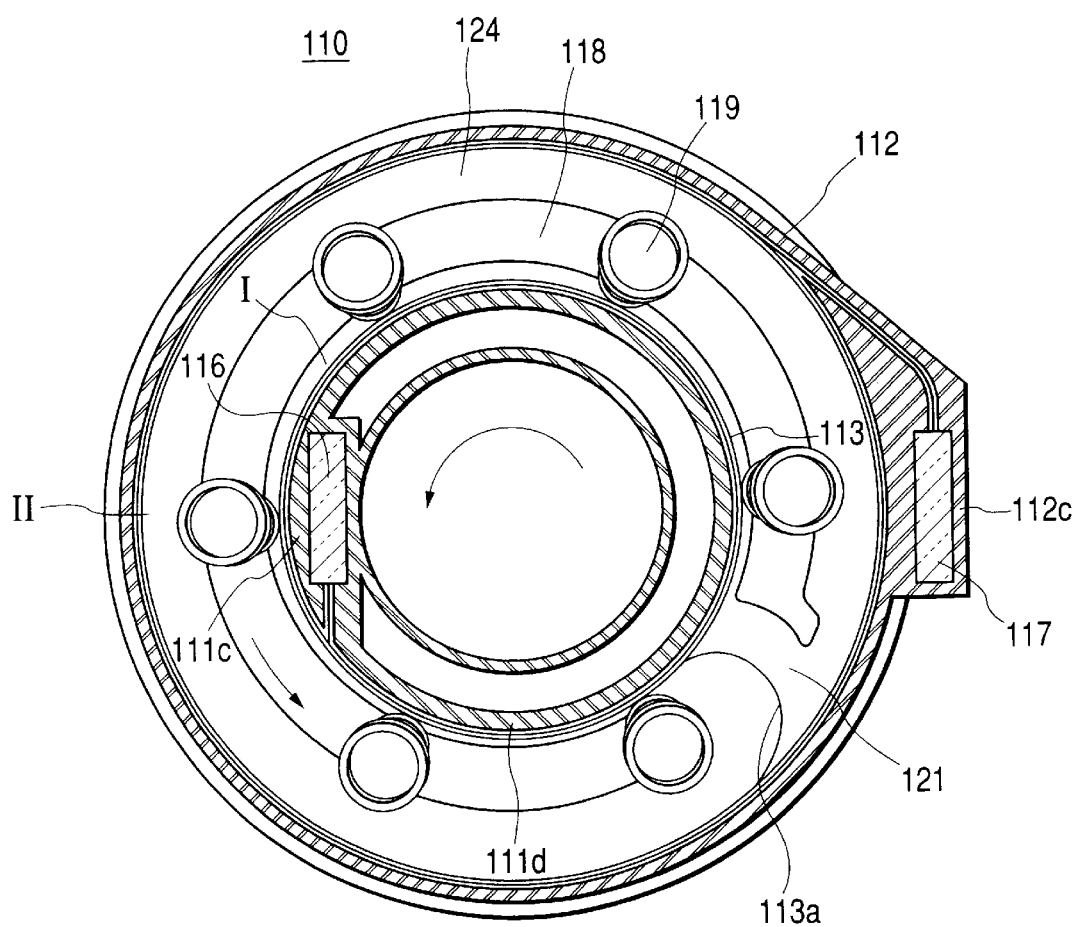
FIG. 16B is a horizontal sectional view of the cable reel of the seventh embodiment.

After the roller 119, which is composed of the upper 122 and the lower roller 123, has been incorporated into the ring 118 being tilted, the ring 118 is accommodated into the annular hollow section 124. In the above state, as shown in FIG. 16A, since the bearing hole 118*a* is tilted, the roller 119 is tilted, and a lower end outer edge of the roller 119 comes into point-contact with the bottom plate 115 at P1, and further an inner cylinder side portion of the roller 119 becomes parallel with the inner cylindrical section 111*d* and comes into line-contact with the upper and the lower side portion of the flat cable 113, which passes through the inner circumferential passage I, at F1.

Next, operation of the cable reel 110 will be explained below.

When a steering shaft (not shown) is rotated, the movable body 111 is rotated in one direction (clockwise). Then the flat cable 113 is wound up. Therefore, the flat cable 113 in the outer circumferential passage II passes through the inversion space 121 being folded back, so that the flat cable 113 is wound up around the inner circumferential passage I. On the other hand, when the movable body 111 is rotated in the reverse direction (counterclockwise), the flat cable 113 is wound back. Then, the flat cable 113 in the inner circumferential passage I passes through the inversion space 121 being folded back, so that the flat cable 112 is sent out to the above outer circumferential passage II.

Since the flat cable 113 in the inner circumferential passage I comes into contact with the roller 119 when the flat cable 113 is rotated, the roller 119 is also rotated. Therefore, frictional resistance of the roller 119 with the flat cable 113 is reduced. As a result, the torque can be reduced.

The roller 119 is attached being tilted, and point P1 at which the roller 119 comes into contact with the bottom plate 115, which is a stationary object, and line F1 at which the roller 119 comes into line-contact with the flat cable 113, which is a rotary object, are located on the opposite side with respect to the rotary shaft. Therefore, as if a drum can were rolled being tilted, the roller 119 can be stably rolled, and frictional resistance of the bottom plate 15 with the roller 19 can be greatly reduced, and further irregular fluctuation of the torque can be reduced.

When the intermediate portion of each roller 119 is held by the ring 118, it is unnecessary to provide a base plate which is conventionally attached to the bottom plate. Therefore, the thickness of the cable reel can be reduced by the thickness of the base portion of the base plate.

Further, in order to hold the roller 119 by the ring 118, only the bearing hole 118*a* is formed in the ring 118. Therefore, it is unnecessary to provide a support pin protruding from the base plate which is needed in the conventional structure. Therefore, the structure can be made simple and thin compared with the conventional base plate. Further, it is unnecessary to provide other parts such as bolts for holding the roller. Accordingly, the number of parts can be reduced, and the number of working steps for attaching the roller can be reduced.

Figure 19A:
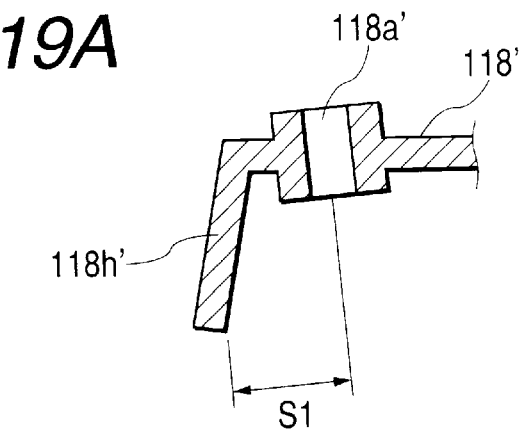
FIGS. 19A, 19B and 19C are sectional views of a eighth embodiment.
Figure 19B:
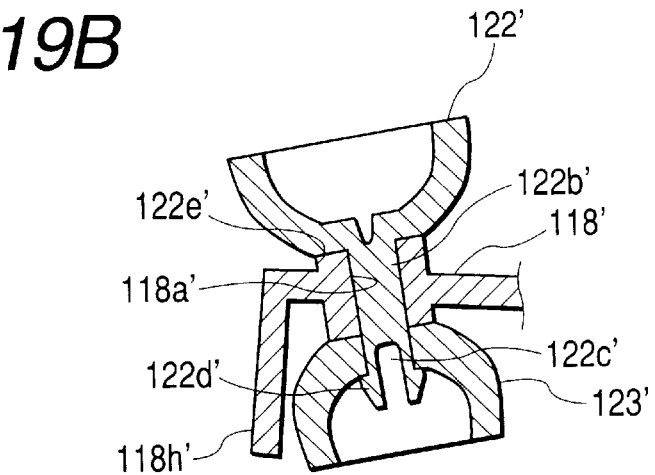
Figure 19C:
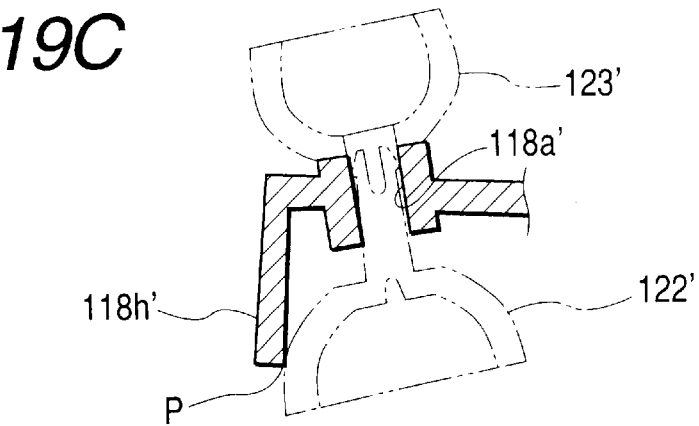

FIGS. 19A, 19B and 19C are views showing a eighth embodiment.

Different points of the eighth embodiment from the seventh embodiment are described as follows. The bearing hole 118*a*' provided in the ring 118' is not tapered. Further, the shaft 122*b*' protruding from the lower end closed face 122*e*' of the upper roller 122' is not conical, that is, the diameter of the shaft 122*b*' is of the same diameter. The recess portion 122*c*' is provided at an end of the shaft 122*b*', and the engaging pawl 122*d*' is protruded from an end of the outer circumferential portion.

On the other hand, in the ring 118', the stopper 118*h*' is protruded downward from an outer circumferential end edge in the radial direction of the bearing hole 118*a*'. Length S1 from the axial center of the bearing hole to the stopper 118*h*' is smaller than the radius of the upper roller 122' of large diameter.

When the ring 118' is provided with the stopper 118*h*' as described above, in the case where the upper 122' and the lower roller 123' are set upside down as shown in FIG. 19C, that is, in the case where the upper 122' and the lower roller 123' are tried to be set while the upper roller 122' of large diameter is being located on the lower side, the stopper 118*h*' and the upper roller 122' interfere with each other at point P. Therefore, it is impossible to incorporate the upper 122' and the lower roller 123' into the ring 118'. Due to the foregoing, it is possible to prevent the upper 122' and the lower roller 123' from being attached to the ring 118' upside down. It is possible to attach the upper 122' and the lower roller 123' to the ring 118' only when they are correctly located as shown in FIG. 19B.

Other points of the structure and effects to be provided of this embodiment are the same as those of the seventh embodiment. Therefore, like reference characters are used to indicate like parts, and explanations are omitted here.

FIGS. 20 to 22C are views showing a ninth embodiment.

Figure 21:
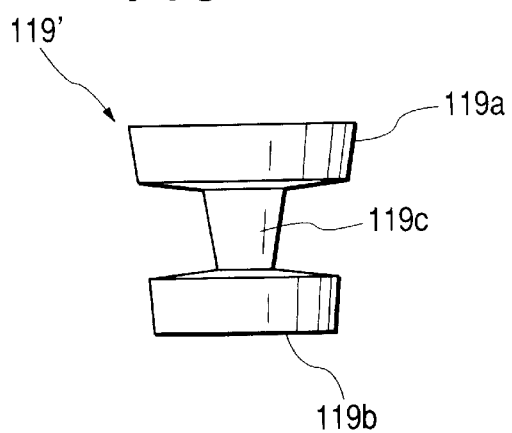
FIG. 21 is a front view of a roller of the ninth embodiment.

In the ninth embodiment, the roller 119' is not split in the vertical direction but formed into one body. As shown in FIG. 21, the conical shaft section 119*c* is provided between the upper 119*a* and the lower large diameter portion 119*b* of the roller 119' concerned. The diameter of this conical shaft section 119*c* is gradually reduced downward.

Figure 22A:
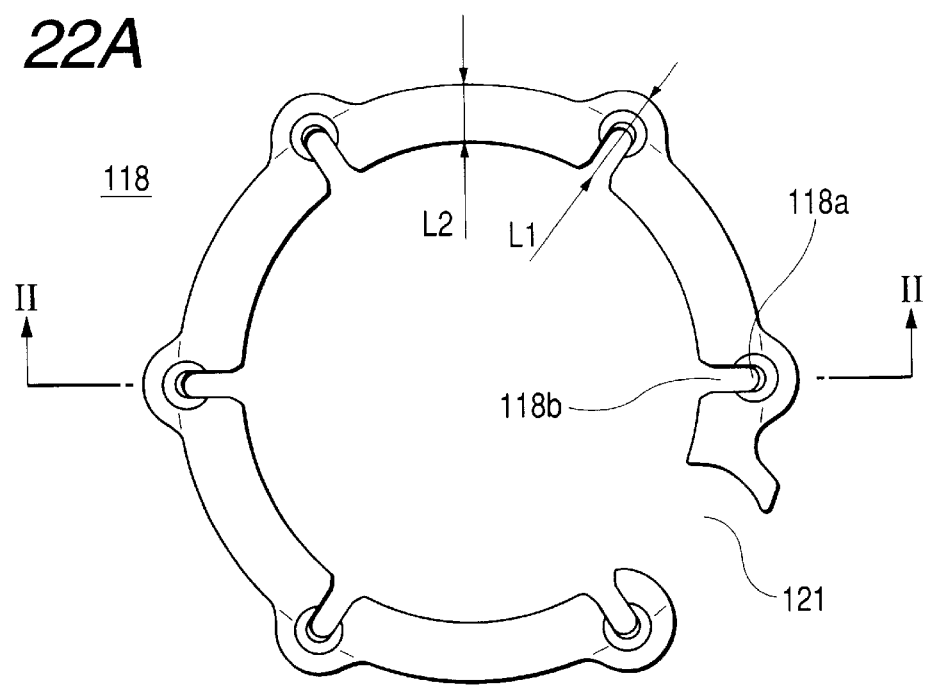
FIG. 22A is a plan view of a ring of the ninth embodiment.
Figure 22B:
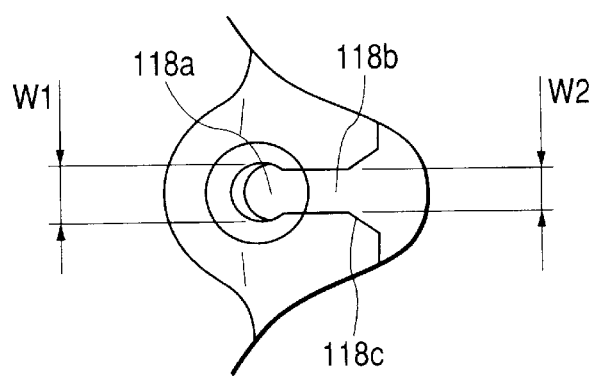
FIG. 22B is an enlarged view of a primary portion.
Figure 22C:
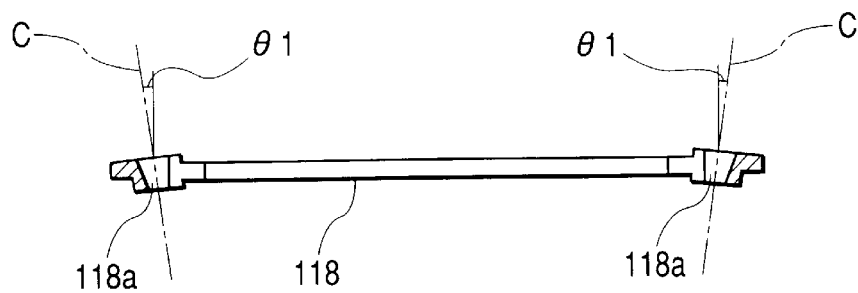
FIG. 22C is a sectional view taken on line II—II in FIG. 22A.

On the other hand, as shown in FIG. 22C, the bearing hole 118*a* formed in the ring 118 is a tapered hole engaging with the conical shaft 119*c*, and the diameter of the bearing hole 118*a* is gradually reduced downward.

Since the roller 119' is of one body type in which the upper and lower rollers are integrated with each other into one body, the bearing hole 118*a* is communicated with the roller insertion passage 118*b* which is open to the inner end of the ring 118, and the conical shaft 119*c* is inserted into the bearing hole 118*a* via the roller insertion passage 118*b*. In order to prevent the conical shaft 119*c* from coming out from the bearing hole 118*a*, the width of the roller insertion passage 118*b* is a little smaller than the diameter of the conical shaft 119*c*, that is, the conical shaft 119*c* is forcibly inserted into the bearing hole 118*a*.

Since the bearing hole 118*a* is tapered as described above, when the conical shaft 119*c* of the roller 119' is inserted into the bearing hole 118*a* upside down, the conical shaft 119*c* can not be appropriately engaged in the bearing hole 118*a*. Therefore, it is possible to prevent the conical shaft 119*c* from being inserted upside down.

Figure 20:
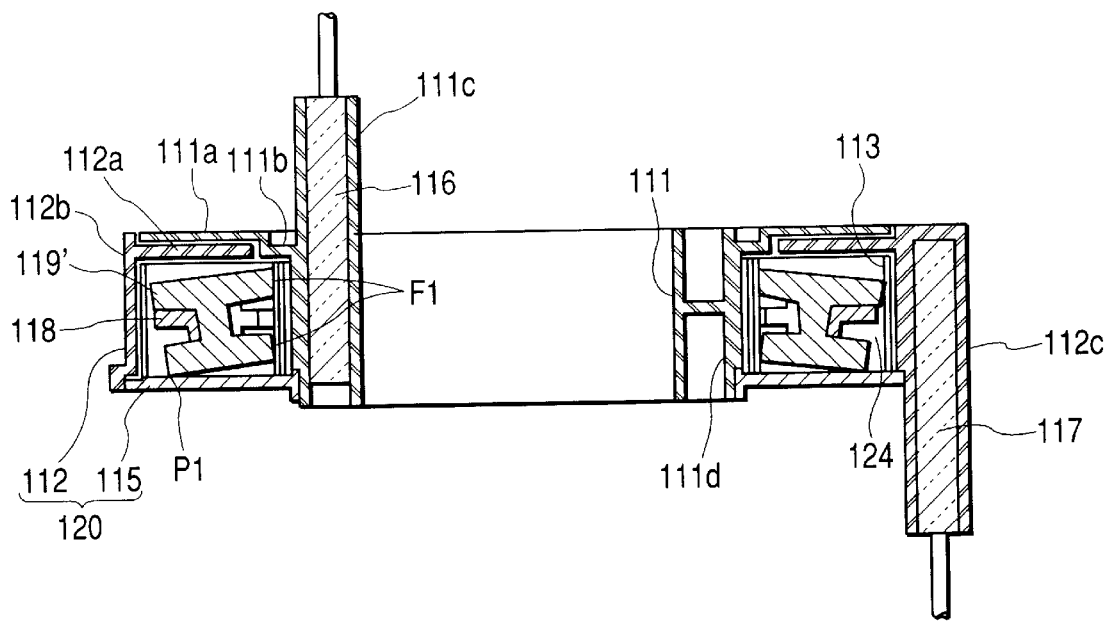
FIG. 20 is a sectional view of a ninth embodiment.

In the same manner as that of the seventh embodiment, the bearing hole 118*a* is tilted as shown in FIG. 20. After the roller 119' has been incorporated into the bearing hole 118*a* being tilted, the ring 118 is accommodated in the annular hollow section 124 so that the upper face 118*d* of the ring 118 can be directed to the roof plate side. In the above state, the bearing hole 118a is tilted. Therefore, the roller 119' is also tilted. Accordingly, a lower end outer edge of the roller 119' comes into point-contact with the bottom plate 115 at P1, and the inner cylinder side of the roller 119' becomes parallel with the inner cylindrical section 111d and comes into line-contact with the upper and lower side portions of the flat cable 113, which passes through the inner circumferential passage I, on line F1.

In this connection, in the case where a vertical position of the roller is restricted by the stopper described in the eighth embodiment, one body type roller may be used in the same manner as that of the ninth embodiment.

Figure 23:
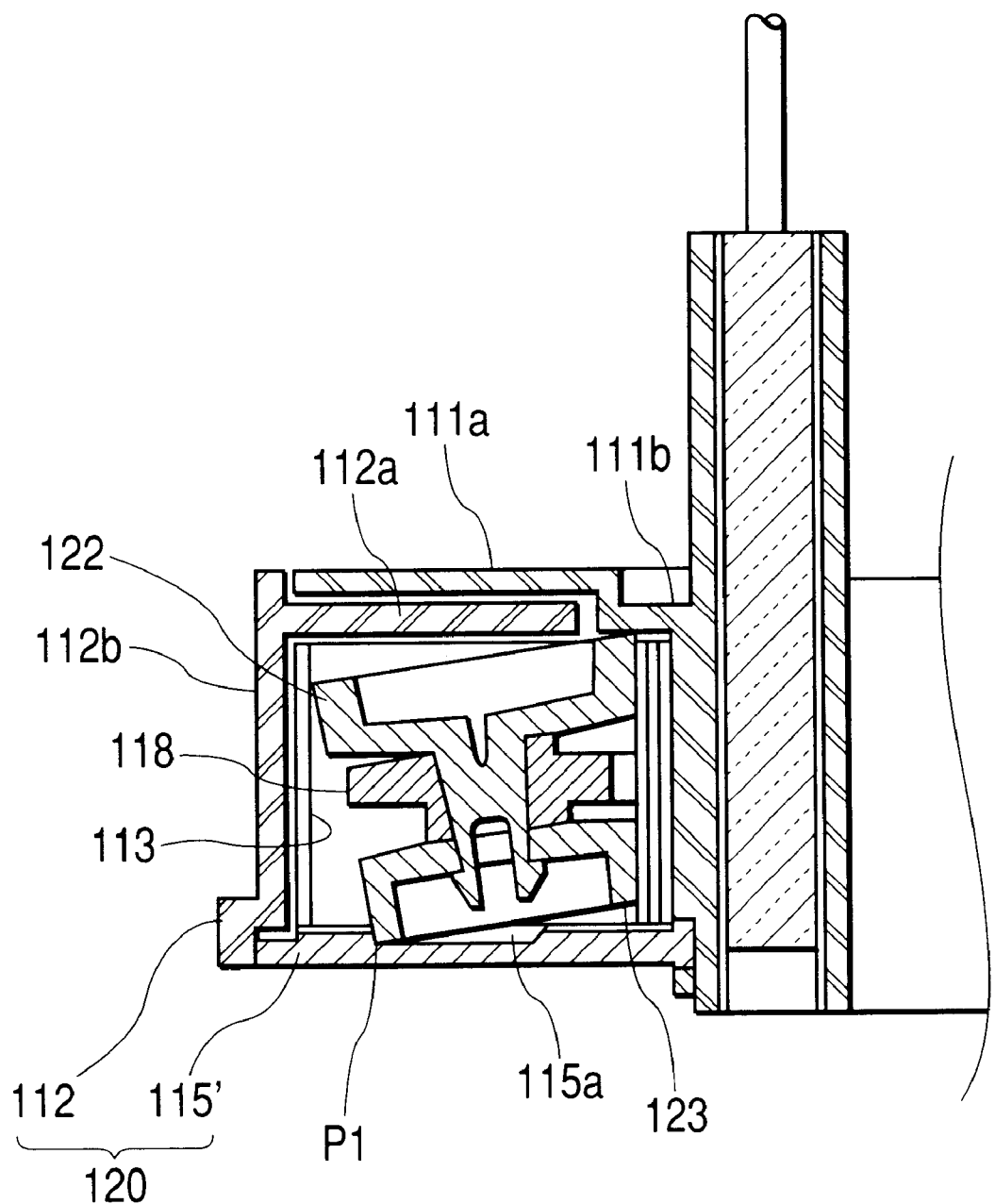
FIG. 23 is a sectional view of a tenth embodiment.
Figure 24A:
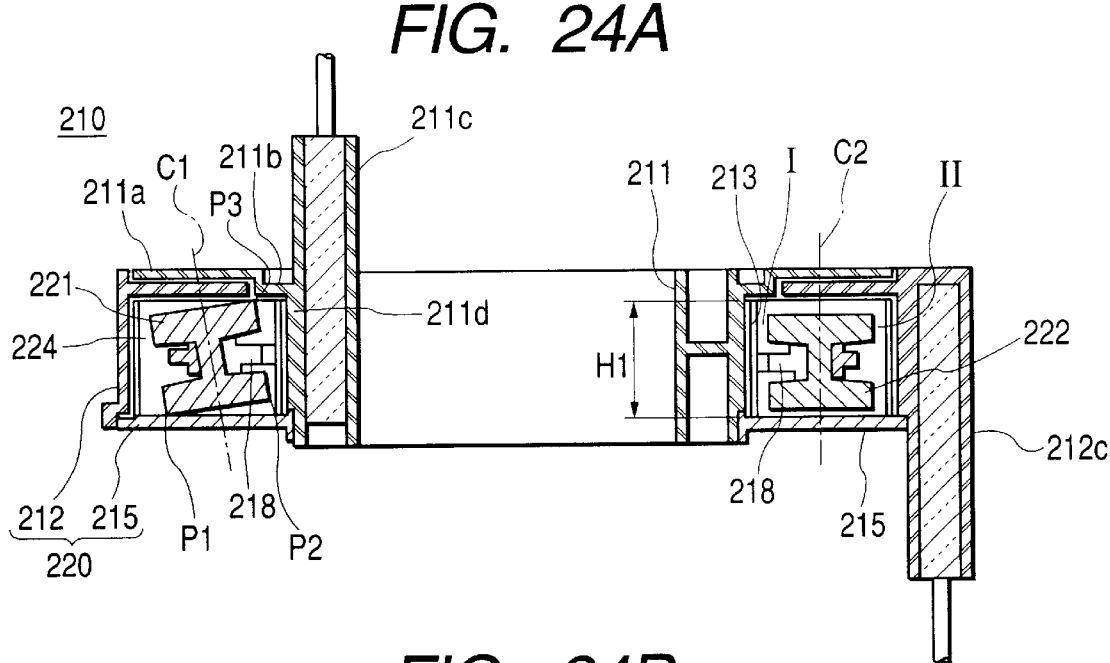
FIG. 24A is a vertical sectional view of a cable reel of a eleventh embodiment.
Figure 24B:
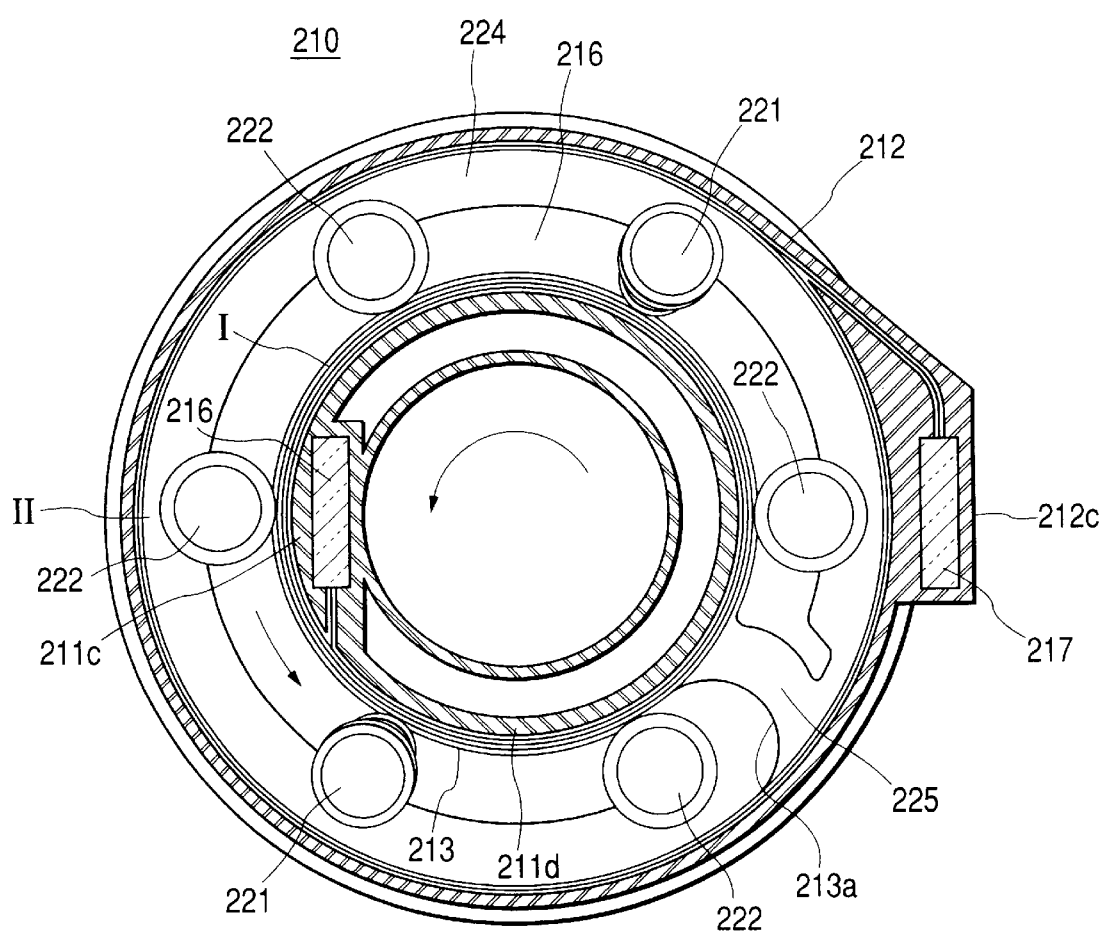
FIG. 24B is a horizontal sectional view of the cable reel of the eleventh embodiment.

FIG. 23 is a view showing the tenth embodiment.

Different points of this embodiment from the seventh embodiment are described as follows. The annular groove 115a for rotatably engaging with a lower end edge of the roller 123 on the outer cylinder side is provided on an upper face of the bottom plate 115' of the stationary body.

When the lower end edge on the outer cylinder side of the lower roller 123 is caught at the outer circumferential end edge of the groove 115a, the occurrence of rattle of the lower roller 123 in the radial direction can be restricted. Therefore, the occurrence of rattle and noise can be prevented. At the same time, the lower roller 123 and the bottom plate 115' can be surely contacted with each other.

Other points of the structure of this embodiment are the same as those of the seventh embodiment. Therefore, like reference characters are used to indicate like parts, and explanations are omitted here.

In this connection, in the case where the upper roller 122 comes into contact with the roof plate, a groove may be formed at the contact position on the roof plate.

FIGS. 24A to 27B are views showing an eleventh embodiment.

In the annular hollow section 224 formed between the movable body 211 and the stationary body 220, there is rotatably provided a guide member 214 in which two tall rollers 221 and four short rollers 222 are attached to the C-shaped ring 218 at regular intervals.

Inside the annular hollow section 224, the flat cable 213, one connector 216 of which is engaged with the connector accommodating section 211c of the movable body 211, is wound around the inner circumferential passage I formed between the inner circumferential side of the guide member 214 and the outer circumferential face of the inner circumferential wall 211d of the movable body 211. While an intermediate portion of the flat cable 213 is determined to be an inversion section 213a, the flat cable 213 is threaded into the inversion space 225 formed between the end portions of the ring 218 of the guide member 214. Then, the flat cable 213 is wound back in the outer circumferential passage II formed between the outer circumferential side of the guide member 214 and the inner circumferential face of the outer cylindrical section 212b. The connector 217 of the other end of the flat cable 213 is accommodated in the connector accommodating section 212c of the upper case 212.

Figure 25A:
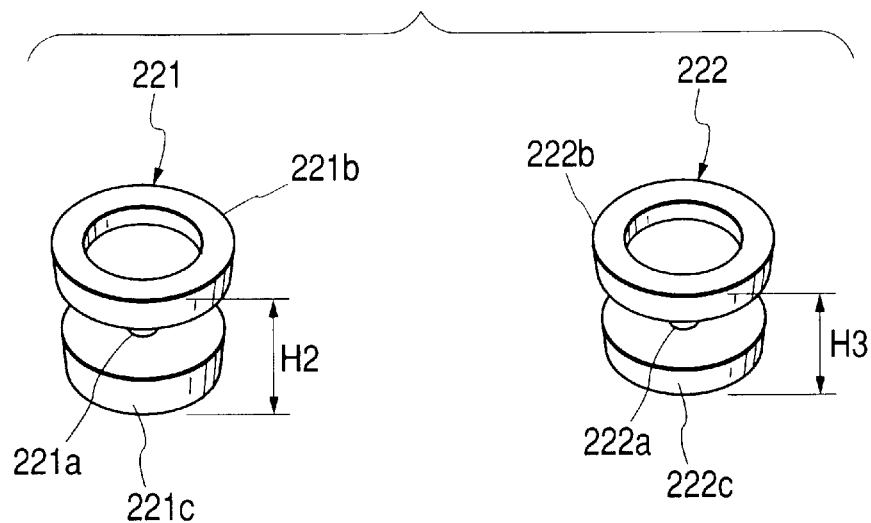
FIG. 25A is a front view of a roller of the eleventh embodiment.
Figure 25B:
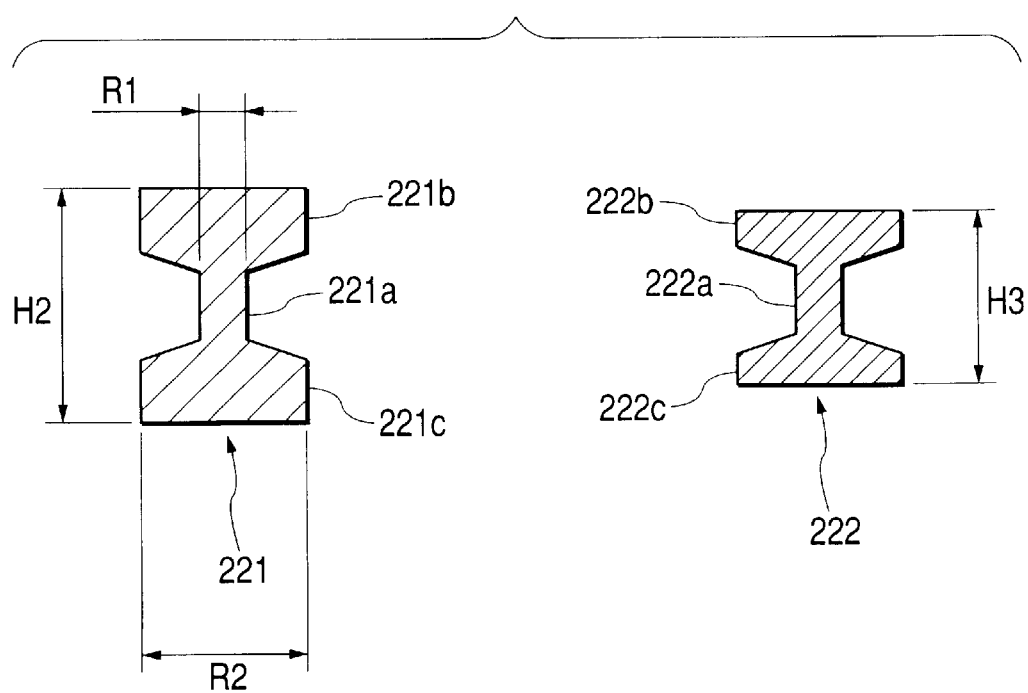
FIG. 25B is a sectional view of the roller of the eleventh embodiment.

As shown in FIGS. 25A and 25B, the tall roller 221 and the short roller 222 are respectively formed into a bobbin-shape in which the intermediate annular recess portions 221a, 222a in the axial direction of the tall roller 221 and the short roller 222 are interposed between the upper large diameter portion 221b and the lower large diameter portion 221c and also between the upper large diameter portion 222b and the lower large diameter portion 222c, and opposing faces of the upper and the lower large diameter portion are protruded from the outer circumferential side being tapered.

Height H2 of the tall roller 221 in the axial direction is determined to be larger than height H3 of the short roller 222. On the other hand, the diameter of the annular recess portion 21a of the tall roller 21 is the same as the diameter of the annular recess portion 222a of the short roller 222, and the diameters of the upper and lower large diameter portions of the tall roller 221 are the same as those of the short roller 222.

In this connection, the diameters of the upper and lower large diameter portions of the lower roller may be determined to be larger than those of the upper and lower large diameter portions of the tall roller.

Figure 26A:
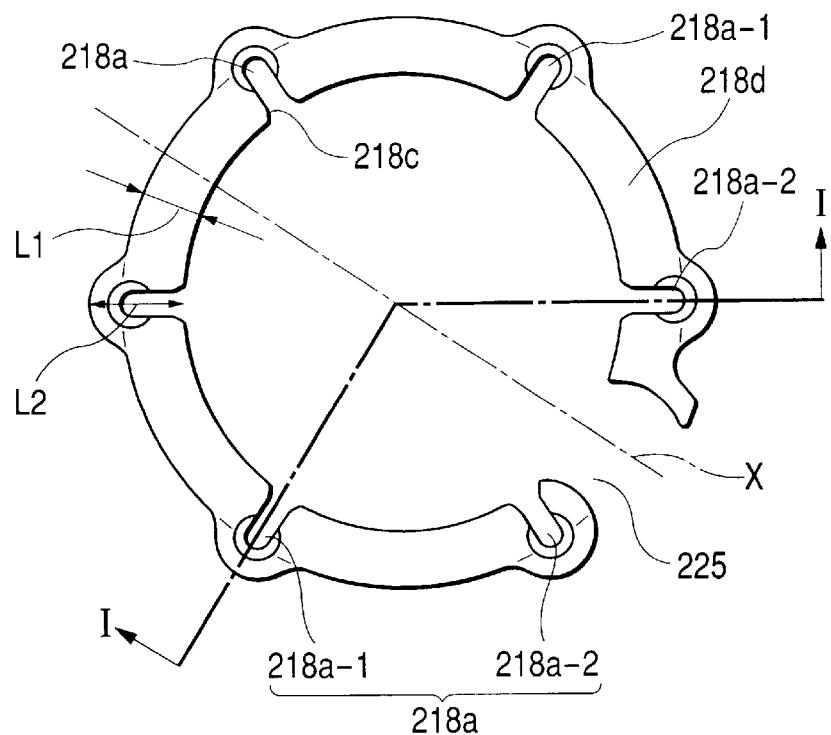
FIG. 26A is a plan view of a ring of the eleventh embodiment.

As shown in FIG. 26A, the ring 218 is formed into a C-shape having the inversion space 225, and six bearing holes 218a are formed in the circumferential direction of the ring 218 at predetermined intervals.

In this case, the inequality of L2<L1<R2 is established, wherein L2 is the width of a portion of the ring 218 in which the bearing hole 218a is formed, L1 is the width of other portions of the ring 218 and R2 is the outermost diameter of the roller 221, 222. Therefore, the outer circumferential face of the roller 221, 222 is protruded from the outer circumferential face of the ring 218.

Each bearing hole 218a is cut out and opened at the inner circumferential end of the ring 218 and communicated with the roller insertion passage 218b.

Figure 26B:
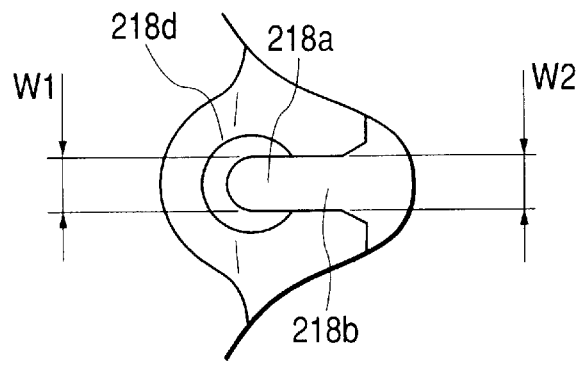
FIG. 26B is an enlarged view of a primary portion.
Figure 26C:
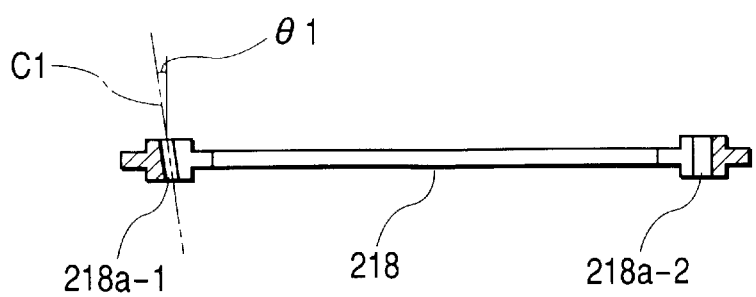
FIG. 26C is a sectional view taken on line I—I in FIG. 26A.
Figure 27A:
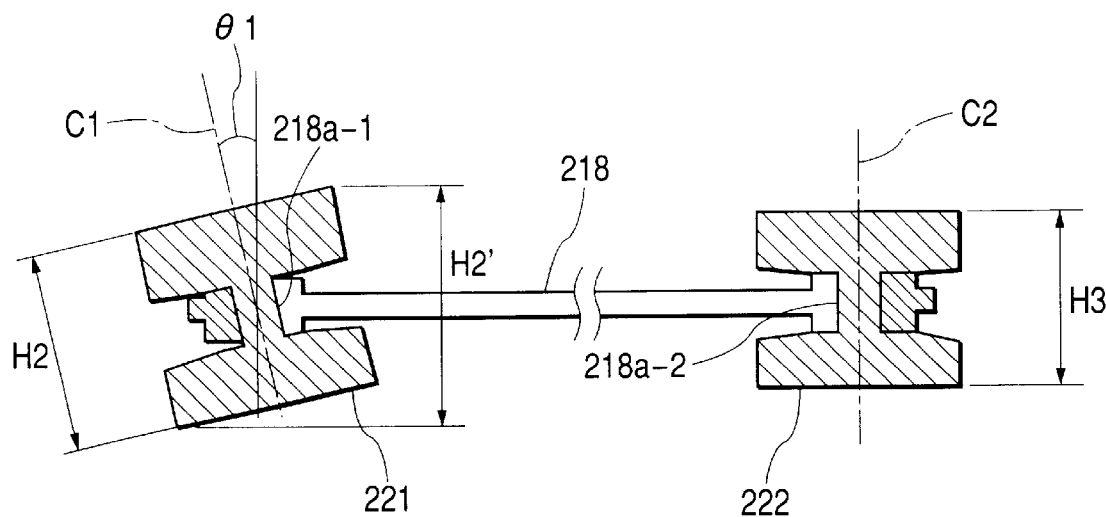
FIGS. 27A and 27B are sectional views of a primary portion of the eleventh embodiment.
Figure 27B:
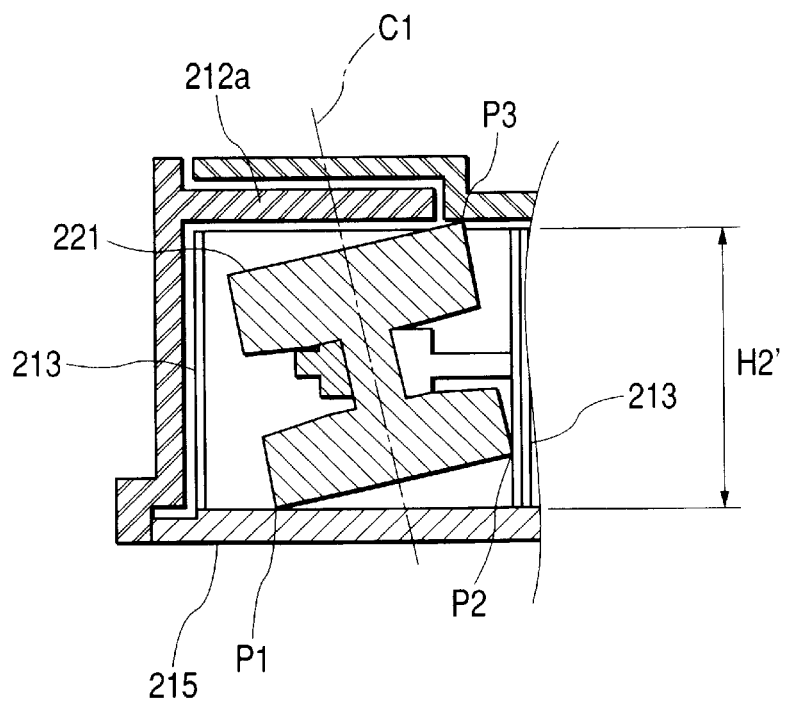

Width W1 of the bearing hole 218a shown in FIG. 26B is set to be a little larger than outer diameter R1 of the annular recess section 221a, 222a of the roller 221, 222. On the other hand, width W2 of the roller insertion passage 218b is set to be a little smaller than outer diameter R1 of the annular recess section of the roller, and the entrance section 218c open at the inner circumferential end of the roller insertion passage 218b is expanded being tapered.

Axis C1 of the bearing hole 218a-1 used for the tall roller is tilted outside by θ1 with respect to the center axis of the ring 218, and the axis of the bearing hole 218a-2 used for the short roller is parallel with the center axis of the ring 218.

The guide member 214 composed of the ring 218 and rollers 221, 222 rotatably holds the tall roller 221 and the short roller 222 when the annular recess portion 221a, 222a of each roller is slidably inserted into the bearing hole 218a by one-touch motion from the roller insertion passage 218b of the ring 218. When width W2 of the roller insertion passage 218b is made to be a little smaller than outer diameter R1 of the annular recess section 221a, 222a of the roller 221, 222, the roller 221, 222 can be prevented from coming out.

Two tall rollers 221 are respectively attached on both sides of the ring 218 at positions symmetrically to each other with respect to a straight line perpendicular to straight line X passing through the inversion space 225. Between these tall rollers 221, two short rollers 222 are respectively arranged.

Under the above condition, the guide member 214 is accommodated in the annular hollow section 224. In this case, height H2' of the tall roller 221, which is tilted by θ1, is larger than height H1 of the annular hollow section 224. Before the guide member 214 is arranged in the stationary body 220, axis C1 of the tall roller 221 is tilted by angle θ1. In this case, the tall roller 221 is tilted in a direction so that an upper portion of the axis is tilted to the outer cylindrical section side.

Height H3 of the short roller 222 is smaller than height H1 of the annular hollow section 224. Therefore, axis C2 of the short roller 222 is not tilted, that is, the short roller 222 is not tilted with respect to the ring 218.

A lower end edge on the outer cylindrical section side of the tall roller 221, which has been inserted into the annular hollow section 224, comes into contact with the bottom plate 215 at point P1, and an upper end edge on the inner cylinder side comes into contact with the annular recess portion 211b of the first roof plate 221a at point P3. When the roller is inserted into the annular hollow section 224, a tilting angle of axis C1 is automatically subjected to fine adjustment so that the tall roller 221 can be contacted with the above points P1 and P2. Therefore, the roller comes into pressure contact with the bottom plate 215 and the annular recess section 211b of the first roof 211a. Due to the foregoing, height H2" of the tall roller 221 becomes equal to height H1 of the annular hollow section 224.

When the tall roller 221 is made to come into contact with the bottom plate 215 and the annular recess section 211b of the first roof plate 211a and interposed between the top and the bottom, the guide member 214 can be held in the annular hollow section 224.

Under the above condition, the short roller 222 comes into contact with neither the bottom plate 215 nor the roof plate, and only the outer circumferential face of the short roller 222 comes into contact with the flat cable 213 passing through the inner circumferential passage I and the outer circumferential passage II.

Next, operation of the cable reel 210 will be explained below.

When a steering shaft (not shown) is rotated, the movable body 211 is rotated in one direction (clockwise). Then the flat cable 213 is wound up. Therefore, the flat cable 213 in the outer circumferential passage II passes through the inversion space 225 being folded back, so that the flat cable 213 is wound up around the inner circumferential passage I. On the other hand, when the movable body 211 is rotated in the reverse direction (counterclockwise), the flat cable 213 is wound back. Then, the flat cable 213 in the inner circumferential passage I passes through the inversion space 225 being folded back, so that the flat cable 212 is sent out to the above outer circumferential passage II.

Since the flat cable 213 in the inner circumferential passage I comes into contact with the short roller 222 when the flat cable 213 is rotated, the short roller 222 is also rotated. Since the short roller 222 is not contacted with the bottom plate and roof plate, no frictional resistance is given to the roller, and the torque can be reduced. Further, sliding noise, which is generated when the roller slides on the stationary body, is not generated.

The inner cylindrical section side of the upper end edge of the tall roller 221 comes into pressure contact with the annular recess section 211b of the first roof plate 211a, which is the movable body 211, at point P3, and the outer cylindrical section side of the lower end edge of the tall roller 221 comes into pressure contact with the bottom plate 215 at point P1, and the lower end edge of the tall roller 221 comes into contact with the flat cable 213 in the inner circumferential passage I. Under the above condition, the tall roller 221 is rotated. That is, while the inner cylindrical section side of the tall roller 221 with respect to its axis is coming into contact with the rotating object, the outer cylindrical section side of the tall roller 221 is contacted with the stationary object. Due to the foregoing, the tall roller 221 can be stably rotated.

As described above, in the above cable reel 210, when the intermediate portion of the roller 221, 222 is held by the ring 218, it is unnecessary to provide a base member which is conventionally attached to the bottom plate. Therefore, the thickness of the cable reel can be reduced by the thickness of the base portion of the base member.

Further, in order to hold the roller 221, 222 by the ring 218, only the bearing hole 218a and roller insertion section 218b are formed in the ring 218. Therefore, it is unnecessary to provide a support pin protruding from the base plate which is needed in the conventional structure. Therefore, the structure can be made simple and thin compared with the conventional base plate. Further, it is unnecessary to provide other parts such as bolts for holding the roller. Accordingly, the number of parts can be reduced, and the number of working steps for attaching the roller can be reduced.

In this connection, the roller insertion section 218b provided in the ring 218 is cut out on the inner circumferential side of the ring 218. Of course, the roller insertion section 218b provided in the ring 218 may be cut out on the outer circumferential side.

Only the tall roller 221 is made to come into contact with the bottom plate 215 and the first roof plate 211a, and the short roller 222 is not contacted with the bottom plate 215 and the first roof plate 211a but contacted with only the flat cable 213. Therefore, the guide member can be effectively positioned and held, and the flat cable 213 can be effectively guided.

FIGS. 28A to 30 are views showing the twelfth embodiment.

Different points of the twelfth embodiment from the eleventh embodiment are described as follows. The bearing holes 218a' formed in the ring 218' are through-holes which penetrate the ring 218'. There are provided no roller insertion sections into which the rollers are inserted from the side. The rollers 221', 222 are composed of two members which are attached into the bearing hole 218a' from the top and the bottom.

Figure 28A:
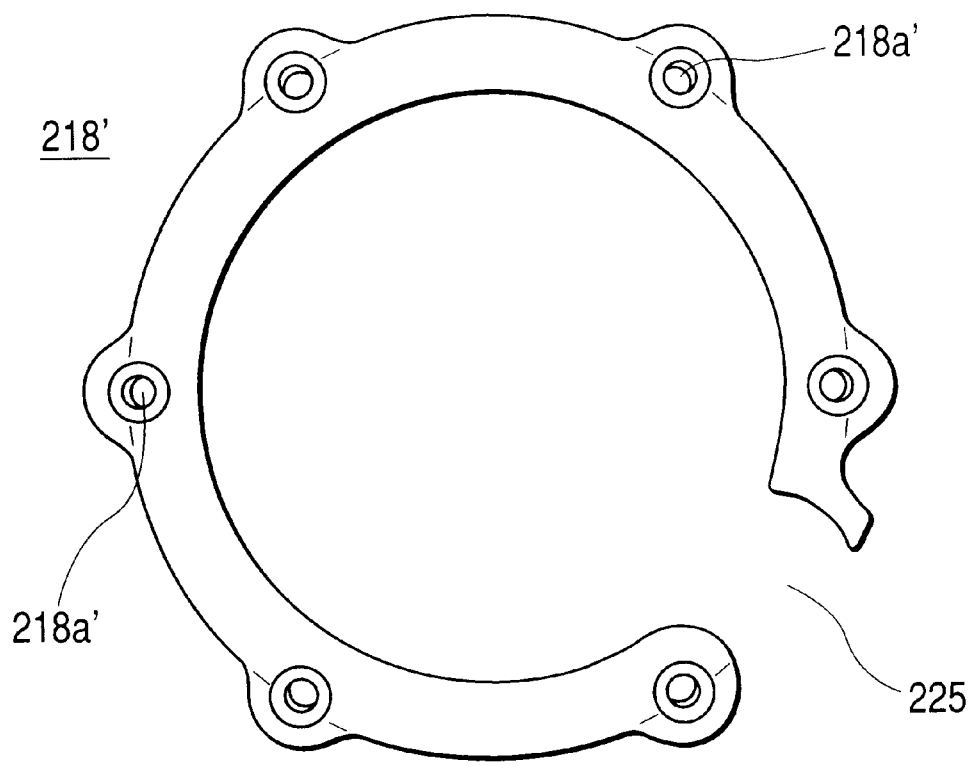
FIG. 28A is a plan view of a ring of a twelfth embodiment.
Figure 28B:
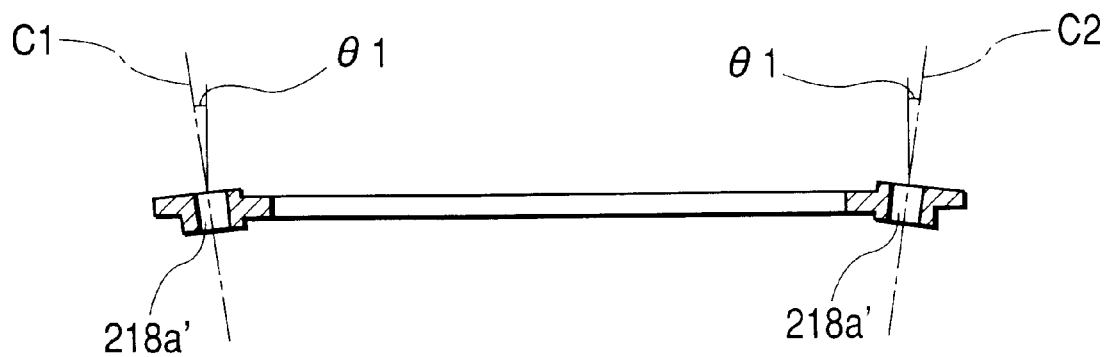
FIG. 28B is a sectional view.
Figure 29:
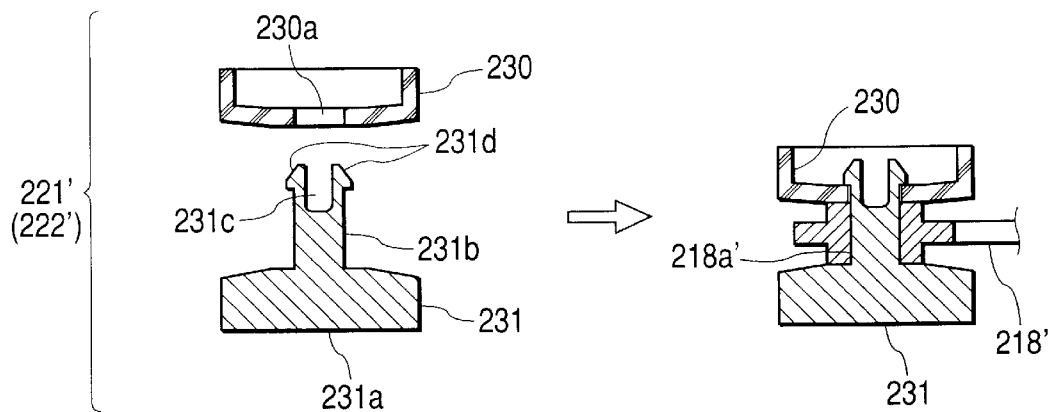
FIG. 29 is a sectional view of a roller of the twelfth embodiment.

In the same manner as that of the eleventh embodiment, as shown in FIG. 28A, the ring 218' is formed into a C-shape having the inversion space 225, and six bearing holes 218a' are formed at predetermined positions. The axis of each bearing hole 218a' is tilted by a predetermined angle. That is, in the twelfth embodiment, in the same manner as that of the tall roller 221', the short roller 222' is tilted and attached to the ring 218'.

In the same manner as that of the eleventh embodiment, a different point between the tall roller 221' and the short roller 222' is that the height of the tall roller 221' is different from that of the short roller 222'. Therefore, only the tall roller 221' will be explained referring to FIG. 29.

The tall roller 221' is vertically divided into the upper roller 230 and the lower roller 231 at a position of the intermediate annular recess portion. In the upper roller 230, the engaging hole 230a is formed at the center of the bottom face of the large diameter cylindrical section. In the short roller 231, the small diameter shaft 31b is protruded from the center of the upper face of the large diameter portion 231a. At an upper end of the shaft 231b, the recess portion 231c is formed, and the engaging pawl 231d is protruded from the outer circumference of the recess portion 231c.

The tall roller 221' is integrated into one body in such a manner that the shaft 231b of the lower roller 231 is inserted into the bearing hole 218a' from a lower portion of the ring 218' while the recess portion 231c of the shaft 231b is being bent and then the engaging pawl 231d of the shaft 231b is inserted into and engaged with the engaging hole 230a of the upper roller 230. Due to the foregoing, the bearing hole 218a' is rotatably interposed between the upper roller 230 and the lower roller 231 in the vertical direction.

In the same manner as that, the short roller 222' is rotatably attached to the ring 218'.

Figure 30:
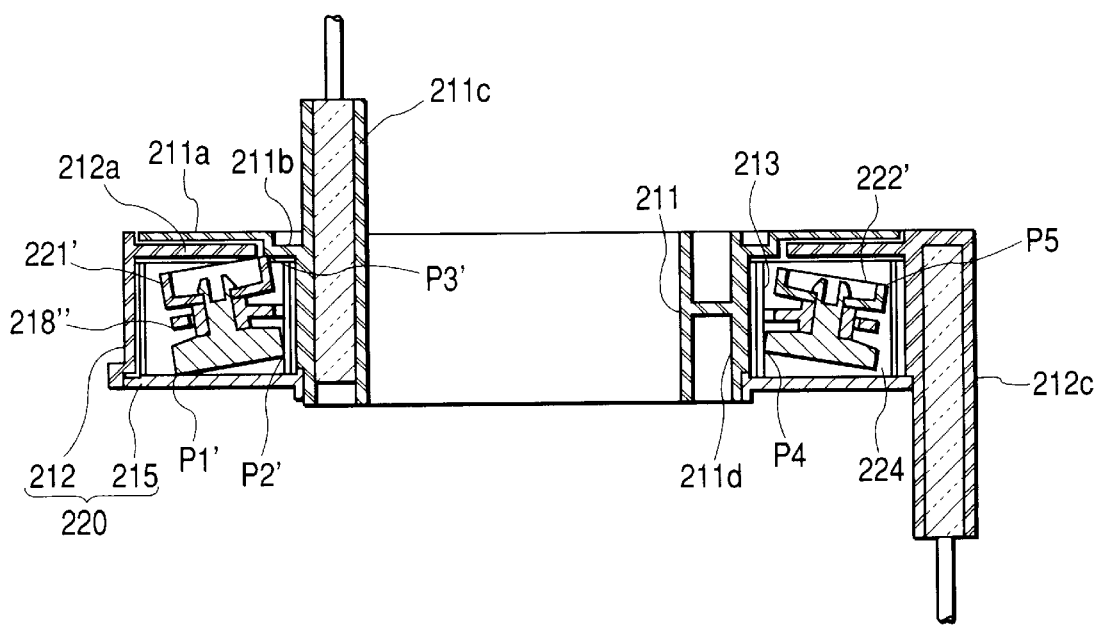
FIG. 30 is a sectional view of a cable reel of the twelfth embodiment.

Since the bearing hole 218a' of the ring 218' is previously tilted, both the tall roller 221' and the short roller 222' are attached to the ring 218' being tilted. As shown in FIG. 30, in this tilting direction, an upper portion of the roller is tilted outside. A lower end edge of the tall roller 221' on the outer cylindrical section side comes into contact with the bottom plate 215 at point P1'. On the other hand, an upper end edge of the tall roller 221' on the inner cylindrical section side comes into contact with the annular recess section 211b of the first roof plate 11a at point P3'. A lower end edge of the tall roller 221' on the inner cylindrical section side comes into contact with the flat cable 212 existing in the inner circumferential passage I at point P2'.

Since the short roller 222' is also tilted, a lower end edge on the inner cylindrical section side comes into contact with the flat cable 213 in the inner circumferential passage I at point P4, and an upper end edge on the outer cylindrical section comes into contact with the flat cable 13 in the outer circumferential passage II at point P5.

The short roller 222' does not come into contact with the bottom plate and the roof plate but only comes into contact with the flat cable 213. Therefore, in the same manner as that of the eleventh embodiment, when the short roller 222' comes into contact with the flat cable 213, it can be smoothly rotated.

Figure 31A:
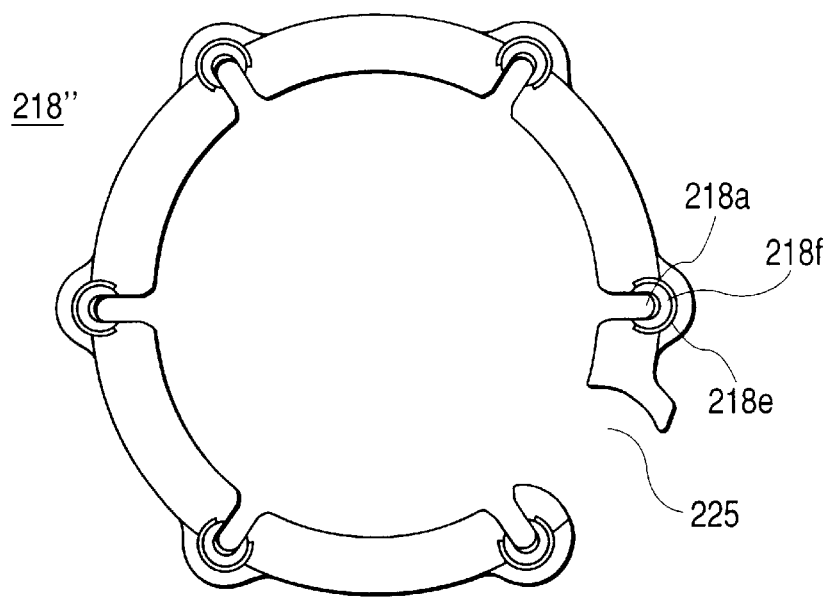
FIG. 31A is a plan view of a ring of a thirteenth embodiment.
Figure 31B:
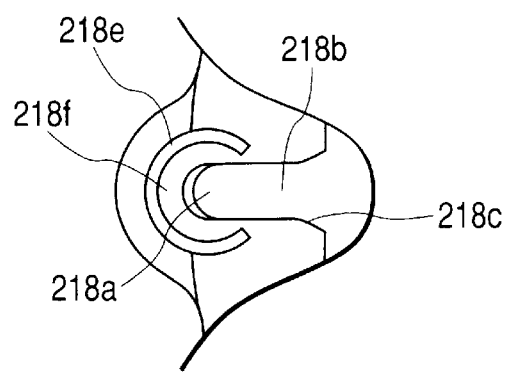
FIG. 31B is an enlarged view of a primary portion.

FIG. 31A is a view showing a thirteenth embodiment.

A different point of the thirteenth embodiment from the eleventh embodiment is that the tall roller can be easily twisted and tilted when the bearing hole 218a of the ring 218 is formed being easily bent.

To be in more detail, as shown in FIG. 31A, in the ring 218", a C-shaped slit 218e is cut out around the bearing hole 218a. Due to the foregoing, the C-shaped bend section 218f is formed between this slit 218e and the outer circumference of the bearing hole 218a. When this bend section 218f is formed, the periphery of the bearing hole of the tall roller 221 can be easily twisted, and the tall roller 221 can be tilted by a predetermined angle.

Figure 32:
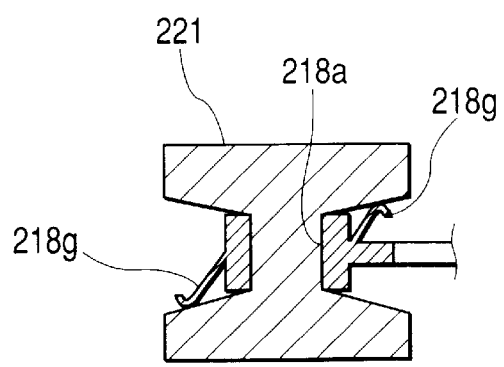
FIG. 32 is a sectional view of a fourteenth embodiment.
Figure 33:
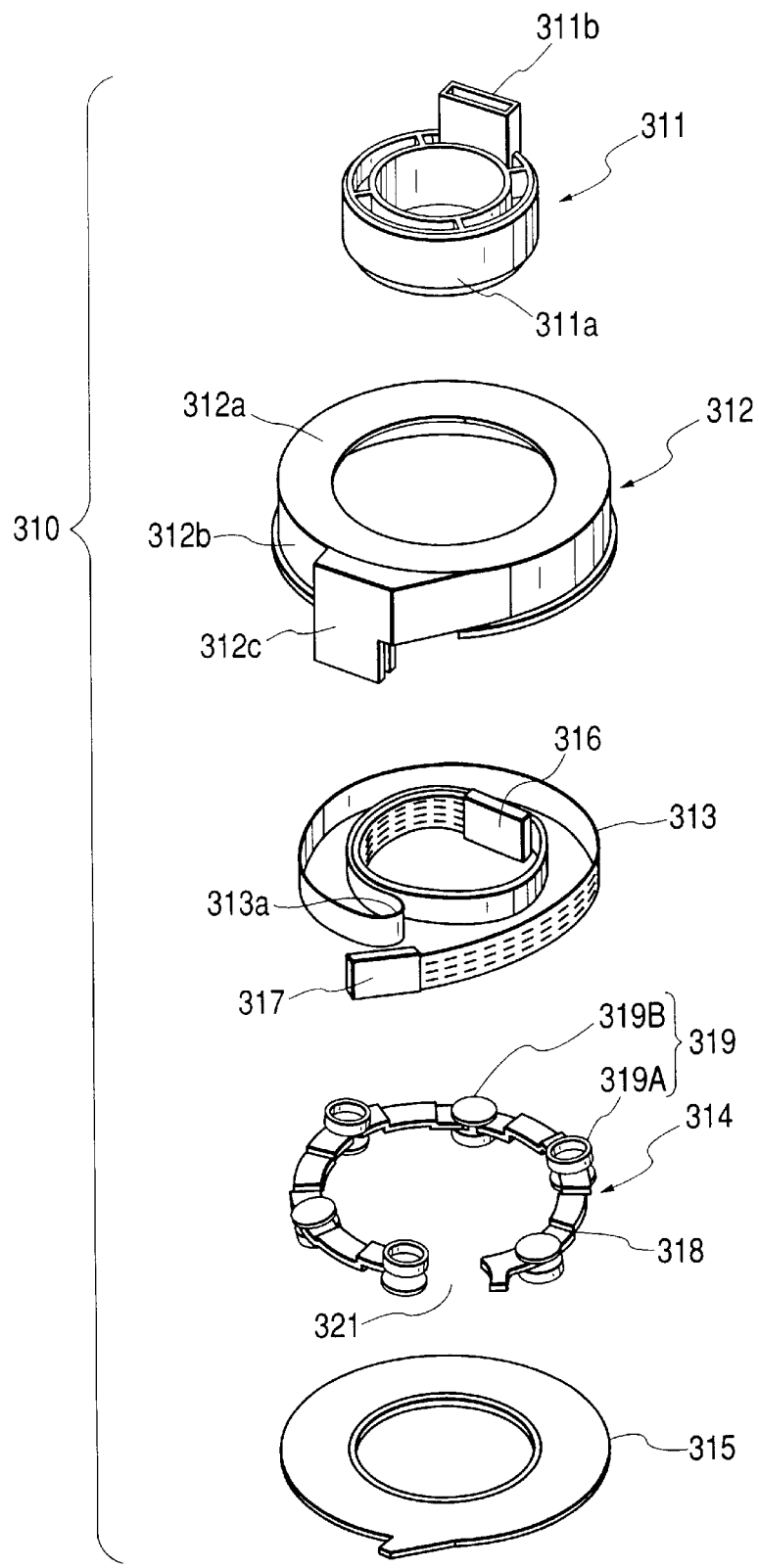
FIG. 33 is an exploded perspective view of a cable reel of a fifteenth embodiment of the present invention.

FIG. 32 is a view showing a fourteenth embodiment.

A different point of the fourteenth embodiment from the eleventh embodiment is that the spring 218g is protruded from the periphery of the bearing hole 218a used for each roller provided in the ring and the upper and lower large diameter portions of the rollers 221, 222 are respectively pushed onto the bottom plate contact side and the roof plate contact side by the spring 218g.

In this connection, only the structure of the tall roller 221 is disclosed in FIG. 32.

When the spring is provided as described above, it becomes possible to make the tall roller 221 come into contact with the bottom plate and roof plate without the occurrence of rattle. At the same time, the occurrence of rattle between the short roller 222 and the ring can be suppressed.

FIGS. 33 to 37C are views showing a fifteenth embodiment.

In the cable reel 310 of the fifteenth embodiment, the stationary body 320, the outer cylinder of which is composed of an outer frame 312 and bottom plate 315, and the movable body 311, which becomes an inner cylinder, are connected with each other being capable of relatively rotating.

The movable body 311 includes: an inner cylindrical section 311a which becomes an inner cylinder; and a connector accommodating section 311b protruding upward from an upper end portion of the inner cylindrical section 311a.

The outer frame 312 of the stationary body 320 includes: an outer cylindrical section 312b which becomes an outer cylinder; a second roof plate section 312a, which is formed annular, protruding inward from an upper end of the outer cylindrical section 312b; and a connector accommodating section 312c protruding downward from an outer face of the outer cylindrical section 312b. The bottom plate 315 is an annular plate, which becomes a bottom plate section of the cable reel 310, and locked and fixed at the outer frame 312.

In the annular hollow section 324 formed between the movable body 311 and the stationary body 320, there is rotatably provided a guide member 314 in which six rollers 319 are attached alternately upside down to the C-shaped ring 318 at regular intervals.

Inside the annular hollow section 324, the flat cable 313, one connector 316 of which is engaged with the connector accommodating section 311b of the movable body 311, is wound around the inner circumferential passage I formed between the inner circumferential side of the guide member 314 and the outer circumferential face of the inner circumferential wall 311a of the movable body 311. While an intermediate portion of the flat cable 313 is determined to be an inversion section 313a, the flat cable 313 is threaded into the inversion space 321 formed between the end portions of the ring 318 of the guide member 314. Then, the flat cable 313 is wound back in the outer circumferential passage II formed between the outer circumferential side of the guide member 314 and the inner circumferential face of the outer cylindrical section 312b. The connector 317 of the other end of the flat cable 313 is accommodated in the connector accommodating section 312c of the outer frame 312.

Figure 36:
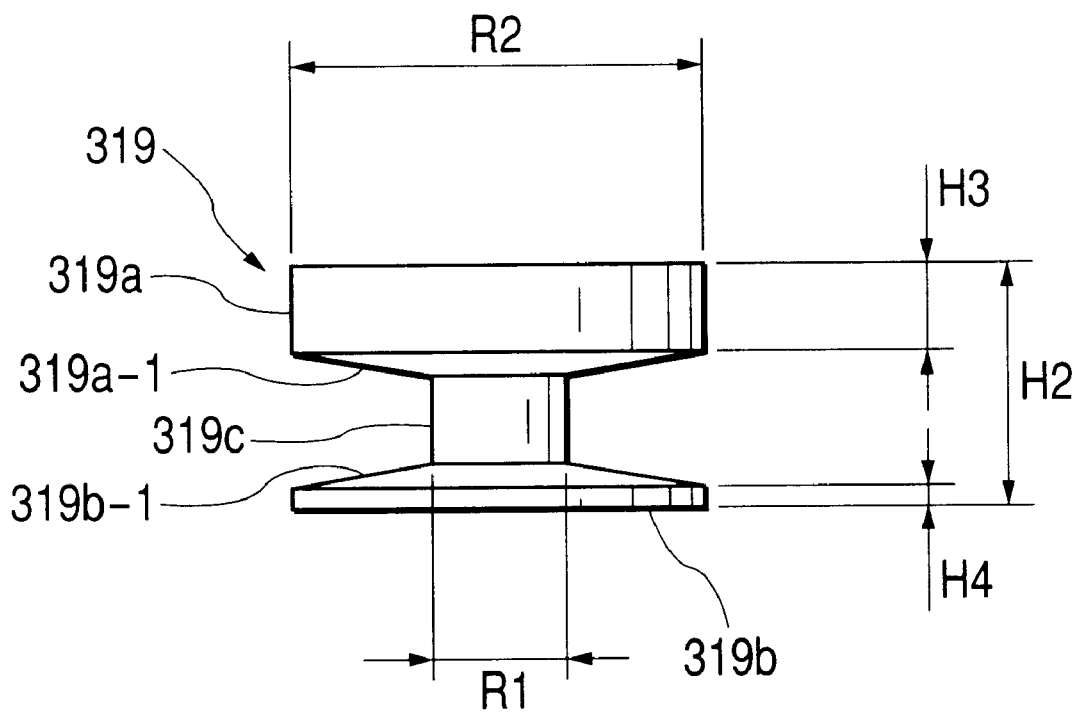
FIG. 36 is a front view of a roller of the fifteenth embodiment.

As shown in FIG. 36, the roller 319 is formed into a bobbin shape in which the annular recess portion 319c in the intermediate portion in the axial direction of the roller is interposed between the upper large diameter portion 319a and the lower large diameter portion 319b. Height H3 of the upper large diameter portion 319a is large, and height H4 of the lower large diameter portion 319b is small. Entire height H2 of the roller 319 is approximately ½ of height H1 of the annular hollow section 324.

In this connection, the opposing faces 319a-1, 319b-1 of the upper 319a and the lower large diameter portion 319b are protruded from the outer circumferences being tapered.

Figure 37A:
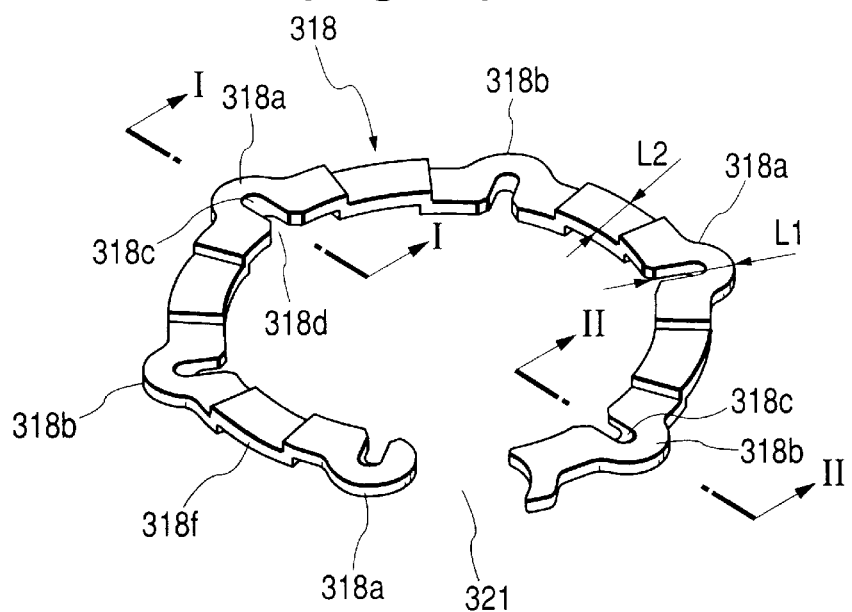
FIG. 37A is a perspective view of a ring of the fifteenth embodiment.

As shown in FIG. 37A, the ring 318 is formed into a C-shape having the inversion space 321. When step portions composed of high and low portions are arranged in the circumferential direction of the ring 318, the upper step portions 318a and the lower step portions 318b are alternately arranged via the middle step portions 318f. In the upper step portions 318a and the lower step portions 318b, six bearing holes 318c are provided. A portion of each bearing hole 318c is cut out and open to the inner circumferential edge of the ring 318, so that the bearing hole 318c is communicated with the roller insertion section 318d.

Figure 37B:
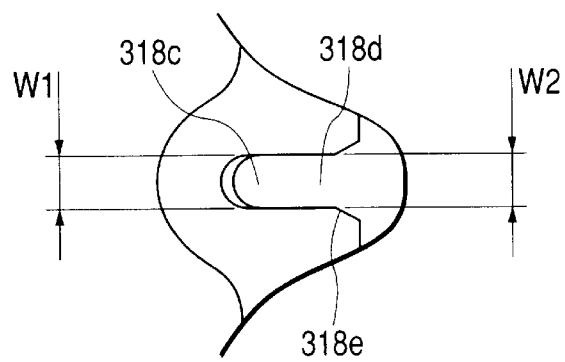
FIG. 37B is an enlarged view showing a primary portion.

Width W1 of the bearing hole 318c shown in FIG. 37B is set to be a little larger than outer diameter R1 of the annular recess section 319b of the roller 319. On the other hand, width W2 of the roller insertion section 318d is set to be a little smaller than outer diameter R1 of the annular recess section 319b of the roller 319, and the entrance section 318c open at the inner circumferential end of the roller insertion section 318b is expanded being tapered.

Figure 37C:
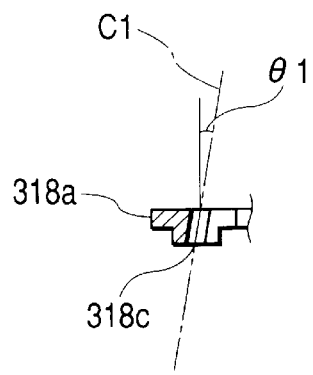
FIG. 37C is a sectional view taken on line I—I in FIG. 37A.
Figure 37D:
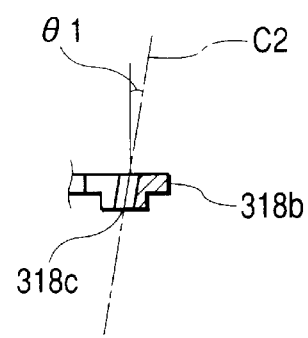
FIG. 37D is a sectional view taken on line II—II in FIG. 37A.

As shown in FIGS. 37C and 37D, axis C1 of the bearing hole 318c of the upper step portion 318a is tilted by angle θ1 with respect to the normal line of the ring 318 so that axis C1 can be directed in an upper inner direction, and axis C2 of the bearing hole 318c of the lower step portion 318b is tilted by angle θ1 with respect to the normal line of the ring 318 so that axis C2 can be directed in an upper outer direction. The above angle θ1 is in the range of 3°<θ1<20°, and it is preferable that the above angle θ1 is in the range of 5°<θ1<10°.

In this case, the inequality of L2<L1<R2 is established, wherein L1 is the width of a portion of the ring 318 in which the bearing hole 318c is formed, L2 is the width of other portions of the ring 318 and R2 is the outermost diameter of the roller 319. Therefore, the outer circumferential face of the roller 319 is protruded from the inner and outer circumferential faces of the ring 318.

The guide member 314 composed of the ring 318 and rollers 319 rotatably holds the rollers 319 when the annular recess portion 319c of each roller 319 is slidably inserted into the bearing hole 318c by one-touch motion from the roller insertion section 318b of the ring 18. When width W2 of the roller insertion section 318b is made to be a little smaller than outer diameter R1 of the annular recess section 319b, the roller 319 can be prevented from coming out.

In this case, the roller 319 is attached into the bearing hole 318c of the upper step portion 318a so that the upper large diameter portion 319a of the roller 319 can be directed upward and the roller 319 can become the upper roller 319A. The roller 319 is attached into the bearing hole 318c of the lower step portion 318b so that the upper large diameter portion 319a of the roller 319 can be directed downward and the roller 319 can become the lower roller 319B.

Figure 34:
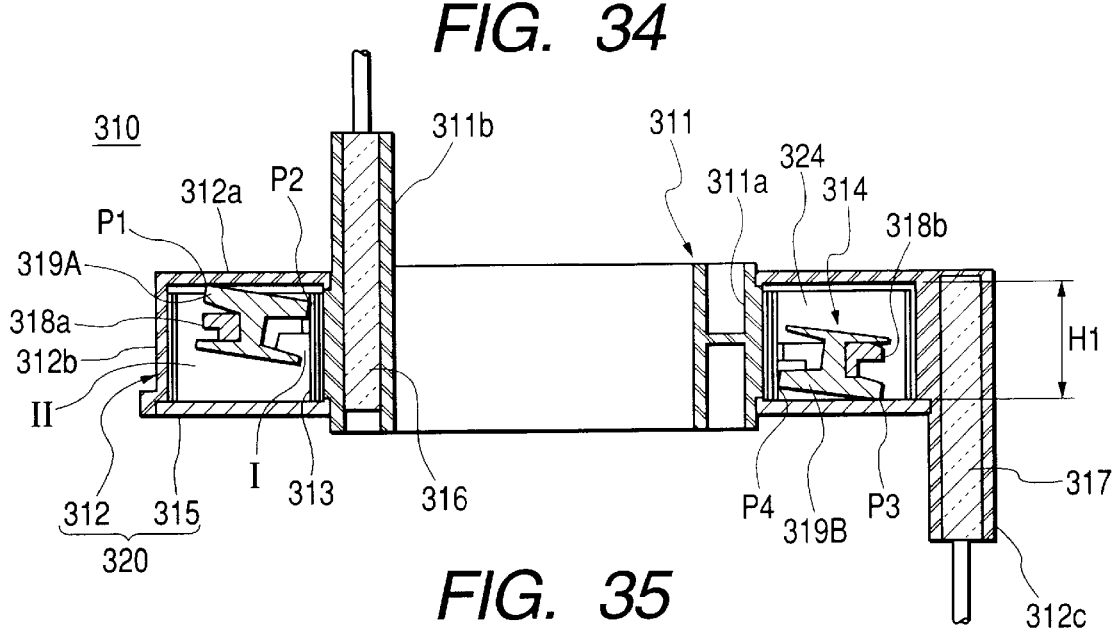
FIG. 34 is a vertical sectional view of the cable reel of the fifteenth embodiment.

When the guide member 314 is accommodated in the annular hollow section 324 in the above condition, as shown in FIG. 34, since the bearing hole 318c of the upper stage portion 318a is tilted in an upper inner direction, the upper roller 319A is tilted in the upper inner direction, and an upper end outer edge of the upper roller 319A comes into point-contact with the roof plate 312a at point P1, and an upper end inner edge of the upper roller 319A comes into point-contact with the flat cable 313 passing in the inner circumferential passage I at point P2.

Since the bearing hole 318c of the lower step portion 318b is tilted in a lower inner direction, the lower roller 319B is tilted in a lower inner direction. Therefore, a lower end outer edge of the lower roller 319B comes into point-contact with the bottom plate 315 at point P3, and a lower end inner edge of the lower roller 319B comes into point-contact with the flat cable 313 passing in the inner circumferential passage I at point P4.

Next, operation of the cable reel 310 will be explained below.

Figure 35:
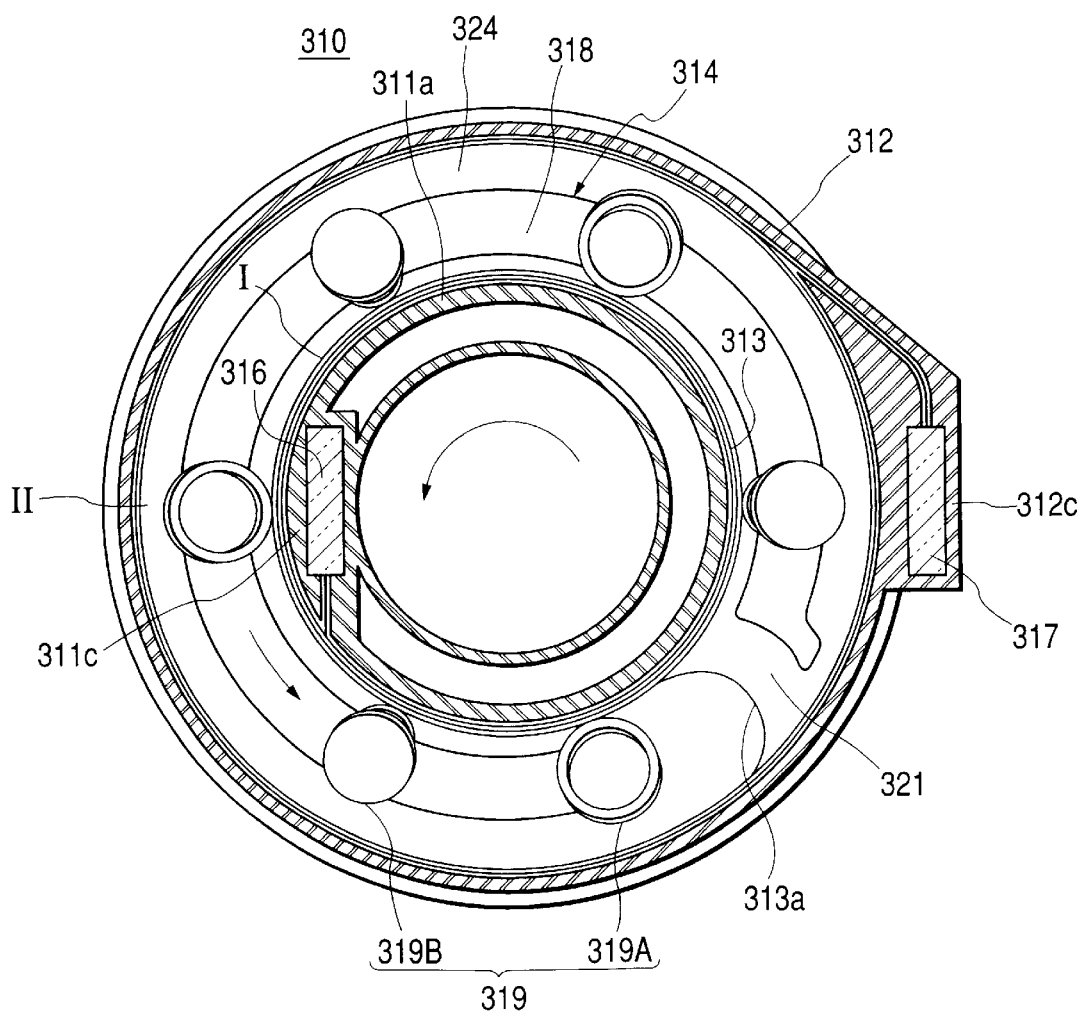
FIG. 35 is a horizontal sectional view of the cable reel of the fifteenth embodiment.

As shown in FIG. 35, when a steering shaft (not shown) is rotated, the movable body 311 is rotated in one direction (clockwise). Then the flat cable 313 is wound up. Therefore, the flat cable 313 in the outer circumferential passage II passes through the inversion space 321 being folded back, so that the flat cable 313 is wound up around the inner circumferential passage I.

On the other hand, when the movable body 311 is rotated in the reverse direction (counterclockwise), the flat cable 313 is wound back. Then, the flat cable 313 in the inner circumferential passage I passes through the inversion space 321 being folded back, so that the flat cable 312 is sent out to the above outer circumferential passage II.

Since the flat cable 313 in the inner circumferential passage I comes into contact with the roller 319 when the flat cable 313 is rotated, the roller 319 is also rotated. Therefore, the flat cable 313 is guided by the roller 19.

As shown in FIG. 34, in the guide member 314, the upper roller 319A comes into contact with the roof face 312a at point P1, and the lower roller 319B comes into contact with the bottom plate 315 at point P3. Therefore, the guide member 14 is vertically interposed between the top and the bottom. Therefore, it becomes possible to prevent the occurrence of rattle in the vertical direction, and the generation of noise can be prevented.

There is no possibility of the occurrence of rattle of the roller 319. Therefore, it becomes possible to make a big space between the upper roller 319A and the bottom plate 315, and also it becomes possible to make a big space between the lower roller 319B and the roof face 312a. Accordingly, the roller 319 can be downsized, that is, the weight of the cable reel can be reduced.

The roller 319 is attached being tilted. Therefore, for example, P1 at which the roller 319A comes into contact with the roof face 312a, which is a stationary body 320, and point P2 at which the roller 319A comes into contact with the flat cable 313, which is a rotary body, are located symmetrically to each other with respect to the roller axis. Further these points P1 and P2 come into point-contact with the bodies. Therefore, as if a drum can were rolled being tilted, the roller 319A can be stably rolled, and frictional resistance of the roof face 312a with the roller 319A can be greatly reduced, and further irregular fluctuation of the torque can be reduced. Of course, the circumstances are the same with respect to the lower roller 319B.

Since the intermediate portion (annular recess portion 319c) of the roller 319 is held by the ring 318, it is unnecessary to provide a base plate which is conventionally attached to the bottom plate. Therefore, the thickness of the cable reel 310 can be reduced without increasing the thickness of the bottom plate.

In this connection, in this embodiment, the roller insertion section 318b provided in the ring 318 is formed by cutting out the inner circumferential side of the ring 318, however, the roller insertion section 318b may be formed by cutting out the outer circumferential side of the ring 318.

Figure 38:
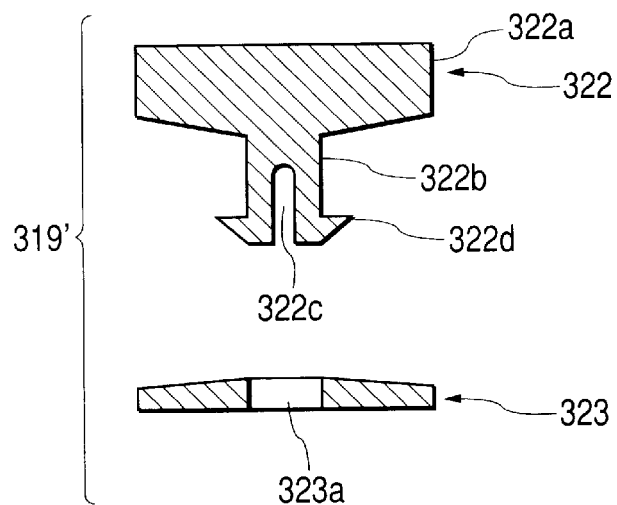
FIG. 38 is an exploded sectional view of a roller of a sixteenth embodiment.
Figure 39:
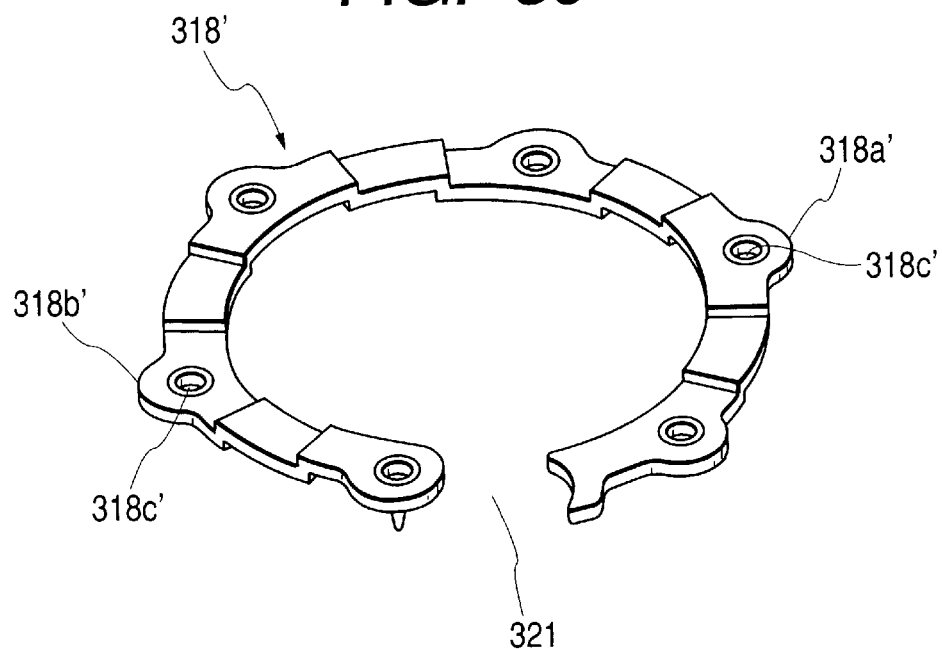
FIG. 39 is a perspective view of a ring of the sixteenth embodiment.

FIGS. 38 and 39 are views showing a sixteenth embodiment.

Different points of the sixteenth embodiment from the fifteenth embodiment are described as follows. The bearing holes 318c' formed in the ring 318' are through-holes which penetrate the ring 318'. There are provided no roller insertion sections into which the rollers are inserted from the side. Each roller 319' are composed of two members which are incorporated into the bearing hole 318c' from the top and the bottom.

In the same manner as that of the fifteenth embodiment, the ring 318' is formed into a C-shape having the inversion space 321, and step portions having high and low portions are formed in the circumferential direction of the ring 318'. In the upper step portions 318a' and the lower step portions 318b', six bearing holes 18c' are formed. Axes of these bearing holes 318c' are tilted by a predetermined angle in the same manner as that of the fifteenth embodiment.

The roller 319' is vertically divided into the first roller 322 and second roller 323 at the position of the intermediate annular recess portion. The small diameter shaft 322b is protruded from the center of the lower face of the large diameter portion 322a of the first roller 322 arranged in an upper portion. The recess 322c is formed at a lower end of the small diameter shaft 322b, and the engaging pawl 322d is protruded from the outer circumference of the recess section 322c. In the second roller 323 arranged in a lower portion, the engaging hole 323a is formed at the center of the bottom face of the large diameter disk section.

Concerning the upper roller of the above roller 319', the small diameter shaft 322b of the first roller 322 is inserted into the bearing hole 318c' from an upper portion of the upper step portion 318a' of the ring 318' while the small diameter shaft 322b is being bent by the recess 322c. After that, the engaging pawl 323d is inserted into and engaged with the engaging hole 323a of the second roller 323, so that the first roller 322 and second roller 323 can be integrated with each other into one body. Due to the foregoing, the bearing hole 318c' is rotatably pinched by the first roller 322 and second roller 323 from the top and the bottom. In this connection, concerning the lower roller of the above roller 319', the first roller 322 is attached upside down to the ring 318' from a lower portion of the low step portion 318b'.

The shape and size of the roller 319', which is composed of the first roller 322 and second roller 323, are the same as those of the roller 319 of the fifteenth embodiment. The shape and size of the ring 318' are the same as those of the fifteenth embodiment except for the cutout portion of the roller insertion section.

In the above structure, it is unnecessary to provide a roller insertion section communicating with the bearing hole 318a'.

Other points of the structure of this embodiment are the same as those of the fifteenth embodiment. Therefore, explanations are omitted here.

Figure 40:
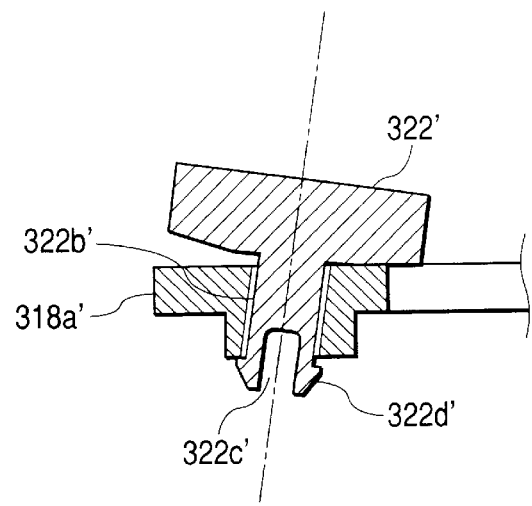
FIG. 40 is a sectional view of a variation of the sixteenth embodiment.
Figure 41:
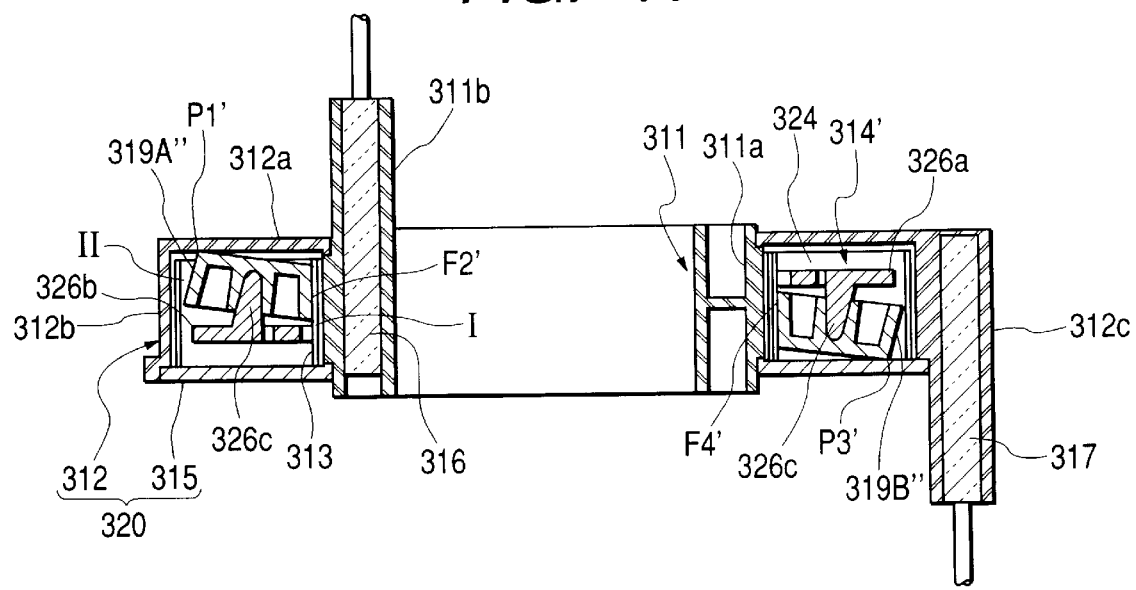
FIG. 41 is a vertical sectional view of a cable reel of a seventeenth embodiment.
Figure 42:
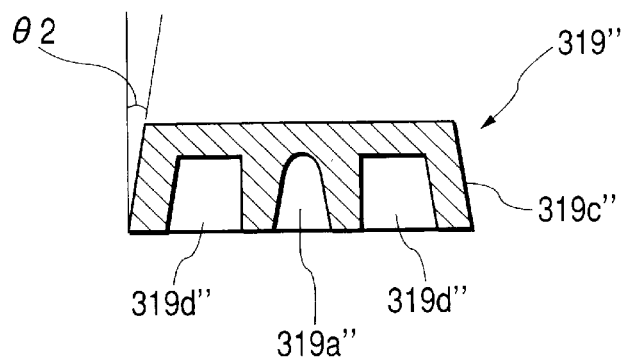
FIG. 42 is a sectional view of a roller of the seventeenth embodiment.
Figure 43A:
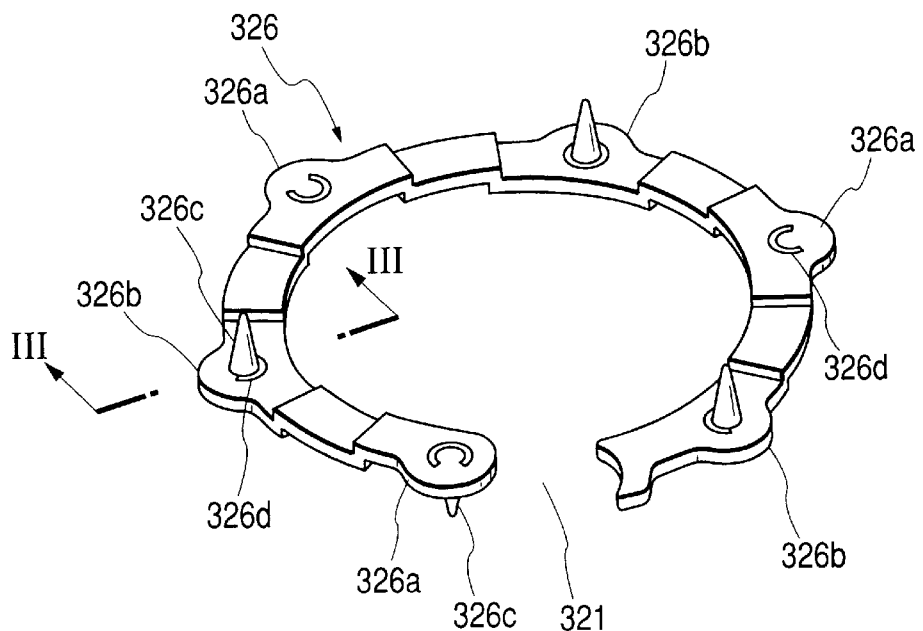
FIG. 43A is a perspective view of a ring of the seventeenth embodiment.
Figure 43B:
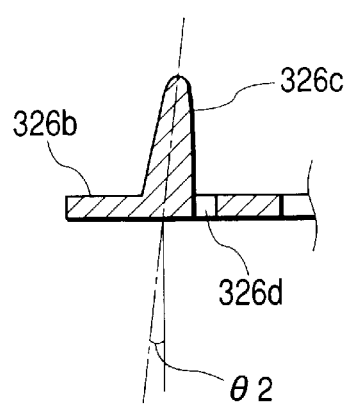
FIG. 43B is a sectional view taken on line III—III in FIG. 43A.

FIG. 40 is a view showing a variation of the sixteenth embodiment.

In this variation, the second roller, which is a large diameter portion on the lower side, is abolished, and only the first roller, which is a large diameter portion on the upper side, composes the roller 322'.

The shape of the roller 322' is approximately the same as that of the roller 323 of the sixteenth embodiment, however, the length of the small diameter 322b' is approximately the same as the height of the bearing hole 318c'.

The small diameter shaft 322b' of the roller 322', which becomes an upper roller, is inserted into the bearing hole 318c' from an upper portion, and the engaging pawl 323d' is rotatably engaged with a lower end edge of the bearing hole 318a'. The small diameter shaft 322b' of the roller 322', which becomes a lower roller, is attached upside down to the ring 318' from a lower portion.

When the above structure is adopted, the roller is composed of only one member of the roller 322'. Therefore, the number of parts can be reduced, and the number of working steps of attaching the roller can be reduced.

FIGS. 41 to 43B are views showing a seventeenth embodiment.

Different points of the seventeenth embodiment from the fifteenth embodiment are described as follows. The roller 319" is attached to the ring from a lower or an upper portion and held by the support shaft 326c which is a roller attaching section.

The roller 319" is composed as follows. The side circumferential face 319c" of the roller 319" is tapered by angle θ2. The conical shaft hole 319a" is formed at the center of the bottom face 319d", and the annular cavity portion 319d" is formed on the outer circumference of the shaft hole 319a".

The ring 326 is composed as follows. The conical support shafts 326c are protruded upward from the lower step portions 326b. Also, the conical support shafts 326c are protruded downward from the upper step portions 326a. Each support shaft 326c is tilted inside toward the end of the shaft 326c itself by angle θ2. Each conical support shaft 326c is given flexibility when the semicircular slit 326d is formed on the inner circumferential side of the root portion of the support shaft 326c. In this connection, the above semicircular slit 326d may be formed on the outer circumferential side of the root portion of the support shaft 326c.

When the support shafts 326c of the ring 326 are rotatably engaged in the shaft holes 319a" of the rollers 319", the rollers 319" attached to the lower step portions 326b become the upper rollers 319A", and the rollers 319" attached to the upper step portions 326b become the lower rollers 319B". In this way, the guide member 314' is formed.

When the guide member 314' is accommodated in the annular hollow section 324, since each support shaft 326c is tilted inside toward the end of the support shaft 326c itself, the upper roller 319A" and the lower roller 319B" are tilted. Therefore, an upper end outer edge of the upper roller 319A" comes into point-contact with the roof plate 312a at point P1', and a lower end outer edge of the lower roller 319B" comes into point-contact with the bottom plate 315 at point P3'.

As described above, the tilting angle of the circumferential side of the roller 319" is θ2, and the tilting angle of the support shaft 326c is also θ2. Therefore, the circumferential side faces on the inner cylindrical section side of the upper 319A" and the lower roller 319B" become parallel with the inner cylindrical section 311a of the movable body 311. Accordingly, the circumferential side faces on the inner cylindrical section side of the upper 319A" and the lower roller 319B" also become parallel with the flat cable 313 passing in the inner circumferential passage I along the inner cylindrical section 311a, and the outer circumferential faces on the inner cylindrical section 311a side of the upper 319A" and the lower roller 319B" respectively come into line-contact with the flat cable 313 at F2' and F4'. As a result, rotation of the flat cable 313 can be easily received by the upper 319A" and the lower roller 319B". Therefore, the roller 319" can be stably rotated, and it is possible to prevent the flat cable 313 from bending outward.

Other points of the structure are the same as those of the fifteenth embodiment. Therefore, like reference characters are used to indicate like parts, and explanations are omitted here.

Figure 44:
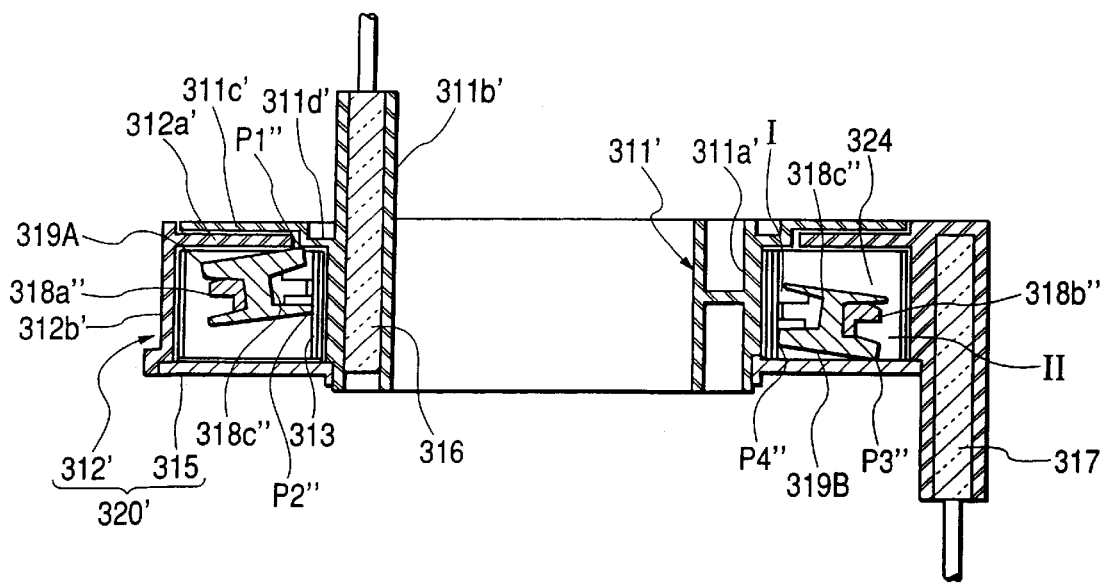
FIG. 44 is a vertical sectional view of a cable reel of a eighteenth embodiment.
Figure 45:
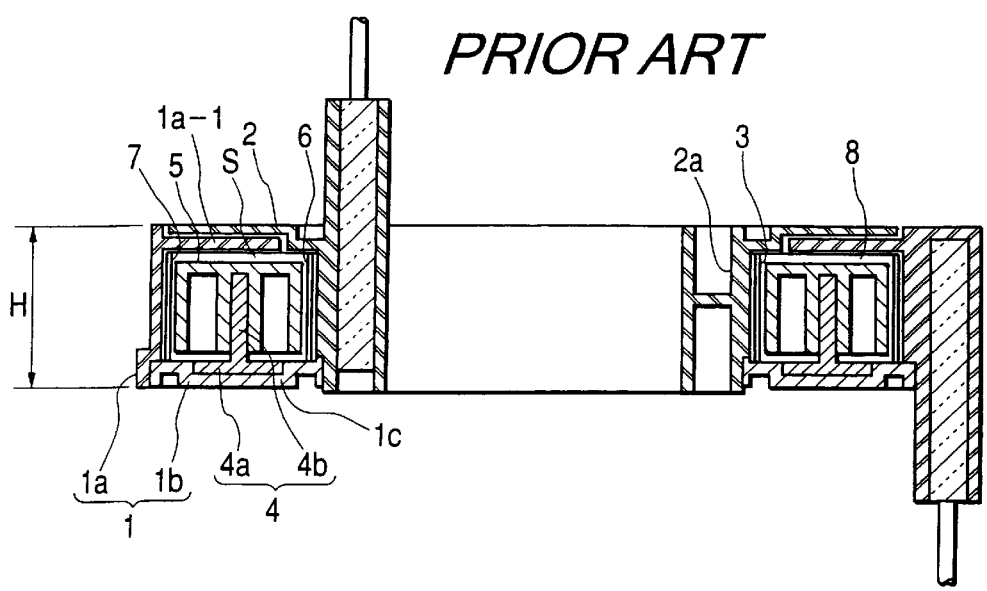
FIG. 45 is a vertical sectional view of a conventional cable reel.

FIG. 44 is a view showing an eighteenth embodiment.

Different points of the eighteenth embodiment from the fifteenth embodiment are described as follows. All the bearing holes 318c" are tilted in an upper outward direction. Further, not only the stationary body 320' but also the movable body 311' compose a roof face of the annular hollow section 324.

The movable body 311' includes: the first annular roof plate 311c' protruding from an upper end of the inner cylindrical section 311a' being formed like a flange-shape; and the annular groove 311d' arranged on the inner cylindrical section 311a' side of the first roof plate 311c'. The outer frame 312' of the stationary body 320' is provided with the second annular roof plate 312a' protruding inward from a portion close to the upper end of the outer cylindrical section 312b' which becomes the outer cylinder.

Both the axis of the bearing hole 318c" in the upper step portion 318a" of the ring 318" and the axis of the bearing hole 318c" in the lower step portion 318b" are tilted in an upper outer direction. Therefore, an upper end inner edge of the upper roller 319A comes into point-contact with the first roof plate 311c' of the movable body 311' at point P1", and a lower end inner edge of the upper roller 319A comes into point-contact with the flat cable 313 passing in the inner circumferential passage I at point P2". On the other hand, a lower end outer edge of the lower roller 319B comes into point-contact with the bottom plate 315 at point P3". Further, a lower end inner edge of the lower roller 319B comes into point-contact with the flat cable 313 passing in the inner circumferential passage I at point P4".

When the above structure is adopted, although contact points P1" and P2" of the upper roller 319A are located on the same side with respect to the roller shaft, that is, although contact points P1" and P2" of the upper roller 319A are not located symmetrically to each other with respect to the roller axis, since both the first roof 311c' and the flat cable 313 are rotary bodies, the upper roller 319a can be smoothly, stably rotated.

In any of the above embodiments, the bottom plate or roof face coming into contact with the roller may be coated with lubricant or covered with a sliding film or sliding sheet by adhesion.

The axis of the roller may not be tilted but the upper end face of the upper roller may be made to come into surface-contact with the roof face and the lower end face of the lower roller may be made to come into surface-contact with the bottom face. In the above case, the sliding film or sliding sheet is stuck onto the roof and bottom face.

As can be clearly seen in the above explanations, according to the present invention, the guide member for guiding the flat cable is attached to the ring at an intermediate portion of the roller in the axial direction. Therefore, compared with the conventional guide member in which the base plate is arranged on the bottom plate and the roller is supported by the pin protruding from the base plate, the base plate can be abolished. According to the abolition of the base plate, the thickness of the cable reel can be reduced.

Since the above roller is tilted, the contact position of the roller with the flat cable, which is a rotary object, and the contact position of the roller with the bottom plate, which is a stationary object, can be located on the inner cylinder side and the outer cylinder side which are symmetrical to each other with respect to the axis of the roller. As a result, the roller can be stably rotated. Further, the bottom plate of the stationary body and the roller come into point-contact with each other. Therefore, frictional resistance can be reduced. As a result, the torque can be reduced.

When the annular recess section of the above roller is rotatably engaged in the bearing hole of the ring, it becomes unnecessary to provide a protruding pin for holding the roller. Therefore, the material cost of the ring can be reduced, and further it is unnecessary to fasten the roller with a bolt. Only a worker has to do is to engage the annular recess portion of the roller in the bearing hole. Therefore, the number of parts can be reduced. As a result, the number of working steps can be reduced.

When the lower end edge on the outer cylindrical section side of each roller is contacted with the bottom plate and the upper end edge on the inner cylindrical section side is contacted with the roof plate, each roller can be restricted from the top to the bottom. Therefore, the occurrence of rattle in the vertical direction can be prevented, and further the generation of noise can be prevented.

When the grooves are provided on the bottom plate and/or the roof plate and further the lower end edge on the outer cylinder side of the roller and the upper end edge on the inner cylinder side are inserted into the groove, the roller and ring are not idly moved in the annular hollow section in the radial direction. Therefore, the occurrence of rattle and noise can be further prevented.

When the outer faces of the upper and the lower large diameter portion of each roller are formed into a conical shape being tapered and the outer circumferential faces on the inner cylinder side of the upper and the lower large diameter portions are made to be parallel with the inner cylindrical section so that the outer faces of the upper and the lower large diameter portion of each roller can come into line-contact with the upper and the lower side portions in the width direction of the flat cable, the roller can easily receive torque from the flat cable. Therefore, the roller can be smoothly rotated, and the flat cable can be prevented from bending onto the outer diameter side.

When the outer cylindrical section side of the lower large diameter portion of roller is pushed downward by the spring protruding from the outer circumferential edge of the bearing hole, it becomes possible to prevent the occurrence of rattle between the roller and the ring. Further, it is possible to ensure the contact of the roller with the bottom plate. Therefore, the generation of noise can be prevented.

Further, when the slit is formed at the outer circumferential edge of the bearing hole so as to provide flexibility of the bearing hole, even if the roller is interposed by the movable body and the stationary body in the vertical direction, the bearing hole is bent so that the tilting angle can be changed. Due to the foregoing, the roller height is flexibly changed. Therefore, the roller and the ring can be accommodated in the annular hollow section without being damaged.

Also, as can be clearly seen in the above explanations, according to the present invention, the guide member for guiding the flat cable is attached to the ring at an intermediate portion of the roller in the axial direction. Therefore, compared with the conventional guide member in which the base plate is arranged on the bottom plate and the roller is supported by the pin protruding from the base plate, the base plate can be abolished. According to the abolition of the base plate, the thickness of the cable reel can be reduced.

Only when the rollers are incorporated into the bearing holes of the ring from the top and bottom, the attaching work is completed. Therefore, it is unnecessary to provide pins, which are protruding from the base plate, for holding the rollers like the conventional structure. Accordingly, the material cost of the ring components can be reduced, and further it becomes unnecessary to fasten the rollers with bolts. It is sufficient for a worker to insert the annular recess portion of the roller into the bearing hole. Therefore, the number of parts can be reduced, and the number of the working steps can be also reduced.

The outer diameter of the upper large diameter portion and that of the lower large diameter portion are different from each other, however, the rollers are composed in such a manner that it is impossible to attach the rollers to the ring upside down. Therefore, predetermined positions of the rollers can be contacted with the bottom plate and the flat cable by predetermined angles. Accordingly, it is possible to prevent the occurrence of damage of the flat cable which is caused when the upper and lower rollers are attached upside down.

Since the diameter of the upper roller and that of the lower roller are different from each other and the axis of each roller is tilted, a contact position of the roller with the flat cable, which is a rotary body, and a contact position of the roller with the bottom plate, which is a stationary body, can be located symmetrically with respect to the axis on the inner cylinder side and the outer cylinder side. As a result, the roller can be stably rotated. Further, since the bottom plate of the stationary body and the roller come into line-contact with each other, frictional resistance can be reduced, and torque can be also reduced.

The outer circumferential faces of the upper and lower large diameter portions of the roller are tapered like a cone, and the outer circumferential face on the inner cylinder side is made to be parallel to the inner cylindrical section and made to come into line-contact with the upper and lower sides in the width direction of the flat cable. Then, the roller can easily receive torque from the flat cable. Therefore, the roller can be smoothly rotated, and at the same time the flat cable can be prevented from bending to the outer diameter side.

When the bottom plate is provided with a groove and a lower end edge on the outer cylinder side of the lower roller is inserted into the groove, the roller and the ring are not idly moved in the radial direction in the annular hollow section. Therefore, the occurrence of rattle and the generation of noise can be further prevented.

Also, as can be clearly seen in the above explanations, according to the present invention, the guide member for guiding the flat cable is attached to the ring at an intermediate portion of the roller in the axial direction. Therefore, compared with the conventional guide member in which the base plate is arranged on the bottom plate and the roller is supported by the pin protruding from the base plate, the base plate can be eliminated. According to the elimination of the base plate, the thickness of the cable reel can be reduced.

Concerning the roller, there are provided two types of rollers, one is a tall roller and the other is a short roller. Before the tall roller is accommodated in the annular hollow section, it is tilted so that the height of the tall roller can be larger than that of the annular hollow section. When the upper and the lower end edge of the tall roller are interposed and held between the bottom plate and the roof plate with pressure, the ring is bent, so that the tilting angle of the tall roller is made gentle. In this way, the tall roller is accommodated in the annular hollow section. Therefore, the guide member can be held in the annular hollow section. On the other hand, since the height of the short roller is made to be smaller than that of the annular hollow section, the short roller does not come into contact with the bottom plate and the roof plate but comes into contact with only the flat cable. Accordingly, the torque can be reduced.

Since the annular recess portion of the roller is rotatably engaged in the bearing hole of the ring, unlike the conventional structure, it is unnecessary to protrude a pin for holding the roller. Therefore, the material cost of the ring can be reduced. Further, it becomes unnecessary to fasten the roller with a bolt. It is only necessary for a worker to insert the annular recess portion of the roller into the bearing hole. Therefore, the number of parts can be reduced, and further the number of working steps necessary for attaching can be reduced.

As can be seen in the above explanations, according to the present invention, the upper roller of the guide member comes into contact with the roof face of the annular hollow section, and the lower roller of the guide member comes into contact with the bottom face of the annular hollow section. Therefore, the guide member is held from the top and the bottom. Accordingly, the occurrence of rattle in the vertical direction can be prevented, and also the occurrence of noise can be prevented.

When the occurrence of rattle is avoided, the roller can be downsized, and it becomes possible to make a big space on one side of the roller. Therefore, the weight of a product can be reduced.

Concerning the ring for holding the upper and the lower roller, the ring is arranged in the central space of the annular hollow section in the intermediate portion of the upper and the lower roller. Therefore, the thickness of the bottom plate is not increased, and the thickness of a product can be reduced.

When the vertical step portions are provided in the ring in the circumferential direction, it is possible to reduce the heights of the upper and the lower roller irrespective of the height of the annular hollow section. Therefore, the upper and the lower roller can be further downsized, and the weight of a product can be further reduced.

When the guide member is composed in such a manner the roller attaching section of the ring is formed into a support shaft protruding from an upper and a lower face of the ring, the upper and the lower roller are formed into a shape in which a bearing hole open to the roller attaching side is provided on the roller attaching side and the support shaft of the roller attaching section is rotatably engaged in the bearing hole, the roller can be downsized, and the weight of a product can be further reduced.

As the structure of the guide member, the roller includes an annular recess portion which is provided between the thick upper large diameter portion and the thin lower large diameter portion. On the other hand, the roller attaching section is formed into a bearing hole, and the annular recess portion is rotatably inserted into and attached to the bearing hole. Due to the above structure, the roller is engaged with the bearing hole by the annular recess portion, and the roller is prevented from coming out by the upper and lower large diameter portions. Therefore, it is possible to enhance the handling property of the guide member without increasing the number of parts and the number of mandays of attaching.

When the upper and the lower roller are attached to the ring while the axes of the rollers are being tilted and when the edges of the upper and the lower face of the upper and the lower roller are respectively contacted with the roof face and the bottom face, the contacting portions are put into a point contact state. Therefore contact friction can be greatly reduced and irregular fluctuation of torque can be reduced.

What is claimed is:

1. A cable reel comprising:
   a stationary body;
   a movable body combined with the stationary body to define an outer cylindrical section, an inner cylindrical section, a bottom plate section and a roof plate section surrounding an annular hollow section;
   a guide member disposed in the annular hollow section, the guide member including a C-shaped ring and a plurality of rollers spaced apart from each other and rotatably supported by the ring; and
   a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers,
   wherein a winding direction of the flat cable in the inner circumferential passage is inverted to that of the flat cable in the outer circumferential passage;
   an intermediate portion of each roller is rotatably held by the ring under the condition that a roller axis is tilted; and
   at least one portion of each roller on the inner cylindrical section side comes into contact with the flat cable passing through the inner circumferential passage and at least one portion of each roller on the outer cylindrical section side comes into contact with the bottom plate section of the stationary body.

2. The cable reel as claimed in claim 1, wherein the ring has bearing holes arranged at predetermined intervals in the circumferential direction, each roller has an upper and a lower large diameter portions and an annular recess portion interposed between the upper and lower large diameter portions, the annular recess portion is rotatably engaged in the bearing hole, a lower end portion of the roller on the outer cylindrical section side comes into contact with the bottom plate section under the condition that the inner cylindrical section side of the roller is raised from the bottom plate section, and the inner cylindrical section side of the roller comes into contact with the flat cable.

3. The cable reel as claimed in claim 1, wherein the axis of the roller is tilted to the outer cylindrical section side by the tilting angle of not less than 3° and not more than 20° with respect to the normal line of the bottom plate section.

4. The cable reel as claimed in claim 1, wherein one portion of the roller is contacted with the roof plate section of the movable body.

5. The cable reel as claimed in claim 4, wherein a groove is formed at least one of the bottom plate section and the roof plate section, and an edge portion of the roller is rotatably inserted into and engaged with the groove.

6. The cable reel as claimed in claim 2, wherein the upper and the lower large diameter portions interposing the annular recess portion are formed into cone-shape, the diameters of which are reduced downward, and the inner cylindrical section side of the upper and the lower large diameter portions of the roller come into line-contact with the flat cable passing through the inner circumferential passage while the inner cylindrical section side of the upper and the lower large diameter portion is kept parallel with the inner cylindrical section.

7. The cable reel as claimed in claim 2, wherein a spring is protruded from an outside circumferential edge of the bearing hole, and the outer cylindrical section side of the lower large diameter portion is pushed downward by the spring.

8. The cable reel as claimed in claim 2, wherein a slit is formed at an outer circumferential edge of the bearing hole.

9. A cable reel comprising:
a stationary body;
a movable body combined with the stationary body to define an outer cylindrical section, an inner cylindrical section, a bottom plate section and a roof plate section surrounding an annular hollow section;
a guide member disposed in the annular hollow section, the guide member including a C-shaped ring and a plurality of rollers spaced apart from each other and rotatably supported by the ring; and
a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers,
wherein a winding direction of the flat cable in the inner circumferential passage is inverted to that of the flat cable in the outer circumferential passage;
each roller has a conical shaft portion between an upper and a lower large diameter portions, the outer diameters of which are different from each other;
an inner circumferential face of each bearing hole formed in the ring in the circumferential direction at predetermined intervals is tapered to be engaged with a conical shaft portion of the roller, and to restrict the attaching position of the roller with respect to the bearing hole.

10. The cable reel as claimed in claim 9, wherein the roller is vertically divided into two rollers, a conical shaft portion, the diameter of which is reduced toward a forward end portion, is protruded from one end face of one of the rollers, an engaging pawl is protruded from a forward end outer circumferential face of the conical shaft section, and the other roller is formed into a cylindrical shape and an engaging hole is formed at the center of a bottom face.

11. The cable reel as claimed in claim 9, wherein a diameter of the upper large diameter portion is larger than that of the lower large diameter portion, outer circumferential faces of the upper and the lower large diameter portion are tapered, and when the roller is assembled to the ring, an axis of the roller is tilted so that a lower end edge on the outer cylindrical section side of the lower large diameter portion comes into contact with the bottom plate and the inner cylindrical section side is raised from the bottom plate and further outer circumferential faces on the inner cylindrical section side of the upper and the lower large diameter portion become parallel with the inner cylindrical section and come into line-contact with an upper and a lower side of the flat cable passing through the inner circumferential passage.

12. The cable reel as claimed in claim 9, wherein a thick section is provided in the periphery of each bearing hole, and an upper and a lower face of the thick section are contacted with opposing faces of the upper and the lower large diameter portions.

13. A cable reel comprising:
a stationary body;
a movable body combined with the stationary body to define an outer cylindrical section, an inner cylindrical section, a bottom plate section and a roof plate section surrounding an annular hollow section;
a guide member disposed in the annular hollow section, the guide member including a C-shaped ring and a plurality of rollers spaced apart from each other and rotatably supported by the ring; and
a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers,
wherein a winding direction of the flat cable in the inner circumferential passage is inverted to that of the flat cable in the outer circumferential passage;
bearing holes are formed in the ring in the circumferential direction at predetermined intervals, a stopper section is protruded upward or downward from an outer circumferential edge of the ring in the radial direction from the bearing hole; and
each roller has a shaft portion between an upper and a lower large diameter portions, the outer diameters of which are different from each other;
when the assembling direction of the roller to the ring is not regular, it becomes impossible to assemble because the roller on the large diameter side interferes with the stopper section.

14. A cable reel comprising:
a stationary body;
a movable body combined with the stationary body to define an outer cylindrical section, an inner cylindrical section, a bottom plate section and a roof plate section surrounding an annular hollow section;
a guide member disposed in the annular hollow section, the guide member including a C-shaped ring and a plurality of rollers spaced apart from each other and rotatably supported by the ring; and a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers, wherein a winding direction of the flat cable in the inner circumferential passage is inverted to that of the flat cable in the outer circumferential passage;

the ring rotatably holds an intermediate portion of each roller, height of each roller in the axial direction is changed, some of the rollers are tall rollers, the height in the axial direction of which is large, so that the upper and the lower end portions of the rollers can be contacted with the bottom plate section and the roof plate section, the other rollers are short rollers, the height of which is smaller than that of the tall rollers, so that the upper and the lower end portions of the short rollers can not be contacted with the bottom plate section and the roof plate section, and at least one portion of the short roller on the inner cylindrical section side comes into contact with the flat cable passing through the inner circumferential passage.

15. The cable reel as claimed in claim 14, wherein the ring holds the tall roller so that the axis of the tall roller on the roof plate section side can be tilted to the outer cylindrical section side with respect to the normal line of the bottom plate section and an upper end edge of the tall roller on the inner cylindrical section side can be contacted with the roof plate section and further a lower end edge of the tall roller on the outer cylindrical section side can be contacted with the bottom plate section.

16. The cable reel as claimed in claim 14, wherein two tall rollers are arranged symmetrically to each other with respect to the central axis of the annular hollow section, the short rollers are arranged between the tall rollers at regular intervals, and the axis of the short roller is set in the normal line direction of the bottom plate or the axis of the short roller is tilted with respect to the normal line direction of the bottom plate section.

17. The cable reel as claimed in claim 14, wherein the tall roller is tilted so that the height of tall roller can be a little larger than the height of the annular hollow section, and when the tall roller is accommodated in the annular hollow section, the ring is twisted due to the contact of the tall roller with the bottom plate section and the roof plate section, so that the tall roller can be tilted by an angle gentler than the tilting angle of the roller before it is accommodated.

18. The cable reel as claimed in claim 14, wherein the roller is formed into a bobbin-shape in which an annular recess portion of an intermediate portion in the axial direction of the roller is interposed between upper and lower large diameter portions, a roller insertion passage communicating with the bearing hole and open to the inner circumferential edge or outer circumferential edge is formed in the ring, and the annular recess portion of the roller is rotatably engaged with the bearing hole through the roller insertion passage.

19. A cable reel comprising:

a stationary body;

a movable body combined with the stationary body to define an outer cylindrical section, an inner cylindrical section, a bottom plate section and a roof plate section surrounding an annular hollow section;

a guide member disposed in the annular hollow section, the guide member including a C-shaped ring and a plurality of rollers spaced apart from each other and rotatably supported by the ring; and a flat cable having one end fixed at the movable body and the other end fixed at the stationary body, the flat cable wound round an inner circumferential passage formed between the inner cylindrical section and the rollers and wound round an outer circumferential passage formed between the outer cylindrical section and the rollers, wherein a winding direction of the flat cable in the inner circumferential passage is inverted to that of the flat cable in the outer circumferential passage;

a roller attaching section is arranged in the ring in the circumferential direction at intervals; an upper roller, which comes into contact with a roof plate section of the annular hollow section and does not come into contact with a bottom plate section, is attached to the roller attaching section; a lower roller, which comes into contact with the bottom plate section of the annular hollow section and does not come into contact with the roof plate section, is attached to the roller attaching section; and at least one portion of the upper and lower rollers is made to come into contact with the flat cable passing through the inner circumferential passage.

20. The cable reel as claimed in claim 19, wherein the shape of the upper roller and that of the lower roller are identical with each other, the height of the roller is substantially not more than $\frac{2}{3}$ of the height of the annular hollow section, and the rollers are alternately attached to the roller attaching section of the ring upside down.

21. The cable reel as claimed in claim 19, wherein step portions are provided on the ring in the circumferential direction, the upper roller is attached to the roller attaching section provided in the upper step portion, and the lower roller is attached to the roller attaching section provided in the lower step portion.

22. The cable reel as claimed in claim 19, wherein the upper and lower rollers are formed into a shape in which an annular recess portion is provided between the upper and the lower large diameter portion, the height on one side of the upper and lower large diameter portions is large so that the roller can come into contact with the roof plate section or bottom plate section, the height of the other side is small so that a space can be formed between the roller and the roof plate section or bottom plate section, a bearing hole is formed as a roller attaching section of the ring, and the annular recess portion is rotatably inserted and attached into the bearing hole.

23. The cable reel as claimed in claim 19, wherein the roller attaching section of the ring is formed into a support shaft protruding from an upper and a lower face of the ring, the upper and the lower roller are formed into a shape in which a bearing hole open to the roller attaching side is provided, and the support shaft of the roller attaching section is rotatably engaged in the bearing hole.

24. The cable reel as claimed in claim 19, wherein the upper and the lower roller are attached to the ring while the axis of the roller is being tilted, and edges of the upper and the lower face of the upper and the lower roller are respectively contacted with the roof plate section and the bottom plate section.

25. The cable reel as claimed in claim 19, wherein the roof plate section and the bottom plate section are formed into a portion of the stationary body, the axis of the roller coming into contact with the roof plate section is tilted from the bottom plate section in the upper inner direction, and the axis of the roller coming into contact with the bottom plate section is tilted in the upper outer direction, so that an outer cylindrical section side edge of the roller comes into contact with the roof plate section or the bottom plate section.

* * * * *